United States Patent
Duggan et al.

(10) Patent No.: US 7,693,624 B2
(45) Date of Patent: **\*Apr. 6, 2010**

(54) VEHICLE CONTROL SYSTEM INCLUDING RELATED METHODS AND COMPONENTS

(75) Inventors: David Duggan, Aubrey, TX (US); David Felio, Highland Village, TX (US); Billy Pate, Houston, TX (US); Vince Longhi, Dallas, TX (US); Jerry Petersen, Southlake, TX (US); Mark Bergee, Dallas, TX (US)

(73) Assignee: Geneva Aerospace, Inc., Carrollton, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/008,176

(22) Filed: Jan. 9, 2008

(65) Prior Publication Data

US 2009/0125163 A1    May 14, 2009

Related U.S. Application Data

(63) Continuation of application No. 10/871,612, filed on Jun. 18, 2004, now Pat. No. 7,343,232.

(60) Provisional application No. 60/480,192, filed on Jun. 20, 2003.

(51) Int. Cl.
*G01C 22/00* (2006.01)

(52) U.S. Cl. .............................. 701/24; 701/13; 701/33; 701/36; 701/2; 244/75.1

(58) Field of Classification Search .................. 701/11, 701/13, 15, 24, 33, 36, 2; 244/75.1, 158.1, 244/76 R
See application file for complete search history.

(56) References Cited

U.S. PATENT DOCUMENTS

| | | | |
|---|---|---|---|
| 4,155,525 A | 5/1979 | Peter-Contesse | 244/182 |
| 4,611,771 A | 9/1986 | Gibbons et al. | 244/3.12 |
| 4,642,774 A | 2/1987 | Centala et al. | 364/434 |
| 4,725,956 A | 2/1988 | Jenkins | 364/434 |
| 4,868,755 A | 9/1989 | McNulty et al. | 364/434 |
| 5,042,743 A | 8/1991 | Carney | 244/3.11 |
| 5,048,771 A | 9/1991 | Siering | 244/3.15 |
| 5,123,610 A | 6/1992 | Oaks | 244/3.12 |
| 5,181,673 A | 1/1993 | Hubricht et al. | 244/3.12 |
| 5,214,584 A | 5/1993 | Dingee et al. | 364/423 |

(Continued)

OTHER PUBLICATIONS

RIS Press Relewase—http://www.landform.com/pages/PressReleases.html—4 pgs.
Beringer, D.; Applying for Performance-Controlled Systems, Fuzzy Logic, and Fly-By-Wire Controls to Generate Aviation Office of Aerospace Medicine, May 2002, pp. 1-8.

(Continued)

*Primary Examiner*—Gertrude Arthur Jeanglaud
(74) *Attorney, Agent, or Firm*—Westman, Champlin & Kelly, P.A.

(57) ABSTRACT

A vehicle control system and related sub-components together provide an operator with a plurality of specific modes of operation. The various modes of operation incorporate different levels of autonomous control. Through a control user interface, an operator can move between certain modes of control even after vehicle deployment. Specialized autopilot system components and methods are employed to ensure smooth transitions between control modes. Empowered by the multi-modal control system, an operator can manage multiple vehicles simultaneously.

20 Claims, 42 Drawing Sheets

U.S. PATENT DOCUMENTS

| | | | |
|---|---|---|---|
| 5,240,207 A | 8/1993 | Eiband et al. | 244/190 |
| 5,422,998 A | 6/1995 | Margolin | 395/166 |
| 5,522,567 A | 6/1996 | Kinstler | 244/3.15 |
| 5,552,983 A | 9/1996 | Thornberg et al. | 364/424.01 |
| 5,553,229 A | 9/1996 | Margolin | 395/166 |
| 5,566,073 A | 10/1996 | Margolin | 364/449 |
| 5,605,307 A | 2/1997 | Batchman et al. | 244/3.11 |
| 5,666,531 A | 9/1997 | Martin | 395/620 |
| 5,691,531 A | 11/1997 | Harris et al. | 244/3.14 |
| 5,782,429 A | 7/1998 | Mead | 244/3.11 |
| 5,822,515 A | 10/1998 | Baylocq | 395/185.09 |
| 5,839,080 A | 11/1998 | Muller et al. | 701/9 |
| 5,904,724 A | 5/1999 | Margolin | 701/120 |
| 5,933,156 A | 8/1999 | Margolin | 345/509 |
| 5,938,148 A | 8/1999 | Orenstein | 244/3.15 |
| 5,944,762 A | 8/1999 | Bessacini et al. | 701/27 |
| 5,951,607 A | 9/1999 | Senn et al. | 701/1 |
| 5,951,609 A | 9/1999 | Hanson et al. | 701/13 |
| 5,974,423 A | 10/1999 | Margolin | 707/104 |
| 5,978,488 A | 11/1999 | Margolin | 381/61 |
| 6,023,278 A | 2/2000 | Margolin | 345/419 |
| 6,025,790 A | 2/2000 | Saneyoshi | 340/946 |
| 6,062,513 A | 5/2000 | Lambregts | 244/175 |
| 6,064,939 A | 5/2000 | Nishida et al. | 701/120 |
| 6,092,009 A | 7/2000 | Glover | 701/14 |
| 6,122,570 A | 9/2000 | Muller et al. | 701/9 |
| 6,138,060 A | 10/2000 | Conner et al. | 701/9 |
| 6,177,943 B1 | 1/2001 | Margolin | 345/419 |
| 6,219,592 B1 | 4/2001 | Muller et al. | 701/9 |
| 6,304,819 B1 | 10/2001 | Agnew et al. | 701/207 |
| 6,377,436 B1 | 4/2002 | Margolin | 361/230 |
| 6,498,984 B2 | 12/2002 | Agnew et al. | 701/207 |
| 6,847,865 B2 | 1/2005 | Carroll | 701/3 |
| 6,862,501 B2 | 3/2005 | He | 701/3 |
| 6,885,874 B2 * | 4/2005 | Grube et al. | 455/520 |
| 2005/0256938 A1 | 11/2005 | Margolin | 709/218 |

OTHER PUBLICATIONS

Office of the Secretary of Defense, Airspace Integration Plan for Unmanned Aviation, Nov. 2004.

Abernathy, M.; "Virtual Cockpit Window" for a Windowless Aerospacecraft. www.nasatech.com/Briefs/Jan03/MSC23096.html, Jan. 2003, 2 pgs.

Parrish, R. et al.; "Spatial Awareness Comparisons Between Large-Screen, Integrated Pictorial Displays and Conventional EFIS Displays During Simulated Landing Approaches," NASA Technical Paper 3467, CECOM Technical Report 94-E-1, Oct. 1994, 1-22.

* cited by examiner a = SEMI-MAJOR AXIS
b = SEMI-MINOR AXIS
r = INSTANTANEOUS RADIUS OF CURVATURE
$\Psi_E$ = ELLIPSE HEADING
$\Psi_D$ = DESIRED VEHICLE HEADING (IN ELLIPSE COORDINATES)

ROUTE EVENT INFORMATION

NUMBER: 3    TYPE: RACETRACK

COORDINATES

LAT  35.4352   DEG.
LON  -119.6755 DEG.

ALTITUDE  10000.00  METERS MSL

LOITER

SEMI MAJOR  44.44   METERS
SEMI MINOR  55.55   METERS
ROTATION    270.50  DEG. (0 - 360)

TYPE
○ ELLIPSE
○ RACE TRACK
○ FIGURE 8
○ TIME  ○ # ORBITS
        500

GRAPHIC EDIT

OK    CANCEL

FIG. 33

DAKOTA102 SENSOR WINDOW

TAIL 2 G CAS CONTROL

○ ENABLE GCAS

○ DISABLE GCAS

MINIMUM DESCENT ALTITUDE  50000  m

MODIFY    APPLY    CANCEL

VEHICLE CONTROL SYSTEM INCLUDING RELATED METHODS AND COMPONENTS

The present application is a continuation of, and claims priority of, U.S. patent application Ser. No. 10/871,612, filed Jun. 18, 2004, which issued as U.S. Pat. No. 7,343,232 on Mar. 11, 2008, and which is based on and claims the benefit of U.S. Provisional Patent Application Ser. No. 60/480,192, filed Jun. 20, 2003, the content of both of these earlier filed applications being hereby incorporated by reference in its entirety.

BACKGROUND OF THE INVENTION

The present invention relates to a system utilized to control a vehicle. More particularly, the present invention pertains to a variable autonomy control system that enables a human to manage and operate a vehicle through interaction with a human-system interface.

Vehicle control systems are well known in the art, one known example being a control system that enables a human operator to remotely manage and control an unmanned vehicle. In one known application, an operator remotely controls an unmanned aerial vehicle (UAV) through a human-system interface. The operator typically controls details related to payload, mission and/or flight characteristics of the unmanned aircraft.

The development of practical applications for UAV technology has been hindered by an absence of a well-integrated control and guidance system. Potential applications for UAV's include border patrol, traffic monitoring, hazardous area investigation, atmospheric sampling or even motion picture filming. All of these and other UAV applications would benefit from a control system that enables a person with minimal aviation experience or manual skill to operate the vehicle. With presently known systems, the operator is rarely able to focus on payload or mission operation because he or she is consumed with the significant responsibilities associated with aircraft piloting.

In order to be truly versatile, UAV control systems should be comfortably usable by individuals with training that is focused on the requirements of a given mission or on the usability of a payload, rather than on the aviation of the air vehicle. In many cases, present systems require an individual with pilot training to engage a control system and manage mission, payload, and aviation functions simultaneously. It is not common for known control systems to be configured for the support of intuitive high level commands such as "go left", "go right", "take off", "land", "climb", or "dive". It is instead more typical that known control systems require low-level stick-and-rudder commands from the operator. Thus, there is a need for a control system that supports integration of intuitive, mission-level remote commands into a UAV guidance system, thereby significantly reducing the work load on a human operator as it pertains to vehicle aviation.

Known control systems are generally not configured to support multiple levels of autonomous operation. In fact, few systems even offer autonomous or semi-autonomous mission capability packaged with an ability to remotely interrupt the mission. Thus, for known systems, the workload of the operator is generally too great to enable him or her to fly multiple UAV's from a single ground control station, which is an appealing possibility. Thus, there is a need for a flexible vehicle control and management concept that will operate even when responding to remote intuitive commands such that one person can operate multiple vehicles from the same control station.

Known UAV control systems typically offer limited real-time control capability or they require management by rated pilots. It is known for systems to have a capability to automatically follow pre-planned mission routes. However, it is common that real-world missions fail to go exactly as planned. For example, time-critical targets or surveillance objectives can pop up during the mission; traffic conflicts with manned aircraft can occur; clouds can get in the way of sensors (e.g., EO/IR sensors); or intelligent and devious adversaries can make target location and identification difficult. Real-time control is required to deviate from the planned route to find and identify new targets; to maneuver UAV's to avoid traffic; to fly under the weather; or to get better line-of-sight-angles. Skilled pilots can maneuver aircraft, but then an additional operator is typically necessary to manage sensors and/or the dynamic mission.

While commercialized products such as video games and CAD utilities now provide an excellent model for human interfaces, such interfaces have generally not been completely integrated into an actual vehicle control system. In fact, very few known UAV autopilot systems are readily compatible with known Commercial Off-The-Shelf (COTS) hardware. This is unfortunate because it is not uncommon for non-pilot trained individuals to be pre-equipped with a familiarity with such hardware that includes standard joysticks, track-balls, lap-top computers, virtual reality head mounted displays and glove input devices.

Known vehicle control systems generally do not include an operational mode that enables an operator to focus his or her attention on a tactical situation display (e.g., images transmitted from an onboard sensor) rather than providing directional commands based primarily on a control interface. Such a control mode has many potential advantageous applications, for example, an operator can command the scope of the vehicle's on-board sensor to survey a battle field (or other topographical region) while the vehicle autonomously commands a flight profile that is slaved to the operator's sensor line-of-sight commands. There is a need for an integrated guidance solution that adapts to such a mode of control.

Advances in virtual reality simulation graphic display technology have made the concept of a virtual reality interface to real-time systems feasible. Already used by surgeons in the medical community, the use of virtual reality, such as Telepresence or Mixed Reality systems, in the context of UAV control is now feasible but generally unknown. Thus, there is a need for a control system that provides an operator with functionality that takes advantage of this new technology.

Finally, many known control systems are not adaptable to on-going command-and-control software development efforts. For example, for military applications, it is desirable that a control system be equipped to operate within the advanced Command Control Communication Computers and Intelligence (C4I) infrastructure and interface with associated Common Ground Control Stations such as the Joint STARS Common Ground Station. It is desirable that guidance software have the capability not only to respond to the command interface, but also an ability to be expanded modularly as new capabilities are desired, such that expansions can be accomplished without significant changes in the interface.

SUMMARY OF THE INVENTION

Embodiments of the present invention pertain to a vehicle control system that includes an integrated guidance design and systems engineering approach that enables a system having a modular core structure. The core structure enables the control system to be conveniently upgraded or updated. For example, the control system can be easily extended to accommodate increasing and/or additional guidance, payload or other technology. Further, the core structure enables the system to be efficiently adapted for various manned and/or unmanned vehicles.

Embodiments of the present invention also pertain to a vehicle control system and related sub-components that together provide an operator with a plurality of specific modes of operation, wherein each mode of operation incorporates a different level of autonomous control. Through a control user interface, an operator can smoothly switch between modes of operation even after vehicle deployment. Specialized autopilot system components and methods are employed to ensure seamless transitions between operational modes. Empowered by the multi-modal control system, an operator can even manage multiple vehicles simultaneously.

Embodiments of the present invention pertain to a hierarchical control system, user interface system, and control architecture that together incorporate a broad range of user-selectable control modes representing variable levels of autonomy and vehicle control functionality. A unified autopilot is provided to process available modes and mode transitions. An intelligence synthesizer is illustratively provided to assist in resolving functional conflicts and transitioning between control modes, although certain resolutions and transitions can be incorporated directly into the functional sub-components associated with the different control modes. In accordance with one embodiment, all modes and transitions are funneled through an acceleration-based autopilot system. Accordingly, control commands and transitions are generally reduced to an acceleration vector to be processed by a centralized autopilot system.

BRIEF DESCRIPTION OF THE DRAWINGS

FIG. 10-1 is a diagrammatic representation of an ECEF coordinate frame definition.

FIGS. 10-2 and 10-3 are diagrammatic representations of a geodetic coordinate frame definition.

FIG. 10-4 is a schematic representation of a body reference frame.

FIGS. 29-33 are examples of pop-up window displays.

FIGS. 35 & 36 are examples of vehicle-specific window displays.

DETAILED DESCRIPTION OF ILLUSTRATIVE EMBODIMENTS

I. Introductory Comments

Figure 1:
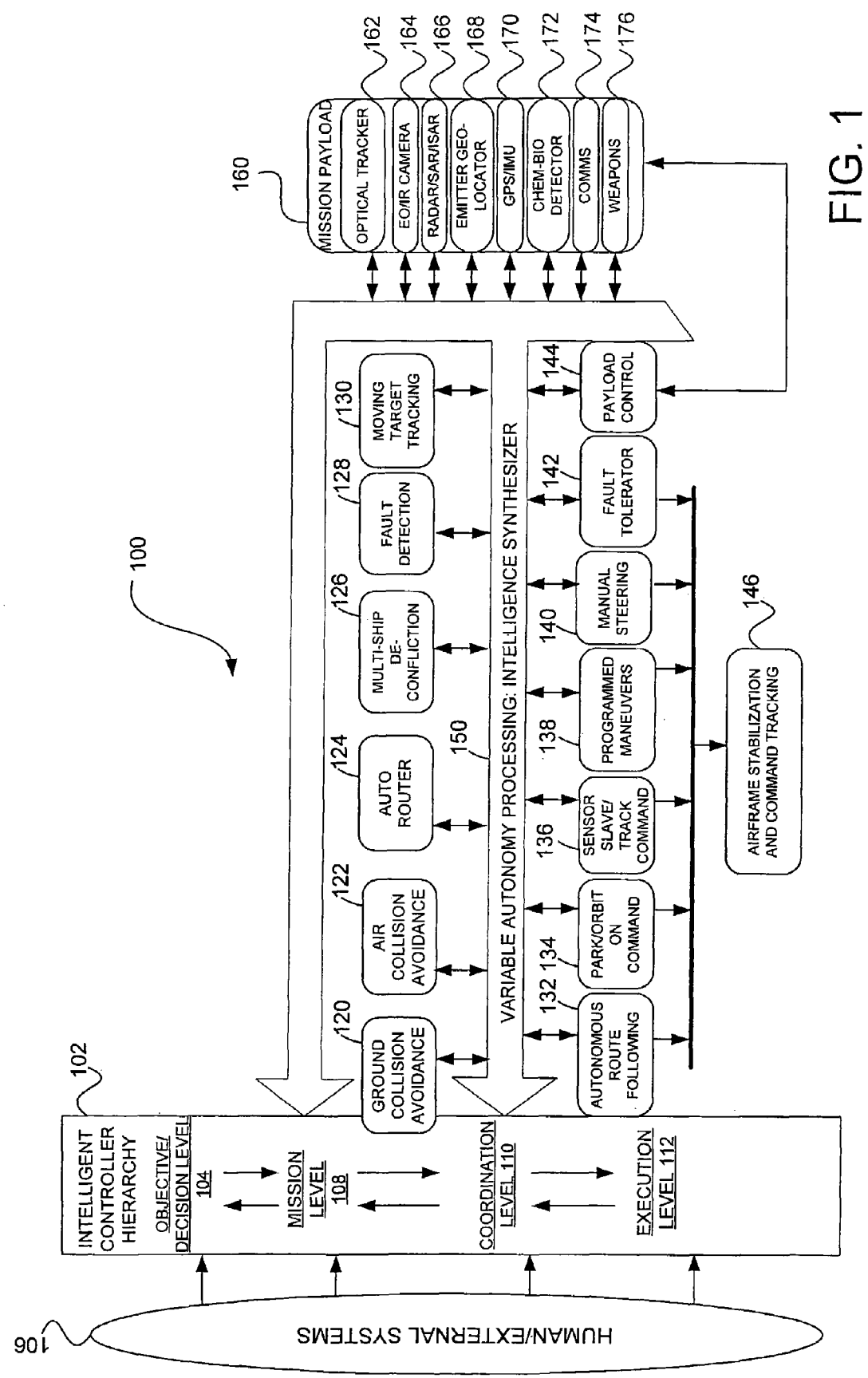
FIG. 1 is a schematic block diagram illustrating a variable autonomy control system.

Much of the present invention description will be devoted to describing embodiments in the context of an unmanned aerial vehicle (UAV). However, it is to be understood that the embodiments generally pertain to vehicle control systems and are designed for broad application. The embodiments can be adapted by one skilled in the art to be applied in the context of any of a variety of unmanned vehicles including, but not limited to, airplanes, helicopters, micro air vehicles (MAV's), missiles, submarines, balloons or dirigibles, wheeled road vehicles, tracked ground vehicles (i.e., tanks), and the like. Also, embodiments of the present invention can be adapted by one skilled in the art to be implemented in the context of manned vehicles (e.g., a human passenger operates the control system, or a human remotely operates a control system for a vehicle that transports a passenger, etc). It should be noted that the relatively modular nature of the vehicle control system of the present invention enables the adaptations necessary to accommodate different vehicles to be made in a relatively small period of time.

Certain embodiments of the present invention pertain to specialized control subsystems that each individually enable a specific control functionality to be accessed through the larger control system. It is to be understood that such subsystems can be adapted and independently deployed even in the context of vehicle control systems other than those specifically described herein. Also, such subsystems can be adapted to support any type of manned or unmanned vehicle including, but not limited to, those specifically listed herein.

II. Overview-13 Variable Autonomy Control System Architecture

Embodiments of the present invention generally pertain to a variable autonomy control system (VACS) architecture that enables, among other characteristics, a general simplification of UAV operation and control. The architecture illustratively supports selectable levels of control autonomy from fully autonomous control to simplified manual flight control modes for enhanced real-time control.

As dependence on UAV's for military operations grows and UAV technology is integrated into the emerging global command and control architecture, the cost and complexity of managing and controlling these assets could easily become substantial. This limitation is brought about by either of two extremes in the vehicle command and flight control philosophy: complete dependence on a human-in-the-loop (fully manual control) or complete exclusion of a human-in-the-loop (fully autonomous control). The former requires a dedicated, highly trained operator whereas the latter provides no mechanism for real-time operator interaction or mission management. The need for a dedicated highly-trained operator drives costs (personnel and training requirements) and severely limits a single operator's flexibility in that he or she is primarily focused on the aviation of the vehicle rather than the higher level mission objectives. On the other hand, the exclusion of the human-in-the-loop drives logistics costs (mission planning and asset allocation) and severely limits the UAV's operational flexibility.

A control design consistent with embodiments of the present invention exploits existing flight control technologies to arrive at an ideal balance between the two above-described control philosophies. The control design includes a flight control structure that supports variable levels of control autonomy and minimizes personnel and training requirements for vehicle operation. Human factors play a key role in that the vehicle is treated as one of many assets (e.g., including other vehicles) available to an individual operator during the execution of a defined mission. Therefore, the vehicle must be easily controllable. Embodiments of the present invention reflect the philosophical notion that a truly enabled UAV operator should not be required to be a trained aviator but should still retain variable levels of control capability to execute mission objectives that call upon his/her specialized expertise.

Embodiments of the present invention pertain to a hierarchical flight control structure with varied levels of remote operator input combined with an off-board controller software package and intuitive human system interface. Research of problems related to UAV control has indicated that a good solution lies in the appropriate functional allocation between human and machine. In the context of embodiments of the present invention, this leads to segregation of control into two fundamental categories: flight control and flight management. Flight control associates with the aviation of the aircraft whereas flight management associates with the mission plan (navigation tasking) for the aircraft.

III. Details—VACS Architecture

FIG. 1 is a schematic block diagram illustrating a VACS architecture 100 in accordance with one aspect of the present invention. Architecture 100 incorporates a hierarchical design that enables an invocation of different control behaviors at various levels in the hierarchy. Primitive control functions are combined with complex autonomous functions to enable a broad range of behaviors. An operator is illustratively able to access and selectively invoke certain of the control behaviors through an intuitive interface, such as an interface made available through a workstation. In accordance with one embodiment, the architecture design enables a single operator to work through the interface to effectively control multiple vehicles simultaneously.

FIG. 1 includes a spectrum 102 that demonstrates the hierarchical nature of architecture 100. Inputs 106 from human and other external sources are characterized across spectrum 102. At the top of the spectrum is the objective/decision level 104. Level 104 represents the highest end of the control spectrum wherein autonomous control is maximized, and the level of intelligent interaction (e.g., interaction with a human or other systems) consists of higher-level objective-based planning. The lowest level of intelligent autonomy is the execution level 112, in which external command interaction is either directly proportional to the actuation or is minimally compensated.

In between ends 104 and 112 are mission level 108 and coordination level 110. Levels 108 and 110 are sub-levels of the spectrum and represent varying levels of a blending of external and automated functionality. Mission level 108 is more human-oriented than coordination level 110, which is more human-oriented than execution level 112. Conversely, execution level 112 is more autonomous in nature than coordination level 110, which is more autonomous in nature than mission level 108.

Architecture 100 includes a plurality of functional sub-components 120-146. With regard to the FIG. 1 depiction, it should be noted that the individual functional sub-components are not necessarily illustrated on the level where they would correspond to the illustrated spectrum 102. Spectrum 102 is provided simply to demonstrate a hierarchical structure underlying architecture 100. Functional sub-components 120-146 represent control behaviors available for invocation either automatically or based on operator selection inputs.

When the illustrated control system architecture is actually applied, two or more of the illustrated functional sub-components can be applied simultaneously to accomplish a unified control scheme. In addition, in accordance with one embodiment, an operator is provided with the capability to interact through an interface to activate and deactivate certain functional control sub-components in order to activate and deactivate different modes of operator control representing different levels of system autonomy. An intelligence synthesizer 150 is provided to coordinate applicable functional sub-components and resolve conflicts there between. For example, if a vehicle is autonomously tracking a target (sub-component 130) and a new control command is inserted to automatically avoid an air collision (sub-component 122), then it is illustratively up to intelligence synthesizer 150 to determine which control source is to be given priority. Assumedly, collision avoidance will be given priority. Following execution of collision avoidance, intelligence synthesizer 150 is illustratively configured to resume normal operation (e.g., resume target tracking, hold a reasonable heading, etc.). In another example, if an operator interrupts the tracking of a target with an instruction to switch to autonomous route following (sub-component 132), then intelligence synthesizer 150 will ensure that the switch between modes of control is carried out as smoothly and efficiently as possible.

In accordance with one embodiment, intelligence synthesizer 150 is configured to manage the interfaces between modular autonomous and semi-autonomous functions so that they can be integrated in a 'plug-n-play' format. Some functions require de-confliction between competing commands to the airframe, on-board sensors, or outer-loop guidance. The intelligence synthesizer is illustratively configured to determine what functions exist in the configuration, what functions have priority, what functions are dormant, and what functions do not exist in the configuration. The intelligence synthesizer is illustratively further configured to implement the VACS hierarchical architecture to manage which level autonomy is allocated to each function. With reference to the FIG. 1 architecture hierarchy, the lowest level Execution functions are implemented with direct interfaces to the airframe and payload hardware. These functions illustratively include an airframe body-rate stabilization loop, an airframe acceleration command-tracking loop, a bank-angle command tracking loop, and/or a collection of payload management functions (these and other applicable functions are commercially available for integration and/or are described in other sections below as embodiments of the present invention). The higher level functions have interfaces as well, and in some cases will illustratively share responsibility with Coordination Level functions. Examples of such functions include implementation of inertial trajectories, pre-programmed maneuvers such as racetrack loiter patterns, waypoint leg regulation and switching, management of a waypoint list, and management of semi-autonomous control functionality such as sensor slave and remote-directional control (these and other applicable functions are commercially available modules for integration and/or are described in detail below in other sections as embodiments of the present invention).

The Coordination level functions illustratively share responsibilities with some Mission level functions. Examples of mission-level functions are autonomous route planners, autonomous ground collision avoidance, and autonomous see-and-avoid (these and other applicable functions are commercially available modules for integration and/or are described in detail below in other sections as embodiments of the present invention). Generally speaking, these functions process mission-level requirements and implement them based on vehicle state and mission status information.

In accordance with one embodiment, autonomous and semi-autonomous functions illustratively communicate and coordinate with each other via intelligence synthesizer 150, which is a pseudo-bus and communications manager. In cases where autonomous commands conflict or interfere with each other, intelligence synthesizer 150 determines how to de-conflict, blend, or prioritize the output commands.

A payload control functional sub-component 144 is included in order to facilitate transfers of information to and from mission payload 160. Mission payload 160 is illustrated with a variety of payload components 162-176. The illustrated payload components are illustrative only in that other or different components could be included without departing from the scope of the present invention. Some of the payload components are sensors that gather data that is transferred to intelligence synthesizer 150 either for the purpose of serving as a reference to be utilized in a vehicle control scheme or, alternatively, to be collected for some inherent value of the information itself (e.g, collected for a mission-oriented purpose). One illustrative purpose for communication payload component 174 is to facilitate communication between a ground station and a corresponding system implemented on the remote vehicle. Embodiments of the present invention pertain to specific communications components and will be described in greater detail below in other sections. Weapons payload component 176 is an example of an active component that can be triggered (e.g., fired) in response to operator input. Many of the illustrated payload components will be described in greater detail below. Chemical-biological detector component 172 is illustratively a sensor for detecting chemical and/or biological substances, for example for the purpose of identifying areas contaminated by chemical or biological agents. The GPS/IMU component 170 is illustratively a vehicle motion identification component for generating vehicle location information for any purpose such as, but not limited to, vehicle guidance, navigation or to be viewed by the operator (these and other applications of the data provided by sensor 170 will be described below in greater detail). Camera component 164 gathers information for mission purposes and/or for control purposes (the latter purpose being an embodiment of the present invention that will be described in detail below in other sections). Optical tracker 162 is illustratively configured to track an airborne or ground-based object relative to the vehicle for control purposes (e.g., air collision avoidance, ground target tracking, air target tracking, etc.) or mission purposes. Components 166 and 168 support additional mission and/or control functionality. Component 166 facilitates data collection and transfer of information in the nature of radar data, SAR data, ISAR data or the like. Component 168 could be any of a variety of components but illustratively facilitates data collection and transfer of information in the nature of a radar emitting device configured to sense and locate ground objects and the like.

The VACS architecture 100 illustratively enables a man-in-the-loop (i.e., the operator) to intuitively assign and deploy one or more UAV's in accordance with available control behavior parameters. The architecture supports intuitive control characteristics that are illustratively based on the human learning and decision-making process. Accordingly, the available control behavior parameters are designed to emulate the human learning, decision-making, and action processes. The architecture is distributed by design so that appropriate learning, decision-making and action behaviors are resident onboard the vehicle and supported with autonomous functionality when necessary.

It should be emphasized that the present invention is not limited to the illustrated sub-components 120-146. In fact, in accordance with one embodiment of the present invention, architecture 100 is designed such that additional sub-components can be modularly plugged into control architecture 100 to extend the system functionality. When a new sub-component is installed, intelligence synthesizer 150 is illustratively configured to recognize and manage the new functionality (e.g., synthesizer 150 is configured to manage conflicts with other sub-components, etc.).

Figure 2:
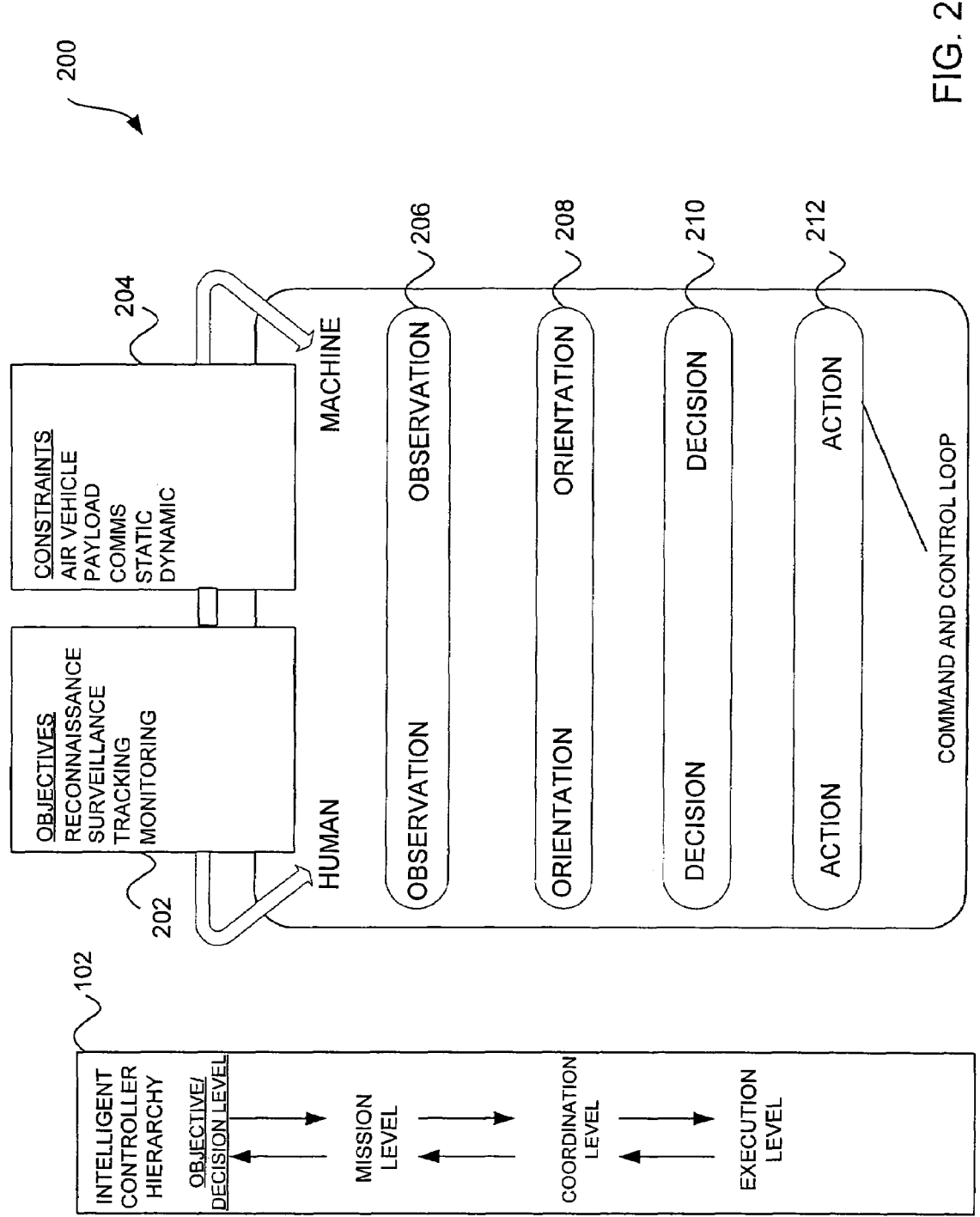
FIG. 2 is a schematic representation of a human-based command and control loop.

FIG. 2 is a schematic representation of a human-based command and control loop 200 as is emulated in the VACS architecture 100. For reference purposes, FIG. 2 includes the same intelligent controller hierarchy spectrum 102 that was illustrated in FIG. 1. At the highest end of the spectrum, objectives 202 (e.g., typically human defined such as reconnaissance, surveillance, tracking, monitoring, etc.) provide a fundamental basis for the subsequent support levels. The lower levels of activity will illustratively be influenced by the overarching objectives. For the machine or vehicle, the fundamental equivalent of objectives 202 is machine constraints 204 (e.g., aviation limitations of the vehicle, available payload components, communications limitations such as range, static and dynamic limitations, etc.). The overarching machine constraints illustratively influence the lower levels of activity. In accordance with one aspect of the present invention, a human (i.e., an operator) can utilize a machine (e.g., a UAV) that is equipped with a system implementing the VACS architecture to observe (bubble 206), orient (bubble 208), decide (bubble 210) and take action (bubble 212). The steps of observe, orient, decision and action are hierarchical in nature and reflect a natural human process flow, and notably are reflected in the available coordination of autonomous functionality offered through the VACS architecture.

Figure 3:
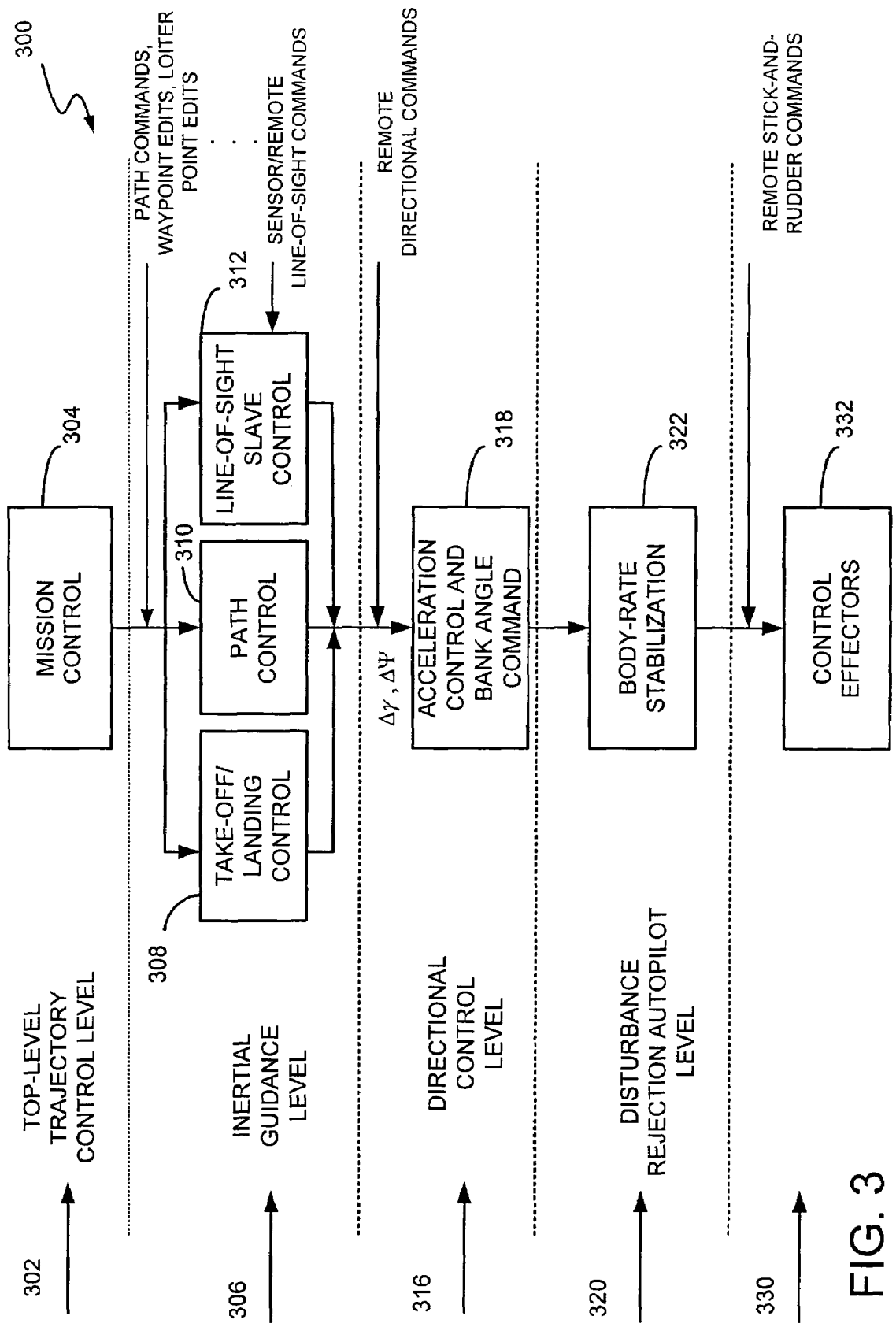
FIG. 3 is a diagrammatic block representation of a hierarchical control structure.

FIG. 3, in accordance with one aspect of the present invention, is a diagrammatic block representation of a hierarchical control structure 300. Control structure 300 is illustratively designed to support the VACS architecture 100 described in relation to FIG. 1. Most of the functional sub-components illustrated in FIG. 1 represent a range of potential functional control capabilities incorporating different levels of autonomy. Again, as has been discussed, the architecture is designed to be modularly extendable to even non-illustrated control schemes.

The highest level of control structure 300 is level 302, which is identified as the trajectory control level. Level 302 represents autonomous flight control modes and functionality that basically incorporate substantially full autonomy requiring practically no operator input. For illustrative purposes, mission control 304 is included on level 302 and represents mission-oriented fully autonomous flight control (e.g., mission is automatically planned and executed).

The next level of control structure 300 is level 306, which is identified as the inertial guidance level. Level 306 broadly represents autonomous flight control functionality with operator inserted path commands such as, but not limited to, waypoint editing, loiter point editing or real-time route editing. For illustrative purposes, take-off/landing control 308 and path control 310 have been included on level 306 (it is assumed that both are autonomous to some extent but require operator path input). To simplify the diagram, only a few relevant modes and functions are noted in the Figure specifically.

As is demonstrated on level 306, some sub-components or functions can be configured to work in cooperation with others. For example, take-off and landing components may utilize waypoint component functionality in generation of a flight approach for landing purposes. Such functional interdependence is within the scope of the present invention. Further, it should be noted that FIG. 3 is similar to FIG. 1 in that it is simply intended to demonstrate a hierarchical organization scheme in accordance with one aspect of the present invention. Actual characterization of the different functional components is open to interpretation.

In accordance with one aspect of the present invention, box 312 represents a specific level 306 autonomous mode of control that is worth previewing as an example. Box 312 represents a line-of-sight slave control mode of operation wherein a payload sensor is integrated into the guidance loop such that the vehicle is slaved to operator commanded sensor-pointing angles. In one embodiment of this control mode, the operator is generally concerned primarily with pointing the sensor with his/her attention focused on sensor imagery. The sensor commands are then blended into the UAV guidance algorithms and airframe stabilization commands are computed to orient the vehicle optimally in the mission environment. This control mode illustratively provides the foundation for a virtual reality human system interface, such as a head mounted display, and facilitates telepresence (the linking of remote sensors in the real world to the senses of a human operator) of surveillance and reconnaissance.

The next level of control structure 300 is level 316, which is identified as the directional control level. Level 316 broadly represents a hybrid level of autonomous flight control including, in accordance with one aspect of the present invention, as is notably depicted as an insert above block 318, remote directional command (RDC) capability. In accordance with one embodiment of RDC control, an operator can select a preprogrammed vertical profile maneuver (such as max climb or in-route descent) and maintain manual horizontal directional control of the vehicle. The operator can instantaneously transition to a control mode in which he/she has complete directional control (both vertical and horizontal) of the vehicle without being required to stabilize it rotationally. In accordance with one embodiment, the operator's control stick commands are mapped to directional commands (horizontal turn rate and climb/descent rates) that are then transformed into acceleration and bank angle commands prior to being fed into a stabilization autopilot, which is represented on level 320.

In accordance with one embodiment of the present invention, as is represented by box 318, control commands, regardless of their functional sub-component source, are transformed into acceleration and bank angle commands. These commands are then passed to the next level of the control structure, namely level 320, which is illustratively identified as the disturbance rejection autopilot level. In accordance with one aspect of the present invention, all levels of control utilize the same autopilot for a given vehicle, which in the illustrated case is a body-rate stabilization component 322.

The lowest level of control structure 300 is level 330, which is illustratively the level wherein actual manipulation of the aircraft's aerodynamic surfaces and thrust control occurs. Control commands after being filtered through autopilot component 322 are executed on level 330. In accordance with one embodiment, as is illustrated on level 330 as an arrow insert, one mode of control involves direct control of the aviation surfaces. Accordingly, such control commands are effectuated at a level below level 320 and are therefore relatively manual in nature.

In accordance with one embodiment of the present invention, the control modes and functions above box 318 generally do not require the operator to possess particularly specialized skills in aircraft aviation. On top of these control modes and functions, the UAV flight control computer performs higher frequency inner loop stabilization and command tracking (e.g., boxes 318 and 322). To the extent that control conflicts arise wherein multiple sub-components or functions generate conflicting control requests, intelligence synthesizer 150 is illustratively configured to resolve such conflicts prior to generation of acceleration and bank angle commands (box 318).

In accordance with one aspect of the present invention, the described vehicle control scheme supports transitions between changing control modes and functions. For example, suppose a UAV is flying a set of waypoints and the operator edits the waypoints. A transition must be made from the old waypoints to the new waypoints. In another example, suppose an aircraft flying a set of waypoints is on course to collide with another aircraft. It is within the scope of the present invention that an air collision avoidance sub-component will override the waypoint path and direct the aircraft off of the collision course. In this case, in accordance with one embodiment, the commands generated for level 316 will first correspond to the requested waypoint path, then there will be a transition to a non-collision path, and then there will be a graceful transition back to the waypoint path.

In accordance with one aspect of the present invention, intelligence synthesizer 150 is customized to support incorporated sub-components and functions and is thereby configured to generate the control commands necessary to transition control between sub-components and/or functions as necessary (e.g., acceleration and bank angle commands are obtained and executed as necessary for transitions). In accordance with another embodiment, information for resolving functional conflicts is embedded directly into a sub-component or function itself. It is also within the scope of the present invention that transitions be handled from both locations (e.g., some transitions are processed by the intelligence synthesizer and others are addressed directly within the sub-components or functions).

Generally speaking, FIG. 3 represents a top-level flow diagram of how the Mission, Coordination and Execution-Level hierarchical control architecture is organized so that external commands can be easily injected in to the autonomous control structure. The highest-level commands issued by the mission-level functions can be overridden or blended with trajectory edits inserted by a human operator, for example, via a ground control station interface. These commands are sent down to the inertial path regulation control loops, which generate airframe acceleration commands (or flight-path equivalent). If the user injects joystick steering commands, they are translated to the equivalent body acceleration commands, which are gracefully blended into the command chain by the VACS software. The acceleration commands are translated to bank angle and normal acceleration commands, which are articulated by the acceleration tracking and rate stabilization loops. The VACS architecture also provides an insertion point for low-level commands (e.g., stick-and-rudder commands), which correspond to more traditional inputs for piloted aircraft. These commands are directly input to the servos and override all of the other autonomous commands coming into the system.

Figure 4:
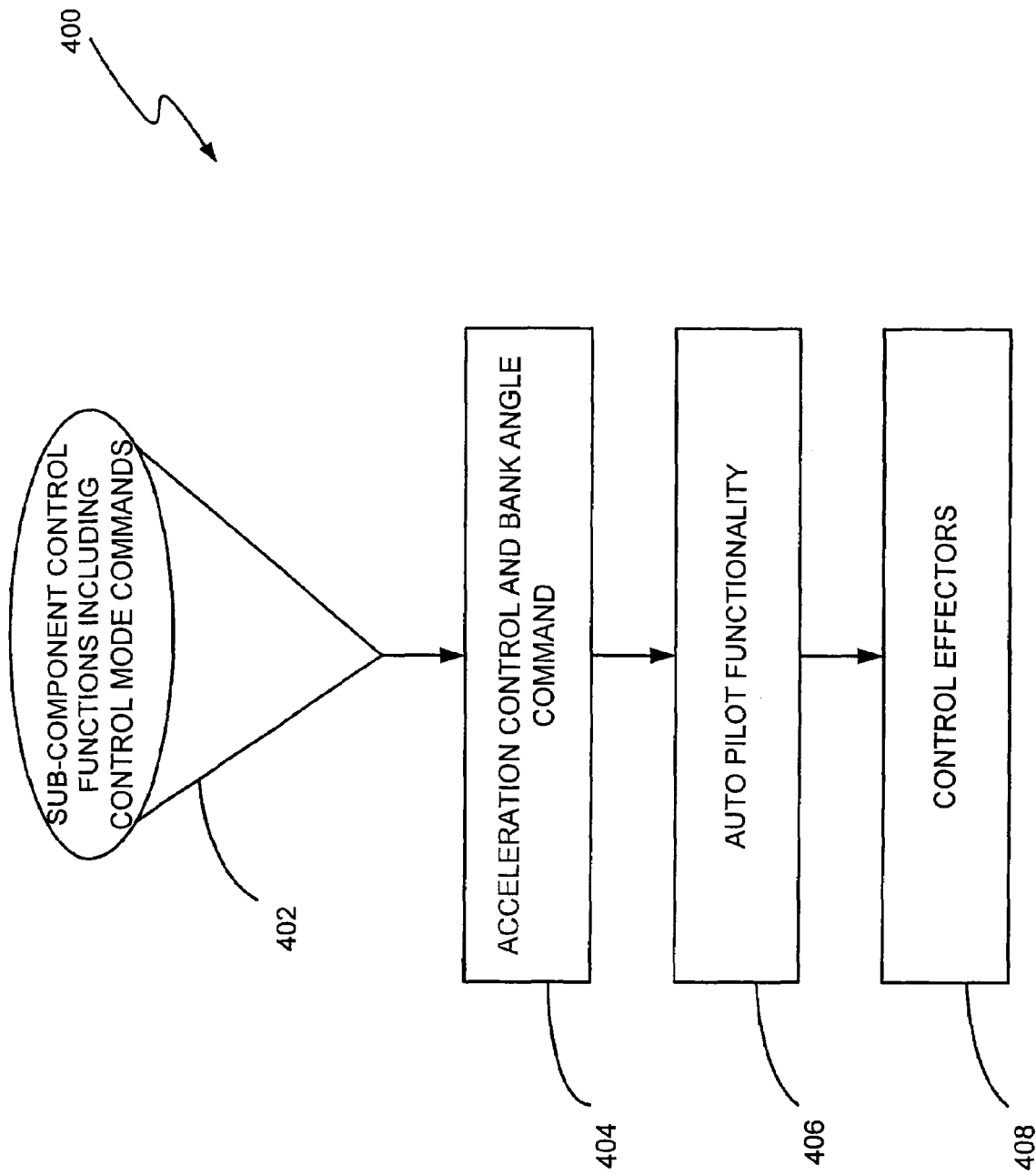
FIG. 4 is a simplified diagrammatic representation of a control structure.

FIG. 4 is a simplified diagrammatic representation of a control structure 400 in accordance with one aspect of the present invention. Control structure 400 includes a funnel representation 402 that represents a funneling of sub-component control functions into an acceleration control and bank angle command generator 404. In accordance with one embodiment, the information transferred to component 404 incorporates as necessary resolutions for functional conflicts and transitions between control modes or functions.

Information received by component 404 is transformed into corresponding acceleration and bank angle commands. These commands are then transferred to autopilot component 406, which in accordance with one embodiment, is configured to make control adjustments as necessary to maintain vehicle stabilization and/or track control commands. Accordingly, all levels of control are filtered through the same autopilot for a given vehicle. In accordance with one embodiment, autopilot component 406 is configured to make adjustments as necessary to maintain stability across control modes. The autopilot functionality is generally fixed and generally does not change regardless of mode selections or changes (e.g., all commands are funneled through the same autopilot). A mode change does not require the autopilot to be reset. Accordingly, the present invention provides continuity at the autopilot level, which is excellent for mode transition. This is an advantage over known systems wherein mode changes are known to cause instability, such as systems that incorporate a different autopilot for different modes.

As will be discussed in greater detail below, the control system and architecture embodiments of the present invention essentially enable any autopilot design to support control of a vehicle in numerous control modes that are executed with switches between modes during flight. All control modes are supported even in the presence of sensor errors, such as accelerometer and gyro biases. This robustness is at least partially attributable to the fact that the closed-loop system, in all control modes, is essentially slaved to an inertial path and, hence, the sensor biases wash out in the closed loop, assuming the biases are not so grossly large that they induce stability problems in the autopilot system. Furthermore, winds are generally not an issue in the overall control scheme in that the flight control system will regulate to the inertial path, adjusting for winds automatically in the closed loop. Given the precision afforded by inertial navigation aided by GPS technology, inertial path regulation offers a highly effective and robust UAV control approach. Generally speaking, the autopilot system functions such that winds, medium Dryden turbulence levels, sensor errors, airframe aerodynamic and mass model parameter uncertainties, servo non-linearity (slew rate limits, etc.), and various other atmospheric and noise disturbances will non have a critically negative impact on flight path regulation.

Component 408 receives commands generated by component 404 and filtered by autopilot component 406. The commands received by component 408 are executed to actually manipulate the vehicle's control surfaces. Autopilot component 406 then continues to monitor vehicle stabilization and/or command tracking, making additional commands to component 408 as necessary.

Generally speaking, relative to the control structures illustrated in FIGS. 3 and 4, known control systems are inflexible. For example, some known systems support little or no control functionality beyond remote stick-and-rudder commands (e.g., direct control of vehicle control surfaces with little or no incorporated automation). To the extent that a known system offers multiple modes of vehicle control, the modes are typically rigid in nature rather than flexible.

In accordance with one aspect of the present invention, an entire hierarchical spectrum of multi-autonomous control modes are made available to a system operator. The operator is illustratively able to efficiently and smoothly change control modes mid-mission as desired. The operator can do much more than simply change, edit or adjust waypoints on a waypoint-following mission. An operator can interrupt a waypoint-following mission to guide the vehicle manually, or partially manually (e.g., remote directional commands), or based on sensor/remote line-of-sight command control. In accordance with one embodiment, the control system is configured to optionally transition back to an interrupted mission (e.g., back to an original waypoint-following mission). It should be noted that the "operator" is not necessarily human. For example, the operator could be an automated decision-making source, such as a military C4I system.

The spectrum of control modes available to an operator illustratively corresponds to the particular functional sub-components incorporated into the variable autonomy control system architecture (e.g., architecture 100 in FIG. 1). In accordance with one aspect of the present invention, in addition to numerous specific control modes that will be described within the present description, a spectrum of additional control modes are conceivable. The control systems of the present invention can be easily configured to support (including conflict and transition support that enables the operator to switch back and forth between modes) basically any control mode or module. Examples of such control modes include:

1. Operator inputs a planned route and then the control system autonomously chooses a vehicle (e.g., one of several available vehicles) and automatically guides the vehicle along the planned route . . . or operator designates a moving ground target and then the control system autonomously chooses a vehicle and automatically guides the vehicle to track the ground target 2. Operator provides a planned route for a specific vehicle before the vehicle is launched . . . the vehicle follows the pre-planned route 3. Same as #2 but operator is allowed to change to a different planned route post launch (e.g., ability to change missions)

4. Control based on a vector-based decision process (e.g., vehicle will head in a predetermined direction at speed x, altitude y, etc. . . . then turn based on new vector input information 5. Remote Directional Control (RDC) control (e.g., flying directionally such as with a multi-directional joystick input mechanism . . . with autonomous safety nets that do not let the operator aerodynamically stall, over-steer, overbank, or otherwise compromise flight of the vehicle)

6. Full Manual Control (remote commands which directly reach the control surfaces un-compensated or conditioned)

Accordingly, the control systems of the present invention enable an operator to move in and out of a range of different control modes selected from a broad control spectrum including everything from automated mission planning to direct control, with many available modes in between. Modes other than the six listed above are certainly within the scope of the present invention.

In accordance with one embodiment, the control system architecture of the present invention is flexible enough to support implementation of commercial-off-the-shelf (COTS) components to enable additional system sub-components and corresponding control functionality. For example, software products for automatic route planning are commercially available an can be implemented in the context of the described control system and architecture. For example, OR Concepts Applied (ORCA) of Whittier, Calif. provides at least one software product for route planning such as their "ORCA Planning & Utility System" (OPUS). This is but one example of a software component that can be utilized to extend the functionality of the broader control system. In accordance with one embodiment, while programs such as OPUS are configured to generate a route plan, the configuration of the control structure of the present invention (described in relation to FIGS. 3 and 4) will ensure that a generated plan is optimized for the relevant vehicle (e.g., the plan is filtered through command generator 404 and autopilot 406 before vehicle control is directly impacted).

It should be noted that while FIG. 3 shows manual commands being entered below the autopilot component 322, this is not necessarily the case. With reference to FIG. 4, in accordance with one embodiment of the present invention, when an operator chooses a manual control mode, manual instructions are translated into corresponding acceleration commands. In accordance with one embodiment, the trajectory commands are processed by the autopilot component 406 such that, for example, when the operator lets go of the stick the vehicle will continue on a relatively straight and balanced path.

The present description, including FIGS. 3 and 4, has been described in the context of a system that incorporates an autopilot component configured to operate in accordance with commands expressed as acceleration-based descriptors of motion. It should be noted that any other commands and corresponding autopilot system can be utilized without departing from the scope of the present invention. For example, component 404 (FIG. 4) can be configured to generate commands in the form of bank-to-turn thrust values, skid-to-turn values, velocity-based values, or any other descriptor of motion. Accordingly, autopilot component 406 is generally a modular component that can be configured to support any of a wide variety of directional command structures and descriptors of motion. Examples of autopilot systems within the scope of the present invention include, but are not limited to, bank-to-turn autopilots, skid-to-turn autopilots, and the like.

Accordingly, the present invention provides a hierarchical control system and architecture that incorporates a broad range of user-selectable control modes representing variable levels of autonomy. A unified autopilot is provided to process available modes and mode transitions. An intelligence synthesizer is illustratively provided to assist in resolving functional conflicts and transitioning between control modes, although certain resolutions and transitions can be incorporated directly into the functional sub-components associated with the different control modes and functions. In accordance with one embodiment, all modes and transitions are funneled through an acceleration-based autopilot system. Accordingly, control commands and transitions are generally reduced to an acceleration vector to be processed by the centralized autopilot system.

In accordance with one aspect of the present invention, a translation layer is included to enable specialized control support for a given set of autopilot and vehicle control systems. In other words, the translation layer receives acceleration vectors (or some other output) and translates them into control instructions that are acceptable for a particular vehicle's autopilot and control system. The translation layer essentially enables the control architecture and structures of the present invention to be adapted for any vehicle's autopilot system. For example, in accordance with one embodiment, a vehicle that incorporates a control system that includes flight path angle-based trajectory control can be enhanced with the significant variable autonomy control features of the present invention. The translation layer is configured to receive an input and translate it into whatever commands are necessary to support a given vehicle. It should also be noted it is not required that the translation layer input be in the form of an acceleration vector (e.g., it could be a velocity representation, etc.).

Figure 5:
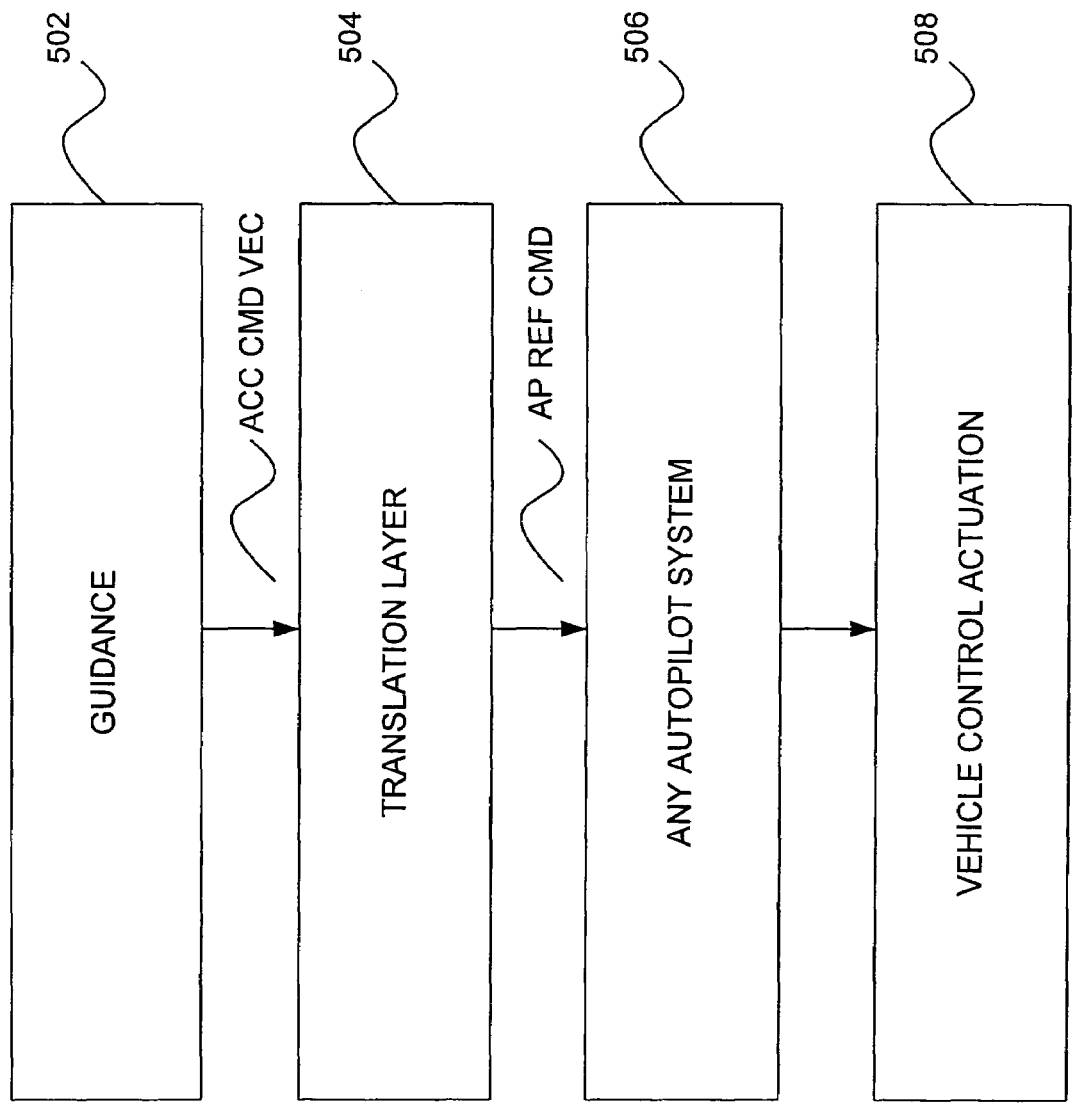
FIG. 5 is a diagrammatic block representation of a control system incorporating a translation layer.

FIG. 5 is a diagrammatic block representation of a translation layer embodiment of the present invention. As is indicated by block 502, acceleration vectors are passed to a translator 504. Translator 504 translates the acceleration vectors into a format appropriate for a given autopilot system 506. As is indicated by block 508, the translated control instructions are utilized for vehicle control. Without departing from the scope of the present invention, the software support for the translation layer can be implemented in association with a ground station system and/or an on-board vehicle control system.

In accordance with one embodiment, through implementation of a translation layer, the control systems of the present invention employ a generalized high-bandwidth autopilot interface design that can be applied to a variety of air vehicles from conventional statically stable tail control airframes to high performance, statically unstable, tail-less combat vehicles or neutrally stable cruise missiles.

IV. System Architecture

Figure 6:
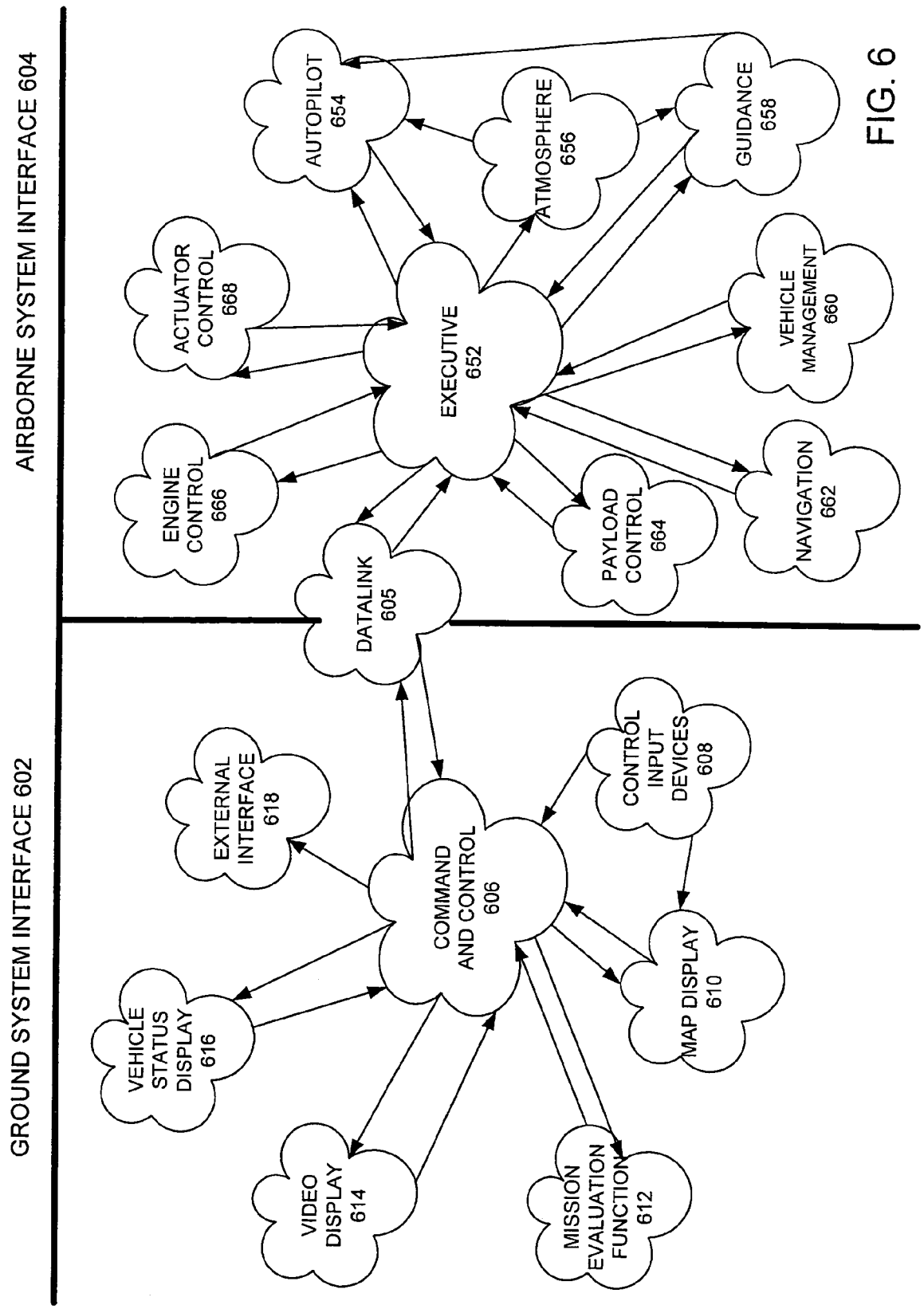
FIG. 6 is a schematic representation of top-level software objects associated with system interface components of a control system.

In accordance with one aspect of the present invention, the described VACS architecture and associated hierarchical control structure are implemented in the context of two basic facilitating interface components: a ground control station interface and an airborne system interface. FIG. 6 is a schematic representation of top-level hardware and software objects associated with each interface (labeled interface 602 and 604, respectively). Interfaces 602 and 604 are linked to one another by a datalink 605. Datalink 605 is illustratively a communications link that enables remote communication between the ground station interface and the vehicle interface. All known methods for implementing such a datalink are within the scope of the present invention.

The ground system interface 602 includes a centralized command and control component 606. Component 606 is illustratively configured to provide an operator with a user control interface. Through the interface, with the aid of a video display component 614, component 606 provides the operator with image data that is received by a mission sensor that is part of the vehicle's on-board payload. Through the interface, with the aid of a vehicle status display 616, component 606 provides the operator with control settings, warnings or other relevant vehicle status information. Through the user interface, with the aid of a map display 610, component 606 provides the operator with a real time map display that shows a vehicle's location relative to a map. A mission evaluation component 612 performs mission analysis and influences command and control component 606 as necessary depending on a given implementation. External interface 618 provides a means for communication with external sources such as, but not limited to, maintenance training equipment that provides logistics support for any of a wide variety of maintenance training equipment. Component 606 is illustratively configured to receive and respond to inputs received from the operator through control input devices 608. Component 606 communicates through datalink 605 with an executive component 652 associated with airborne system interface 604. In this way, the operator is able to control the vehicle at least with regard to flight characteristics and payload operations. Also, component 606 receives data from executive component 652 as necessary to support various system functionalities (e.g., component 606 receives navigation data from component 652 for any of a wide variety of functions, for example, for supplying an indication of aircraft location relative to map display 610).

The executive component 652 is configured at least to process commands and information received from command and control component 606. Several components are configured to support the functionality of executive component 652, particularly with regard to flight control and management. An atmosphere component 656 processes characteristics of the vehicle's surroundings as necessary at least to support the execution of manual and automated flight control decisions. A guidance component 658 processes operator inputs, as well as automated and data inputs, in order to facilitate flight control of the aircraft. A navigation component 662 facilitates the collection and provision of data pertaining to aircraft location. Autopilot component 654 receives flight control commands, processes the commands (e.g., makes adjustments to ensure stable flight patterns), and passes commands to actuator control component 668 and engine control component 666 as necessary for flight control execution. Vehicle management component 660 could have any of a variety of functions but illustratively at least coordinates and organizes flight control sensor inputs. Payload control component 664 manages the vehicle payload and facilitates the execution of payload commands received from the operator.

Figure 7:
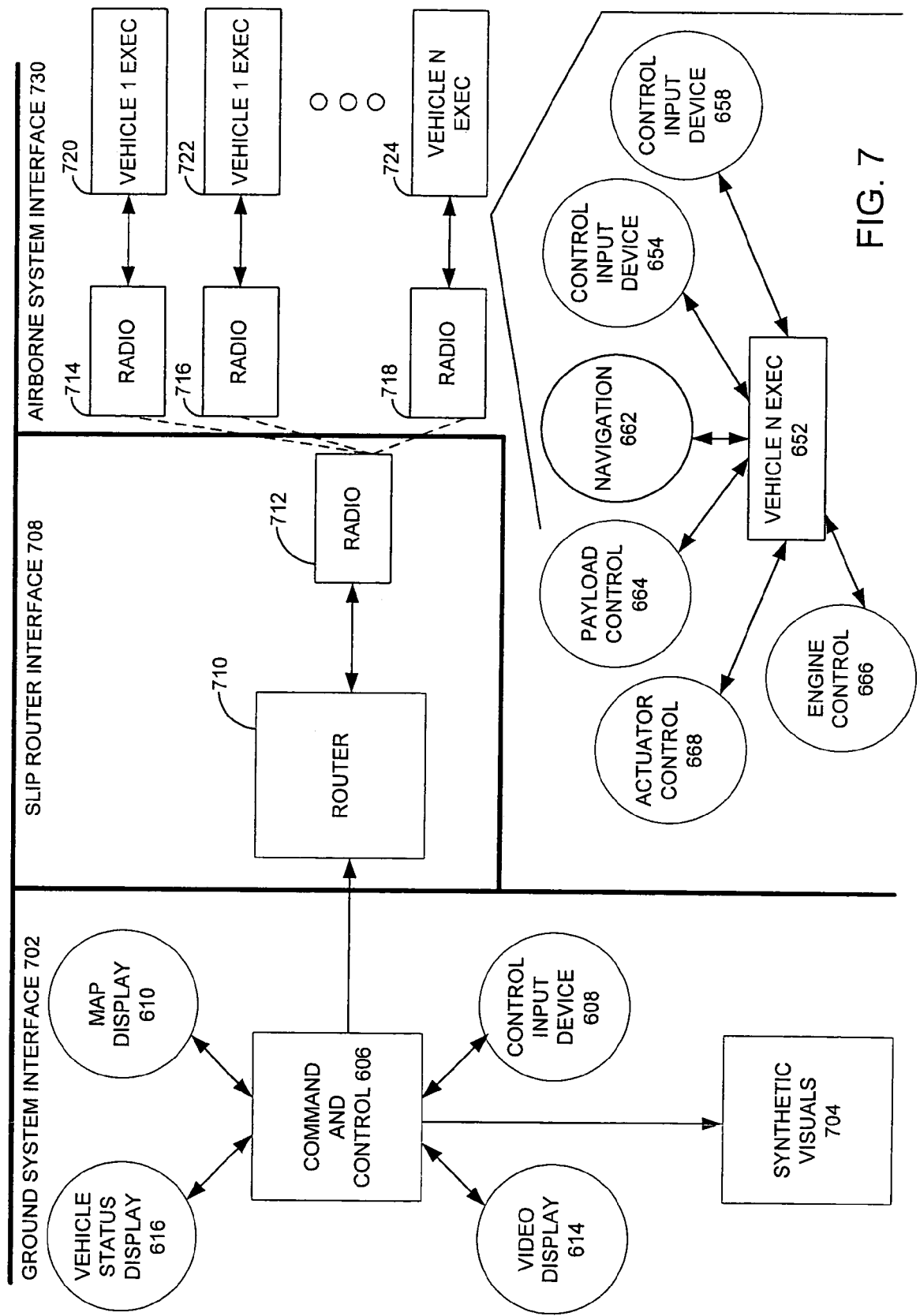
FIG. 7 is a schematic representation of an interface system for the control of multiple vehicles.

FIG. 7 is a schematic diagram illustrating an interface system similar to that illustrated in FIG. 6 but adapted for multiple vehicles. Ground system interface 702 is illustratively the same or similar to interface 602 shown in FIG. 6. In order to simplify the illustration of interface 702, only components 606, 608, 610, 614 and 616 are included. Any of the other components of interface 602 could be included without departing from the scope of the present invention. Other or different components could be included without departing from the scope of the present invention.

Ground system interface 702 includes one component that interface 602 did not. Interface 702 includes a synthetic visuals component that is configured to provide the operator with a relatively real-time display of a synthetically generated depiction of the vehicle and/or its environment. The concept of synthetic visual display represents an embodiment of the present invention and will be described in greater detail below.

With further reference to FIG. 7, in accordance with one aspect of the present invention, communication between ground system interface 702 and an airborne system interface 730 is through a communications interface 710 (e.g., a SLIP router) (in place of the simplified "datalink" illustrated in FIG. 6). Router 710 works in conjunction with a radio 712 to transfer commands and flight information in a distributed manner to a plurality of radios 714-718. Each radio 714-718 is associated with a different executive component (e.g., components 720-724) located on board a separate vehicle. Each vehicle's executive component is illustratively configured in a manner that is the same or similar to component 652 illustrated in FIG. 6. As is shown in FIG. 7, each executive component 720-724 includes components 652, 666, 668, 664, 662, 654 and 658. Other or different components could be included without departing from the scope of the present invention.

V. Dynamic Control Schemes

Figure 8:
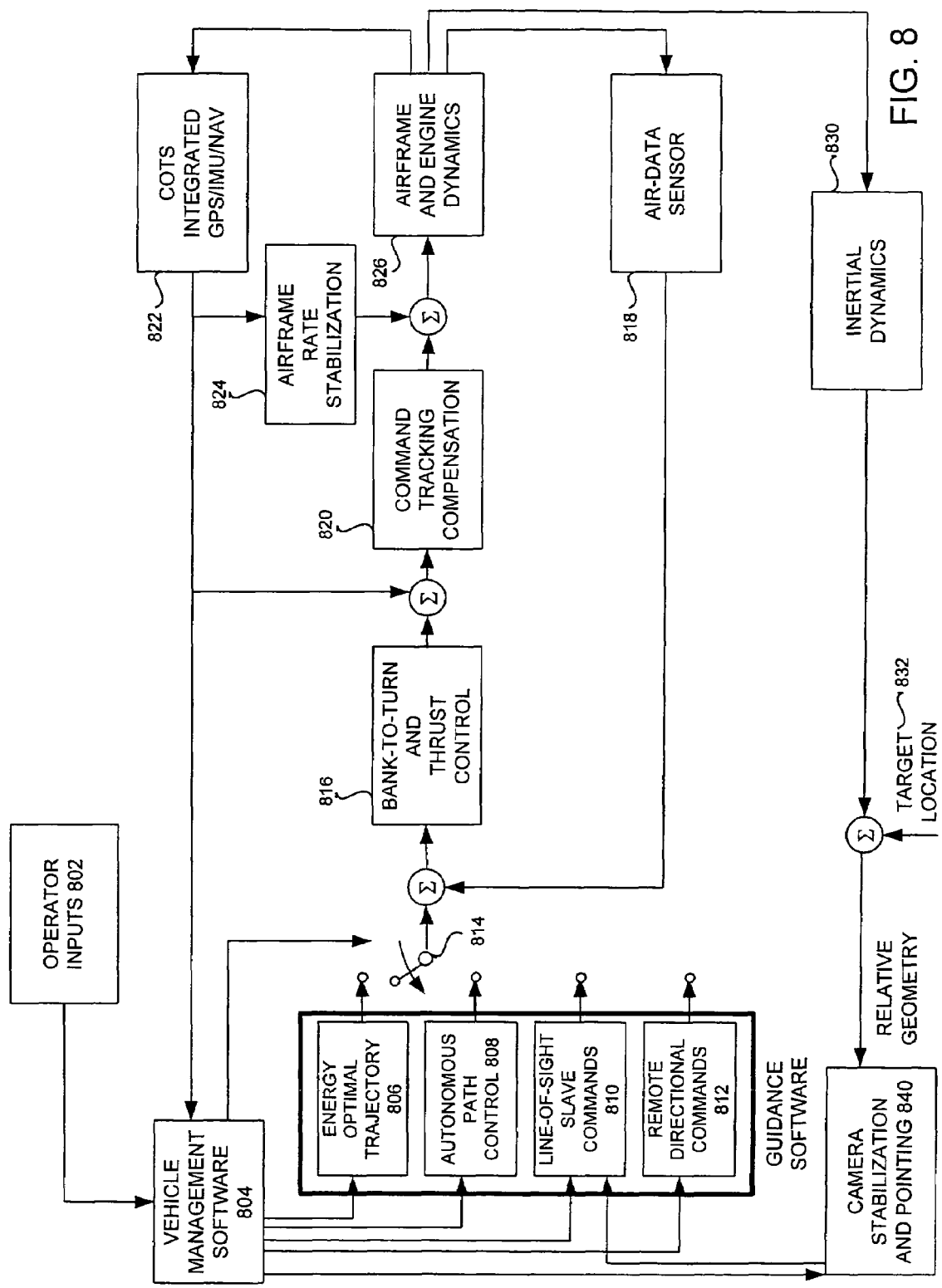
FIG. 8 is a schematic diagram representing a vehicle control scheme.

FIG. 8, in accordance with one aspect of the present invention, is a schematic diagram representing a vehicle control scheme that supports implementation in the context of the described VACS architecture and control structure. It should be emphasized that any form of autopilot controller (e.g., classical, optimal, robust, non-linear, or adaptive) can be employed without departing from the scope of the present invention, and without affecting the system architecture or operator control policies.

In accordance with the illustrated control scheme, operator inputs 802 are provided to vehicle management software 804. Management software 804 is configured to support an illustrative three different classes of control and corresponding operator inputs. The first class is represented by block 806, which is labeled energy optimal trajectory. Control modes of this type involve controlling the vehicle in a substantially automated manner so as to maintain a preferred or designated trajectory while expending a relatively minimized amount of energy (e.g., to conserve potential energy). The second class is represented by block 808, which is labeled autonomous path control. Control modes of this type involve controlling the vehicle in a substantially automated manner so as to maintain a flight control path that is mission oriented and, optionally, selected and/or modified by the operator. The third class is represented by block 810, which is labeled line-of-sight slave commands. As has been described, control modes of this type generally involve controlling the vehicle based primarily on manipulation of a visual sensor. The third class is represented by block 812, which is labeled remote directional commands. Control modes of this type have been previously described herein and generally involve, in one embodiment, controlling the vehicle based on simplified directional commands with reliance on automation to determine appropriate execution parameters.

A switch 814 represents a selection of one of the different control classes based, for example, on a control mode selection that corresponds to an operator input 802. The switch 814 is notionally represented by a simple switch but is illustratively embedded in the more complex Intelligence Synthesizer processing architecture. Once a connection with a control class/mode has been established, subsequent corresponding vehicle control commands are translated through bank-to-turn and thrust control component 816 (e.g., corresponding acceleration vector commands are generated). Additional data derived from an air-data sensor source 818 and/or software 804 is fed into the control process as necessary. The output of control component 816 is adjusted at component 820 (e.g., autopilot adjustments) in order to compensate for deviations from the original control command. As is illustrated, information from commercial-off-the-shelf integrated components 822 (e.g., coordinate information from GPS/IMU/NAV systems) can be fed into the determination of actual deviations as necessary, and can also be utilized by software 804 for any purpose such as but not limited to route planning. Following adjustments for deviations, box 824 represents adjustments for airframe stabilization (e.g., autopilot adjustments).

Following the steps associated with boxes 816, 820 and 824, box 826 represents the step wherein control commands are actually executed and vehicle control surfaces and engine dynamics are actually manipulated based on the commands. Following execution of the commands, sensors associated with air-data sensor 818 and integrated components 822 return data to points upstream in the process such that additional adjustments can be made if necessary (e.g., necessary to keep the vehicle on track with a desired route or necessary to keep the vehicle from stalling, crashing, etc.). As is indicated at 830, inertial dynamics are processed following command execution. This information is passed along to camera stabilization and pointing component 840 such that adjustments can be made if necessary to stabilize a camera, such as a gimbal-mounted camera utilized to support line-of-sight slave commands 810. Adjustments can be made to the camera configuration based on relative geometry in order to keep the camera relatively stable. Information input 832 represents an input of target location information that enables the camera to focus on and follow a target.

There are several features and extensions of the described control approach to highlight:

1. In accordance with one aspect of the present invention, a library of robust mathematical guidance algorithms (examples of which are described later in the present description as embodiments of the present invention) are employed to accommodate remote operator command insertion at every level of flight control to address not just the flight control problem but also flight management. This design approach provides simplified manual control modes that enable a relatively unskilled operator with minimal training to control the vehicle.
2. In accordance with another aspect of the present invention, the payload sensor control is integrated into the guidance loop to provide a control mechanism that shifts the operator's focus from vehicle control to sensor control, without concern of the vehicle flight profile. This control mechanism also facilitates the introduction of a virtual control interface bringing immersive control techniques to the airborne surveillance and reconnaissance arena.
3. An intuitive human-system interface (described in other sections below) offers an interface with which operators can be trained to execute a successful vehicle mission in a matter of hours or days as opposed to weeks, months, or years.
4. An intuitive, real-time mission planning capability is built into the ground control station software to support real-time route editing and vehicle mission retasking.
5. The system enables real-time mission assessment such that the operator can make rapid and precise real-time mission updates, as dictated by higher level operational needs that change continuously within a dynamic environment (e.g., battle environment).

In accordance with one aspect of the present invention, to enable a simplified manual control concept, the controller structure is implemented such that the operator can have direct control of three outer-loop states: airspeed (u), turn rate ($\dot{\psi}$) and altitude rate ($\dot{h}$). To satisfy the requirements of fully autonomous flight, it is generally desired to close the outer loop around a fixed path that is defined by preprogrammed waypoints. Analysis of the problem shows that both requirements (simplified manual and fully autonomous control) could be satisfied with a single control loop structure.

Figure 9:
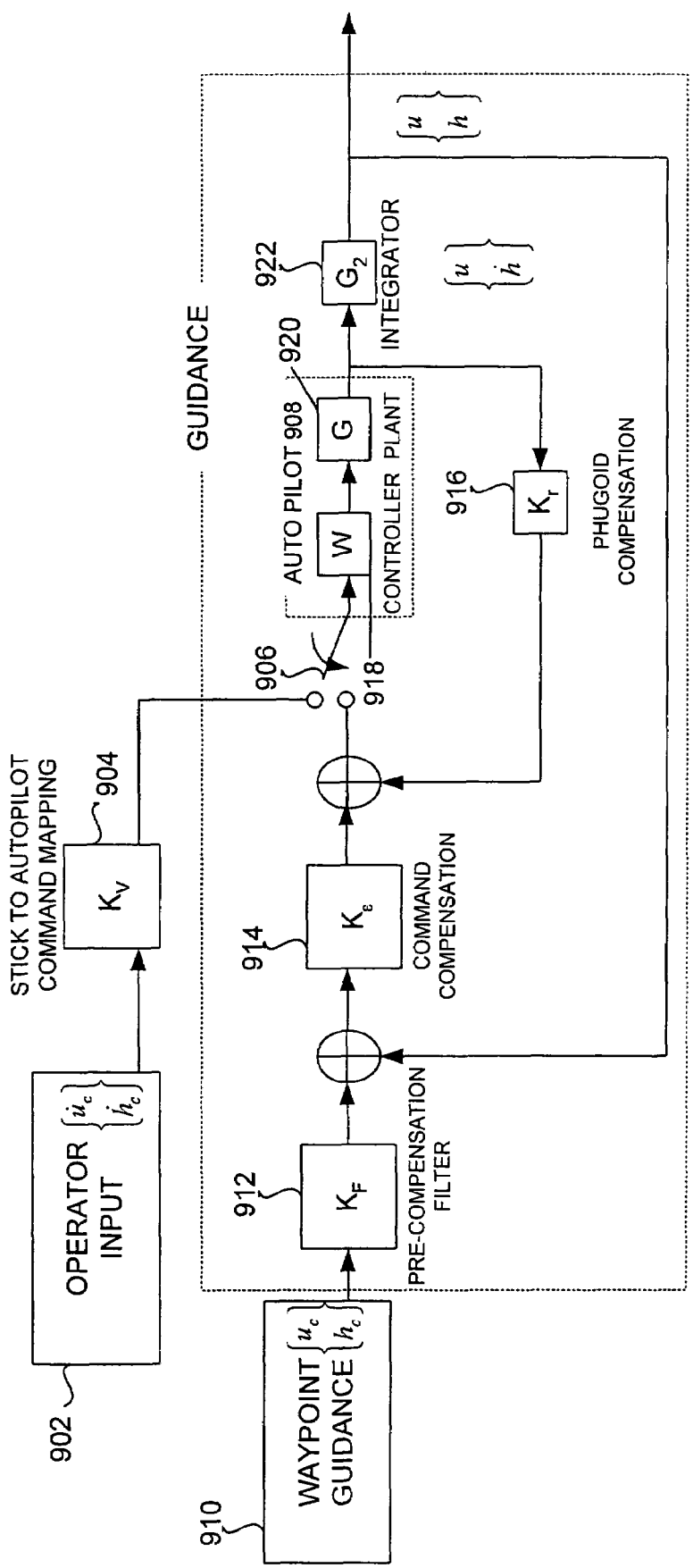
FIG. 9 is a control diagram representing a general integrated guidance loop structure.

In accordance with one aspect of the present invention, an improved control loop structure is provided. FIG. 9 is a control diagram representing a general integrated guidance loop structure. Box 902 represents operator input and box 904 represents gain or mapping from input to autopilot. Together, boxes 902 and 904 represent an operator command insertion point, for example for the simplified manual control mode herein referred to as Remote Directional Response (RDR) or Remote Directional Command (RDC). Box 910 represents a waypoint guidance input. Box 912 represents pre-filtering adjustment to input 910 to maintain a properly conditioned signal with desirable steady-state properties. Box 914 represents a gain adjustment to input 910 to compensate for command error. Box 916 represents a feedback loop providing an adjustment for phugoid dampening. Box 918 represents autopilot controller functionality. Box 920 represents the airframe plant itself (e.g., the vehicle and associated actuators actuated in response to the control input). Finally, box 922 represents integrals of the first dynamic states, thus completing the plant dynamics model.

A switch 906 is inserted between the autopilot 908 and guidance system thereby enabling the operator to command the autopilot 908 directly. The switch 906 is notionally represented by a simple switch but is illustratively embedded in the more complex Intelligence Synthesizer processing architecture. An example of operator commanded autopilot control is horizontal steering. For horizontal steering, the operator's control stick commands are mapped to horizontal turn rate commands. The guidance software illustratively gains the turn rate command by the current vehicle inertial velocity and feeds this term to the autopilot. In the vertical channel, the operator control stick commands are mapped to an altitude rate. The guidance software converts this command into a flight path angle command and computes a flight path following acceleration command that feeds the autopilot. In accordance with one embodiment, when the operator "lets go of the stick", the flight software simply commands the vehicle to fly straight and level at the current altitude and current heading.

As FIG. 9 demonstrates, the general form of the outer loop guidance algorithm is a second order inertial path controller. The corresponding form of the autopilot utilizes an acceleration command input. Thus, the incorporated autopilot structure is an acceleration command autopilot in the pitch and yaw axis and a bank angle command autopilot in the roll axis.

It should be noted that other gain scheduling techniques and acceleration autopilots are within the scope of the present invention. Different autonomous vehicles will illustratively incorporate different gain scheduling techniques and autopilots, the VACS architecture and control structures being conveniently adaptable by one skilled in the art to accommodate such variations. A list of autopilot systems that can be accommodated includes, but is not limited to:

1. Linear classical control designs using pole-placement gain scheduling techniques
2. Non-linear control design using dynamic inversion
3. Non-linear adaptive control design
4. LQR (optimal) control design
5. Loop shaping control design In one embodiment, as was alluded to in relation to FIG. 5, a translation layer can be implemented to translate a given control output (e.g., an acceleration based command) to an alternative form as necessary to accommodate any of the above five or other autopilot systems.

VI. Coordinate Frame Definitions

In order to support description of specific control modes and guidance methods, a few different standard coordinate frame definitions and transformations will now be described.

Figures 1, 10:
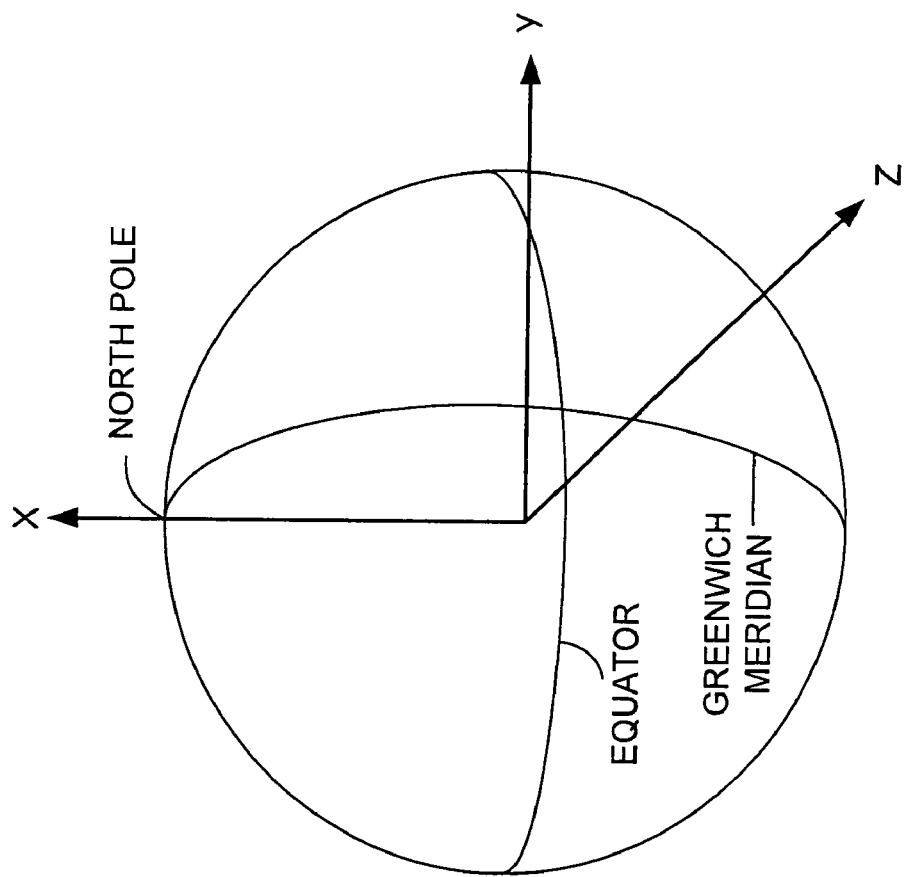
Figures 3, 10:
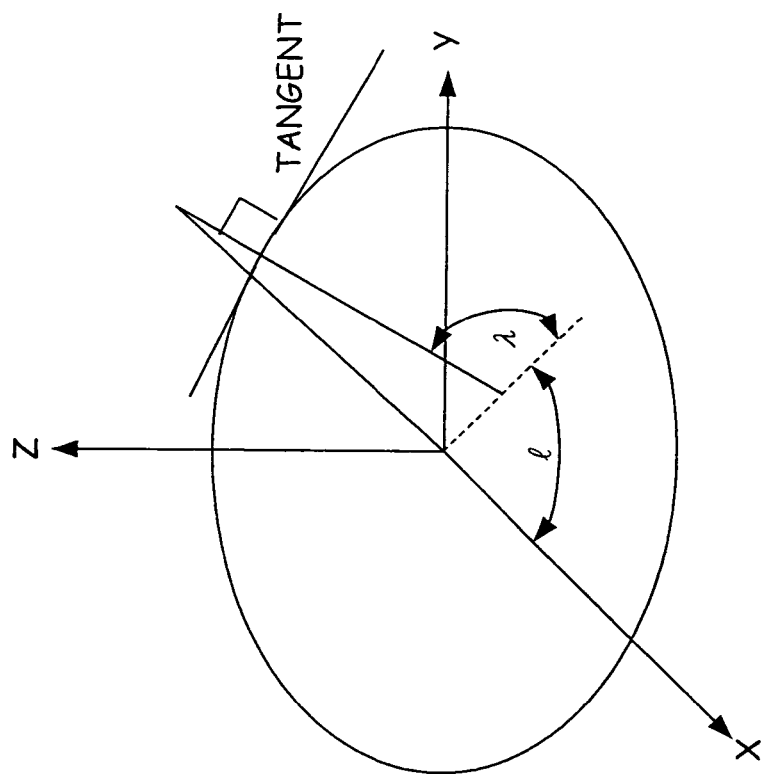
Figures 2, 10:
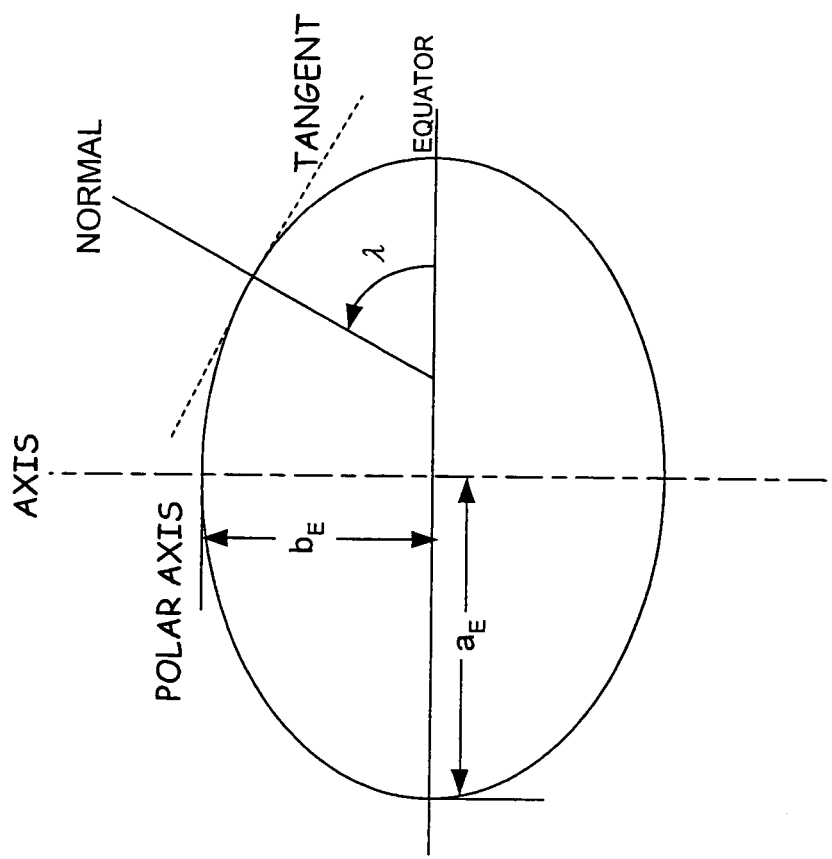
Figures 4, 10:
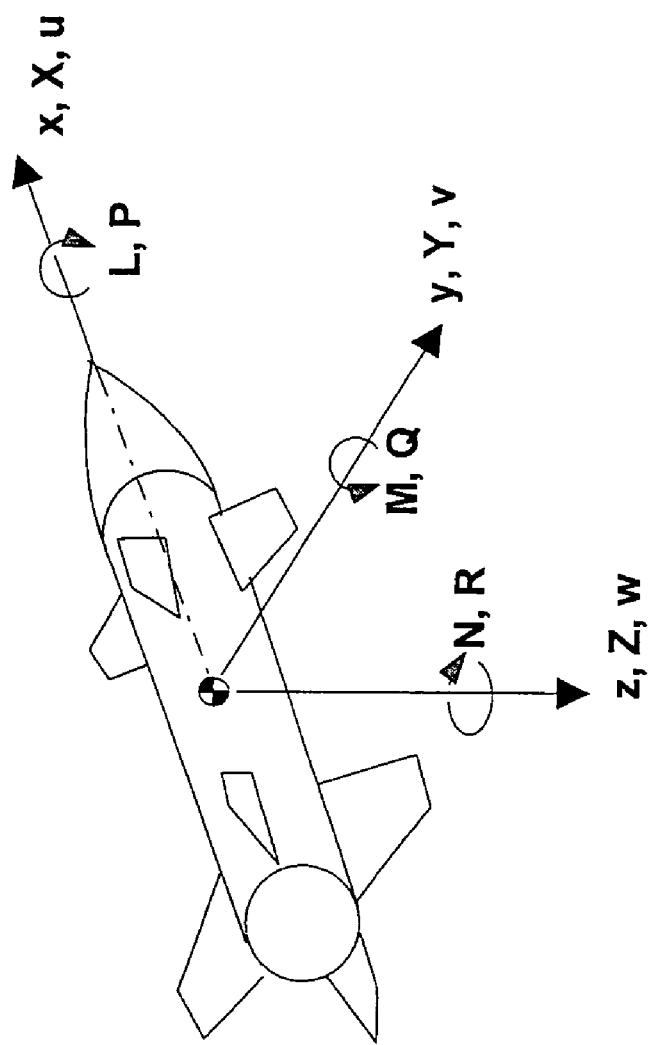

FIG. 10-1 is a diagrammatic representation of an Earth Centered Earth Fixed (ECEF) coordinate frame definition. The ECEF reference frame is oriented with its origin at the earth's center. The x and y axes lie in the equatorial plane with the x-axis passing through the Greenwich Meridian. The z-axis is normal to the x-y plane and passes through the North Pole.

FIGS. 10-2 and 10-3 are diagrammatic representations of a Geodetic coordinate frame definition. The geodetic coordinate frame defines the lines of latitude and longitude along the earth's surface. Geodetic latitude is the angle between the equatorial plane and the normal to the surface of the ellipsoid. Geodetic longitude is the angular rotation relative to the ECEF x-axis in the equatorial plane. Geodetic altitude is the elevation above the ellipsoid surface.

A coordinate reference frame definition that is not illustrated is the local vertical reference frame, which is oriented with its origin at a point along the earth's surface defined by an angular rotation from the ECEF frame (latitude and longitude) and an altitude, h, above the earth's surface. This frame's z-axis is normal to the local tangent of the ellipsoid. The x-y plane lies normal to the z-axis and parallel to the local horizon.

FIG. 10-4 is a schematic representation of a body reference frame. The body reference frame has its origin at the vehicle center of gravity. The y-axis extends out of the right wing of the vehicle, the x-axis extends out the nose of the vehicle, and the z-axis is positive down passing normal to the x-y plane.

Certain embodiments of the present invention involve coordinate frame transformations. For example, a function can be applied to transform geodetic coordinates to ECEF coordinates. In accordance with one embodiment of such a transformation, coordinate waypoints are passed into the UAV flight computer in geodetic coordinates (latitude ($\lambda$), longitude ($\ell$), and altitude (h), Earth semi-major axis ($a_E$), eccentricity e). These waypoint locations are then transformed to ECEF coordinates utilizing a function such as:

$$\vec{P}_{ECEF} = \begin{Bmatrix} \left( \frac{a_E}{\sqrt{1-e^2\sin^2(\lambda)}} + h \right) \cos(\lambda)\cos(\ell) \\ \left( \frac{a_E}{\sqrt{1-e^2\sin^2(\lambda)}} + h \right) \cos(\lambda)\sin(\ell) \\ \left( \frac{a_E(1-e^2)}{\sqrt{1-e^2\sin^2(\lambda)}} + h \right) \sin(\lambda) \end{Bmatrix} \quad \text{Eq. 1}$$

Similarly, ECEF coordinates can be transformed into local vertical coordinates. In accordance with one embodiment of such a transformation, the guidance error equations are formulated in the ECEF reference frame, then converted to the local vertical reference frame for computation of the guidance commands. The ECEF to local vertical transformation matrix can be defined as:

$$T_E^L = \begin{bmatrix} -\sin(\lambda)\cos(\ell) & -\sin(\lambda)\sin(\ell) & \cos(\lambda) \\ -\sin(\ell) & \cos(\ell) & 0 \\ -\cos(\lambda)\cos(\ell) & -\cos(\lambda)\sin(\ell) & -\sin(\lambda) \end{bmatrix} \quad \text{Eq. 2}$$

Local vertical guidance commands can then be transformed into the body reference frame for input to the autopilot through the transformation matrix (pitch angle $\Theta$, yaw angle $\Psi$, roll angle $\Phi$):

$$T_B^L = \quad \text{Eq. 3}$$
$$\begin{bmatrix} \cos\Psi\cos\Theta & \sin\Psi\cos\Theta & -\sin\Theta \\ \cos\Psi\sin\Theta\sin\Phi - \sin\Psi\cos\Phi & \sin\Psi\sin\Theta\sin\Phi + \cos\Psi\cos\Phi & \cos\Theta\sin\Phi \\ \cos\Psi\sin\Theta\cos\Phi + \sin\Psi\sin\Phi & \sin\Psi\sin\Theta\cos\Phi - \cos\Psi\sin\Phi & \cos\Theta\cos\Phi \end{bmatrix}$$

VII. Navigator

In another aspect of the present invention, vehicle state information is provided by a component herein referred to as the navigator component. Navigator components are known in the art to provide information such as, but not limited to, position, velocity, acceleration, angular position and/or angular velocity associated with the vehicle. Some known navigator components incorporate sensor devices such as, but not limited to, a three-axis inertial measurement unit, a GPS receiver, and/or strap-down equation software, and Kalman filter used to estimate the IMU sensor error.

Information output from navigator components is utilized for any of a variety of purposes. For example, the accelerations, angular rates and other similar outputs are illustratively fed into an autopilot system in support of stability-enhancing processes. Position, velocity, angular position and other similar outputs are used by the guidance functionality to aid in decision-making such as, but certainly not limited to, path-regulation.

VIII. Guidance

In another aspect of the present invention, a guidance function is responsible for generating autopilot commands that, when executed, achieve a particular guidance objective. Guidance objectives are designed to satisfy operator interface and mission control requirements and include functions such as, "regulate to a preprogrammed inertial path," "go to and monitor a specified target coordinate," "execute an operator commanded programmed maneuver," "slave to an operator commanded sensor stare command," etc.

Figure 11:
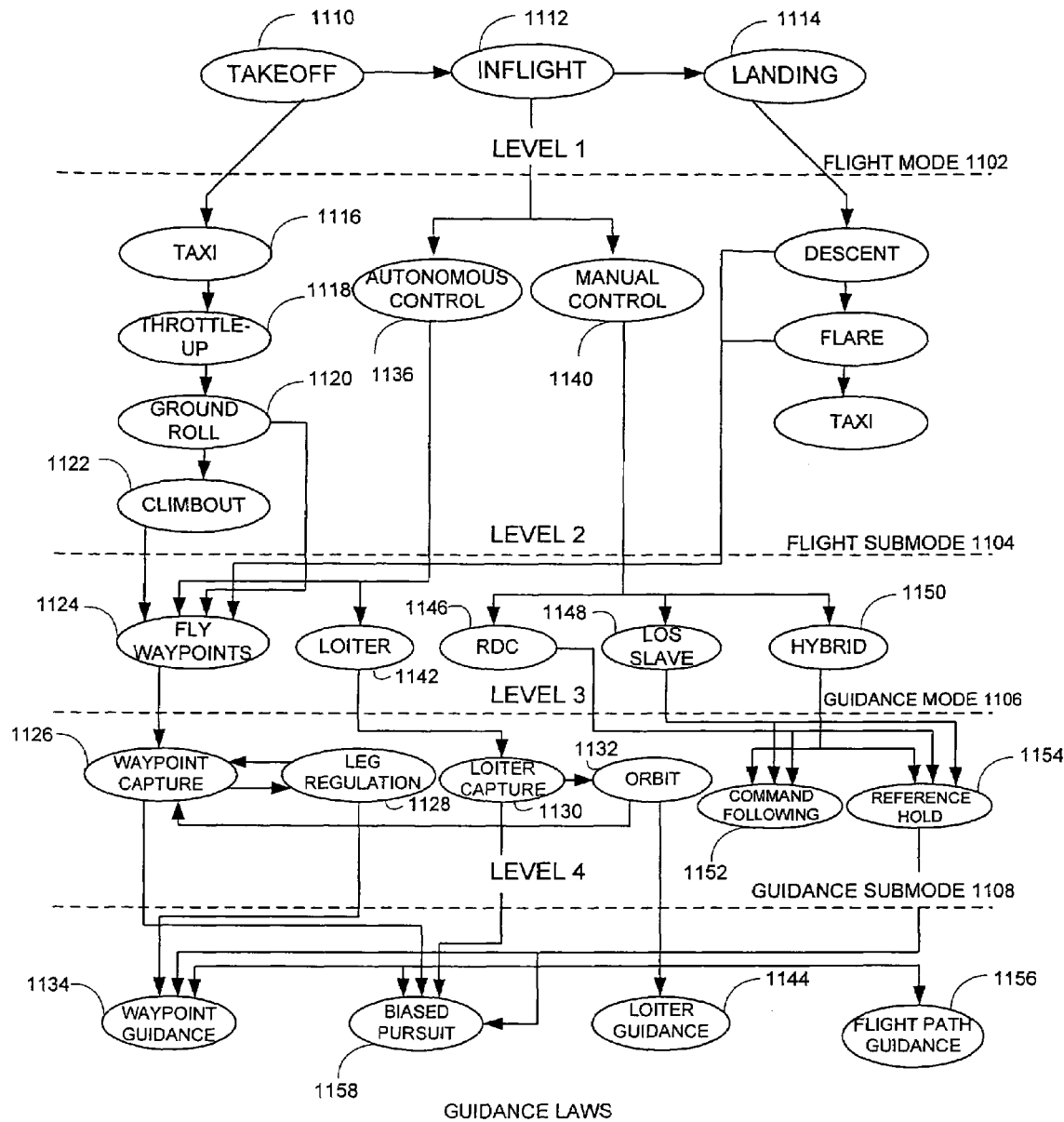
FIG. 11 is a schematic block diagram demonstrating a basic flow structure for various flight mode levels.

FIG. 11, in accordance with one aspect of the present invention, is a schematic block diagram demonstrating a basic flow structure for the various flight mode levels and identifying underlying guidance laws called by the flight management software component. There are an illustrative four levels of operational modes within the vehicle manager: flight mode 1102, flight sub-mode 1104, guidance mode 1106, and guidance sub-mode 1108.

Flight mode 1102 includes three different functions, namely, take-off 1110, inflight 1112, and landing 1114. For take-off 1110, flight sub-mode 1104 includes four primary functions, namely, taxi 1116, throttle-up 1118, ground roll 1120 and climbout 1122. When these four sub-mode functions have been executed, guidance mode 1124 (fly waypoints) is executed. In that regard, waypoint guidance law 1134 is executed including sub-modes 1126 (waypoint capture) and 1128 (leg regulation).

When the flight mode is inflight 1112, the operator can select between flight sub-modes 1136 (autonomous control) and 1140 (manual control). One selectable option for autonomous control is the fly waypoints 1124 guidance mode in accordance with waypoint guidance law 1134. Another selectable autonomous control mode is loiter guidance mode 1142, which is executed in accordance with loiter capture guidance sub-mode 1130 and orbit guidance sub-mode 1132 being subcomponents of loiter guidance law 1144.

Options for manual control 1140 include RDC guidance mode 1146, LOS-slave mode 1148 and hybrid control mode 1150. Each of these manual control modes are related to guidance sub-modes 1152 (command following) and 1154 (reference hold), which are related to flight path guidance law 1156. It should be noted that guidance modes and guidance sub-modes can be combined as indicated to enable a biased pursuit guidance law 1158 in accordance with one aspect of the present invention.

The library of outer-loop guidance modes support both autonomous control as well as simplified manual control. Guidance laws that are within the scope of the present invention and are exploited by the vehicle manager include, but are not limited to, waypoint guidance, loiter guidance, line-of-sight slave control guidance and remote directional command guidance. Various guidance modes invoke these guidance laws to achieve diverse mission objectives. For example, loiter guidance is a guidance law invoked by several difference guidance modes including, but not limited to, programmed route guidance, park guidance, observation point guidance, and moving target tracking guidance.

In one embodiment, the operator at any point during a mission can interrupt the vehicle management software component. The component will illustratively process the operator's inputs and perform the appropriate action, which may include entering a manual control mode, entering an operator specified orbit pattern, or updating and executing a planned navigation route.

The control system design and architecture of the present invention enables a single operator to seamlessly transition between varying levels of control autonomy for an individual vehicle. Such control capability even enables the single operator to effectively manage and control a team of vehicles. In another aspect of the present invention, to support such functionality, a gradient control scheme is provided and utilizes on-board trajectory synthesis techniques to establish an inertial reference trajectory to which a vehicle is regulated.

The gradient control approach is predicated on the use of acceleration feedback in the pitch channel autopilot. As has been alluded to, however, the solution is extensible to platforms that do not employ acceleration feedback, for example through implementation of a mathematical translation or transformation from the acceleration command to the native state command accepted by the native autopilot. Hence, an acceleration autopilot is not implicitly required to adequately satisfy the guidance objectives generated by the presently described variable autonomy control algorithms.

Kinematics provides a motivation for acceleration based vehicle control. Both rectilinear and relative general plane equations of motion relate position and velocity states (translational or angular) to acceleration through mathematically tractable differential equations. The following equations are examples of translational and rotational differential equations formulated as guidance laws for typical navigation and homing guidance:

$$\vec{a}_{cmd} = \omega^2 \Delta \vec{P} + 2\zeta\omega\Delta\dot{\vec{P}} + \vec{g} \qquad \text{Eq. 4}$$

where $\omega$ = guidance law natural frequency $\Delta\vec{P}$ = guidance position error $\zeta$ = guidance law damping ratio $\Delta\dot{\vec{P}}$ = guidance velocity error $\vec{g}$ = gravity (translational-waypoint guidance)

$$R\ddot{\lambda} - 2V\dot{\lambda} = -NV\dot{\lambda} = -a_{cmd} \qquad \text{Eq. 5}$$

where

R=relative range to target $\ddot{\lambda}$=line-of-sight acceleration

V=closing velocity to target $\dot{\lambda}$=line-of-sight rate

N=guidance law gain (rotational-proportional navigation)

Such equations are consistent with fundamental principals of autonomous vehicle guidance and control. The theory behind the autonomy control systems of the present invention illustratively capitalizes on the properties of the differential equations that formulate the desired acceleration commands. Given that the underlying equations of motion that describe physical motion of air vehicles are continuous functions operating over a set of real variables from "negative infinity to positive infinity" (no discontinuities in the function), then it serves that the derivatives of these functions are continuous. Hence, rectilinear acceleration commands can be generated to regulate velocity reference trajectories (first order control law—acceleration is the first derivative of velocity) or position reference trajectories (second order control law—acceleration is the second derivative of position). It can therefore be shown that the transition between derivative control modes is stable, assuming the gains for each corresponding control scheme provide a stable response. Closed-loop stability over mode transitions is then eliminated as a concern and, hence, the transition between control modes is essentially seamless. The following equations illustrate this principal:

Gradient Control Scheme: Eq. 6

$R$ = Input (state to be controlled)
$U$ = Control signal $$U = \frac{\partial^n R}{\partial t^n}, n \text{ is number of derivatives between input and control signal}$$

Example Applications: Eqs. 7 & 8
Case 1: SECOND-ORDER $R$ = Reference path for waypoint guidance($P$)
$U$ = Acceleration command($a$)

$$a = \frac{\partial^2 P}{\partial t^2} \underset{Laplace}{=} (As^2 + Bs + C)P(s) = 0 \underset{Discrete}{\Longrightarrow} \delta \ddot{P} = a = 2\zeta\omega\delta\dot{P} + \omega^2\delta P$$

Case 2: FIRST-ORDER $R$ = Flight path velocity command $\left(\gamma \approx \frac{V_{up}}{|\vec{V}|}\right)$ $U$ = Acceleration command($a$)

$$a = \frac{|\vec{V}|\partial\gamma}{\partial t} \underset{Laplace}{=} |\vec{V}|(As + B)\gamma(s) = 0 \underset{Discrete}{\Longrightarrow} |\vec{V}|\dot{\lambda} = a = \frac{|\vec{V}|}{\tau}\delta\gamma$$

The above examples illustrate waypoint guidance (second order) and flight path angle guidance (first order) laws. The guidance laws can regulate to any mathematically tractable reference path from which position and/or velocity and orientation errors between the vehicle and the path are computed. The reference paths can be generated apriori by a mission planner (waypoint route, for example) or synthesized autonomously by on-board flight control software to achieve a high level objective commanded by an operator (autonomous landing terminal trajectory, for example). This approach provides a control scheme in which an operator can issue commands of varying levels of autonomy without regard for the closed-loop vehicle stability during mode transitions. Applying this scheme, in accordance with one embodiment of the present invention, a baseline set of guidance laws alluded to in FIG. 8 (waypoint guidance, flight path angle guidance, line-of-sight rate guidance, and sensor-slave guidance) provide a core guidance law toolbox upon which the variable autonomy control system described herein is built. Higher level software processing functions then interpret operator commands, sensor inputs, and database inputs and translate these inputs into executable guidance laws that the control system then acts on. In another aspect of the present invention, this design enables robust higher level autonomous control functions within the described VACS framework. Such functions illustratively include, but are not limited to, functions for ground collision avoidance, air collision avoidance ("see & avoid"), ground moving target tracking and following, formation flying (multiple vehicles), and autonomous landing. Autonomous guidance algorithms designed to support the system will now be described in greater detail.

A. Waypoint Guidance

In accordance with one aspect, as is indicated by block 132 in FIG. 1, one provided control mode enables a waypoint guidance control mode. In one embodiment of waypoint guidance, guidance error computations are performed in the ECEF reference frame then rotated into the local vertical reference frame prior to being addressed in the guidance law. The error computations are illustratively separated between a waypoint leg regulation phase and a waypoint leg transition phase. While inertially guiding to a waypoint leg, the guidance errors are illustratively derived by first forming a vector triangle between the vehicle (i.e., the UAV) and the two waypoints that make up the waypoint leg.

Figure 12:
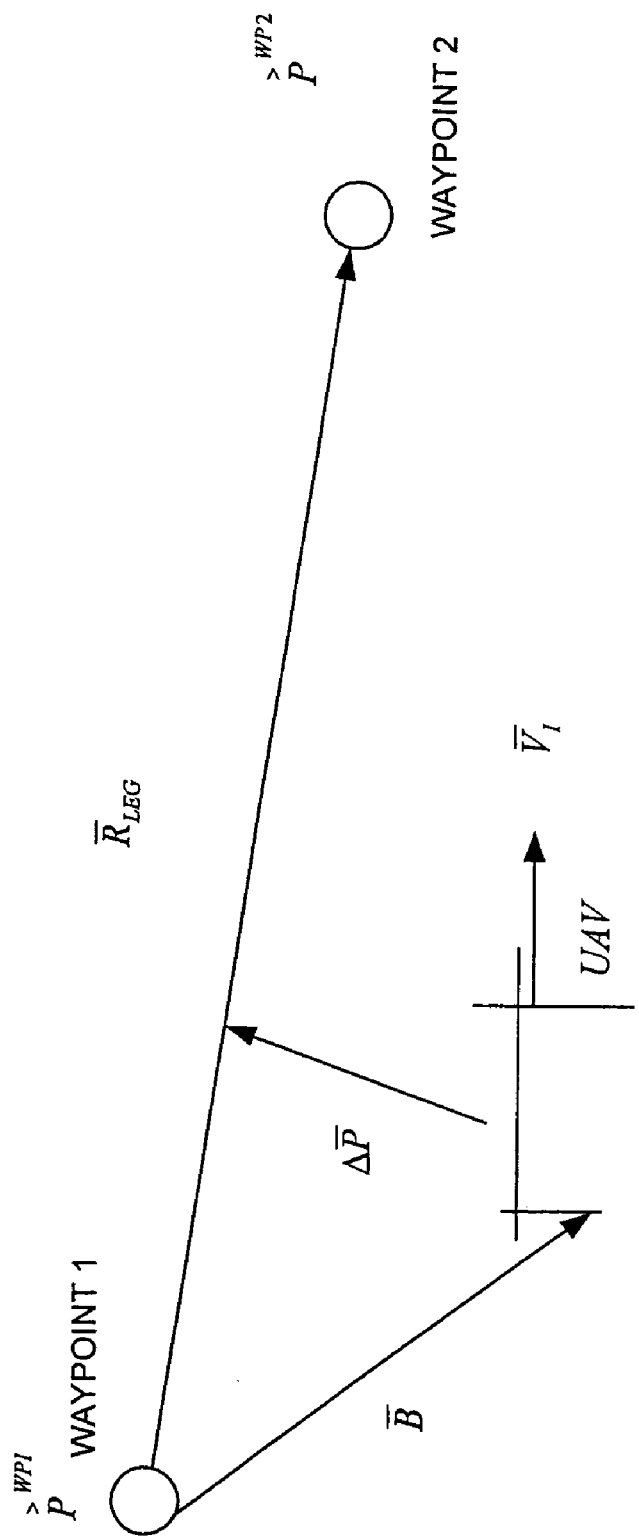
FIG. 12 is a schematic diagram demonstrating waypoint guidance error calculation.

FIG. 12 is a schematic diagram demonstrating waypoint guidance error calculation in accordance with one embodiment of the present invention. The position error ($\Delta \vec{P}$) and the velocity error ($\Delta \vec{V}$) can be computed from the vector triangle shown in the Figure. For example, $$\vec{B} = \vec{P}^{UAV} - \vec{P}^{WP1}$$ Eq. 9

$$\vec{R}_{LEG} = \vec{P}^{WP2} - \vec{P}^{WP1}$$

$$\vec{u}_{LEG} = \frac{\vec{R}_{LEG}}{|\vec{R}_{LEG}|}$$

$$\Delta \vec{P} = \vec{B} - (\vec{B} \cdot \vec{u}_{LEG})\vec{u}_{LEG}$$

$$\Delta \vec{\dot{P}} = \vec{V}_I - (\vec{V}_I \cdot \vec{u}_{LEG})\vec{u}_{LEG}$$

These Eq. 9 calculations provide the solution for horizontal channel guidance errors. A correction must be made, however, to the vertical channel guidance error to account for the earth's curvature.

Figure 13:
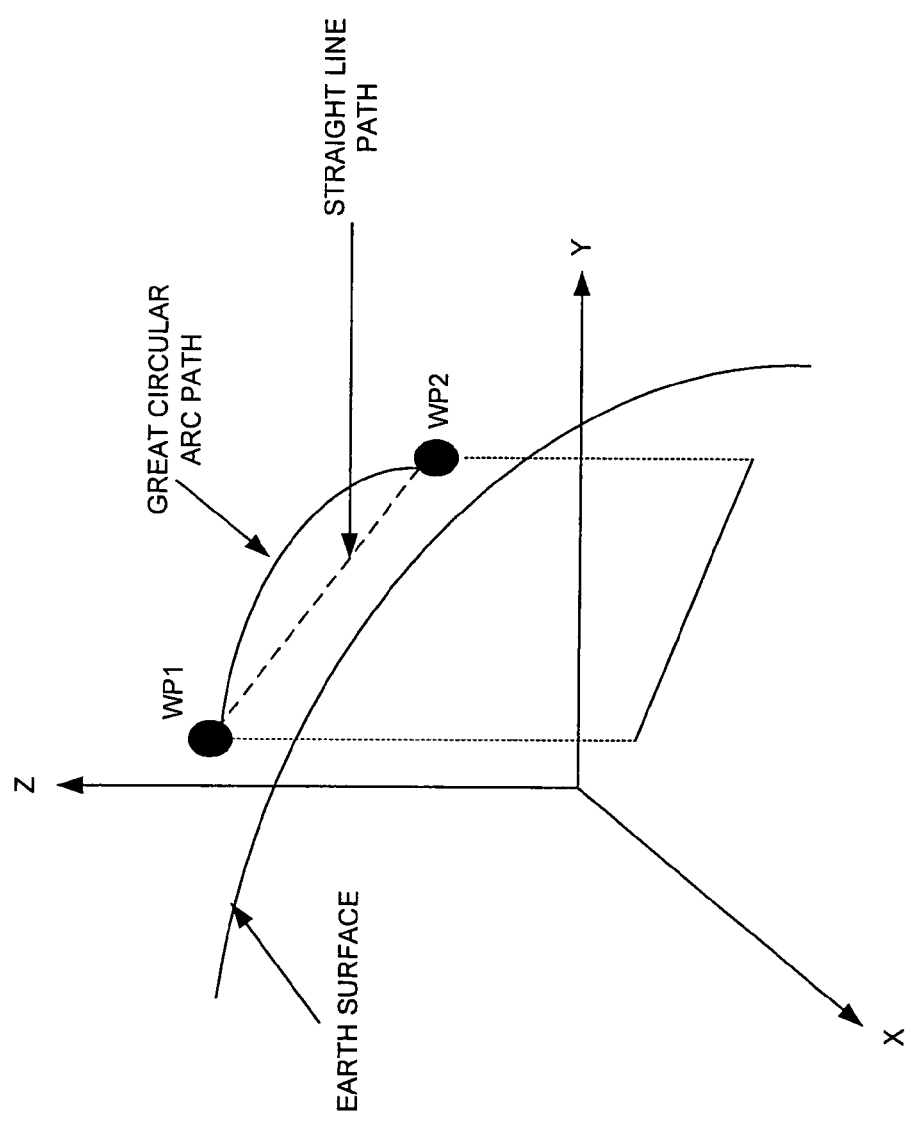
FIG. 13 is a schematic diagram demonstrating the effect that the earth's curvature can have on calculations.

FIG. 13 is a schematic diagram demonstrating that considerable altitude errors can be introduced by failing to account for the earth's curvature. Since the guidance errors are ultimately rotated into the local vertical coordinate frame, a simple solution exists to performing the great circular arc correction. Through recognizing the fact that each waypoint altitude is stored as an ellipsoidal altitude and that the current vehicle ellipsoidal altitude is always available from the navigation solution, the curvature problem can be mathematically eliminated from the altitude error calculation with instantaneous ECEF to local vertical transformation. Simply stated, the altitude error is computed as the error between the current vehicle ellipsoidal altitude and the geodesic line connecting the two waypoints. Although the path is a curved path in the ECEF frame, the instantaneous rotation to the local vertical frame linearizes the problem.

Figure 14:
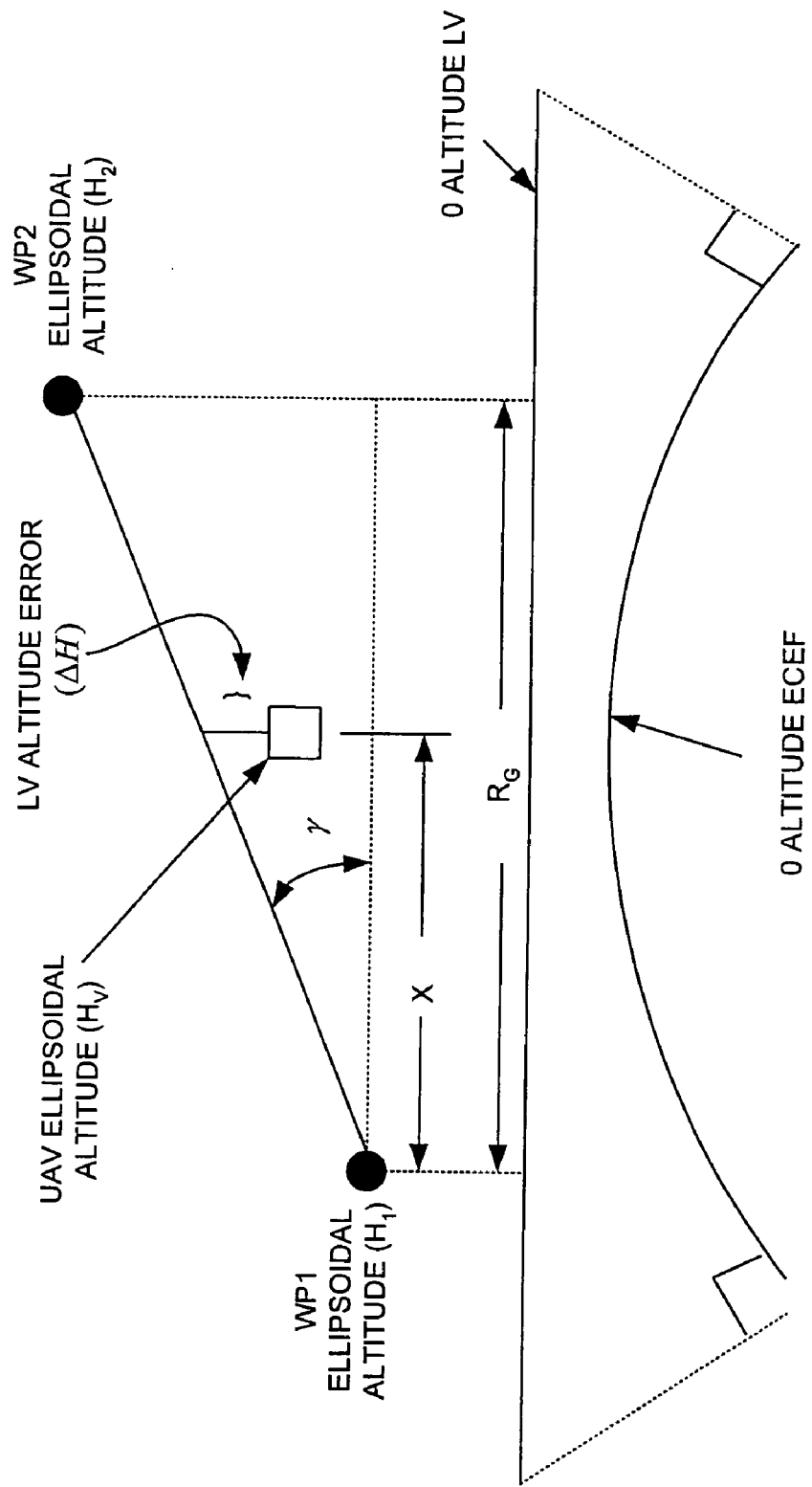
FIG. 14 is a schematic diagram demonstrating altitude error calculation.

FIG. 14 is a schematic diagram demonstrating altitude error calculation in the form of a curvature correction for the vertical guidance error. Using the nomenclature in FIG. 14, the local vertical altitude error (accounting for the earth's curvature) is illustratively computed as:

$$\Delta H = H_v - H_1 - \frac{x}{R_G}(H_2 - H_1)$$ Eq. 10

The local vertical velocity error is calculated as:

$$\Delta \dot{H} = \dot{H}_v - |\vec{V}_I|\sin(\gamma_D)$$ Eq. 11

In accordance with one aspect of the present invention, waypoint leg transition logic is premised on a desire to transition waypoint legs when the horizontal acceleration required to drive the vehicle onto the next waypoint leg heading in the desired waypoint leg direction is a minimum. This requirement is achieved mathematically by transitioning waypoint legs when the dot product of the horizontal position error (relative to the next waypoint leg) and the horizontal acceleration error (relative to the next waypoint leg) is zero. Since it is not guaranteed that this dot product will be identically zero on any given compute cycle, the transition occurs when the sign of this dot product changes from positive to negative.

Figure 15:
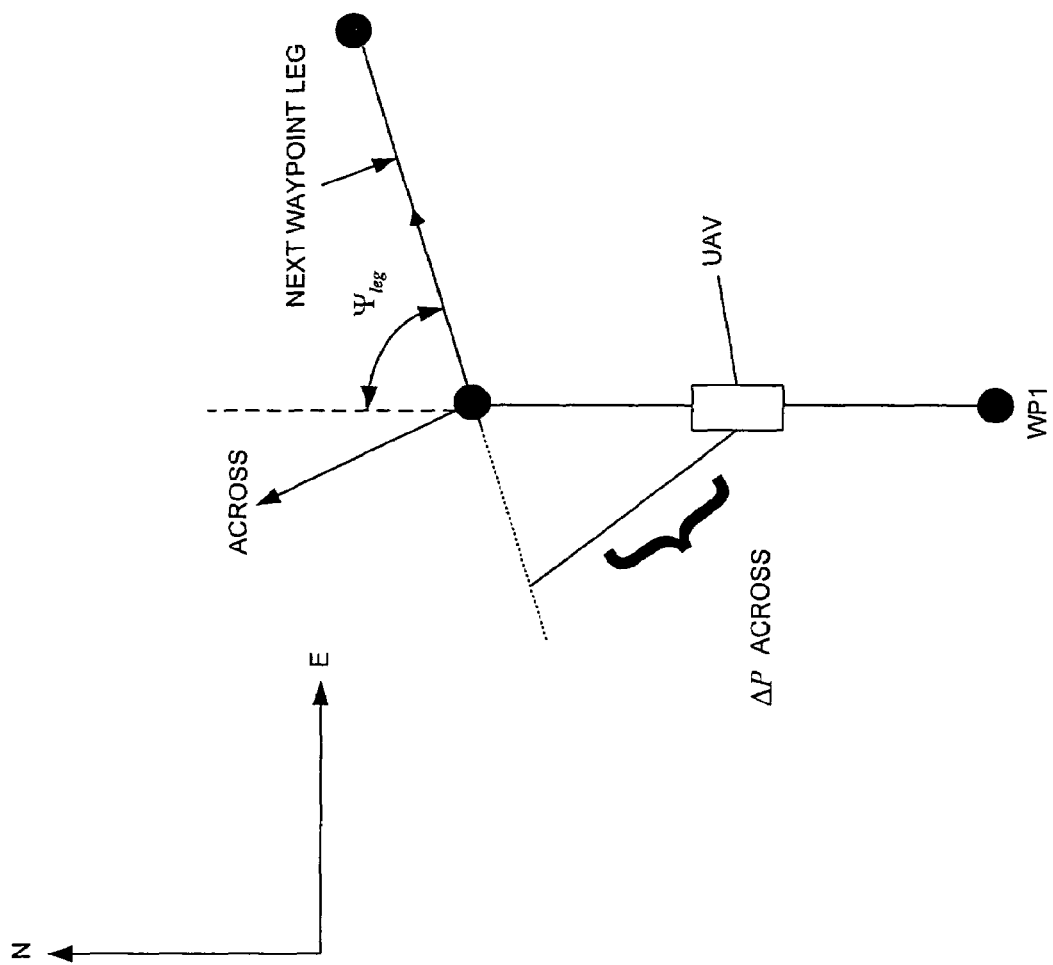
FIG. 15 is a schematic diagram demonstrating one aspect of waypoint leg transition.

FIG. 15 is a schematic diagram demonstrating the waypoint leg transition issue with particular coordinate frames to be utilized in an algorithm designed to address the issue. The waypoint leg transition algorithm begins by computing local vertical guidance errors (position and velocity) and an acceleration command vector relative to the next waypoint leg in the same manner that these errors are computed relative to the current waypoint leg. Next a rotation matrix between the local vertical reference frame (E, N) and the next waypoint leg reference frame (Along, Across) is computed as follows:

$$\begin{Bmatrix} \text{Along} \\ \text{Across} \end{Bmatrix} = \begin{bmatrix} \sin(\Psi_{leg}) & \cos(\Psi_{leg}) \\ \cos(\Psi_{leg}) & -\sin(\Psi_{leg}) \end{bmatrix} \begin{Bmatrix} E \\ N \end{Bmatrix} \quad \text{Eq. 12}$$

The local vertical to waypoint leg reference frame rotation matrix is illustratively denoted $T_L^W$. The position and acceleration errors relative to the next waypoint leg are then rotated into the next waypoint leg reference frame:

$$\Delta \vec{P}_W = T_L^W \Delta \vec{P}_{LV}$$

$$\Delta \vec{a}_{cW} = T_L^W \vec{a}_{cLV} \quad \text{Eq. 13}$$

The waypoint leg transition illustratively occurs when $\Delta P_{Across} a_{c_{Across}} \leq 0$.

In accordance with one aspect of the present invention, an enhanced waypoint guidance algorithm is applied to achieve improved path regulation during 3D waypoint turns. Issues arise when two adjoining waypoint segments have different vertical and horizontal slopes, requiring the vehicle to "turn" in both the horizontal and vertical channels. These two waypoint segments form a plane ('two intersecting lines form a plane'). In accordance with one embodiment, the parameters for this plane are computed and the vehicle is commanded to perform its turn in that plane.

Figure 16:
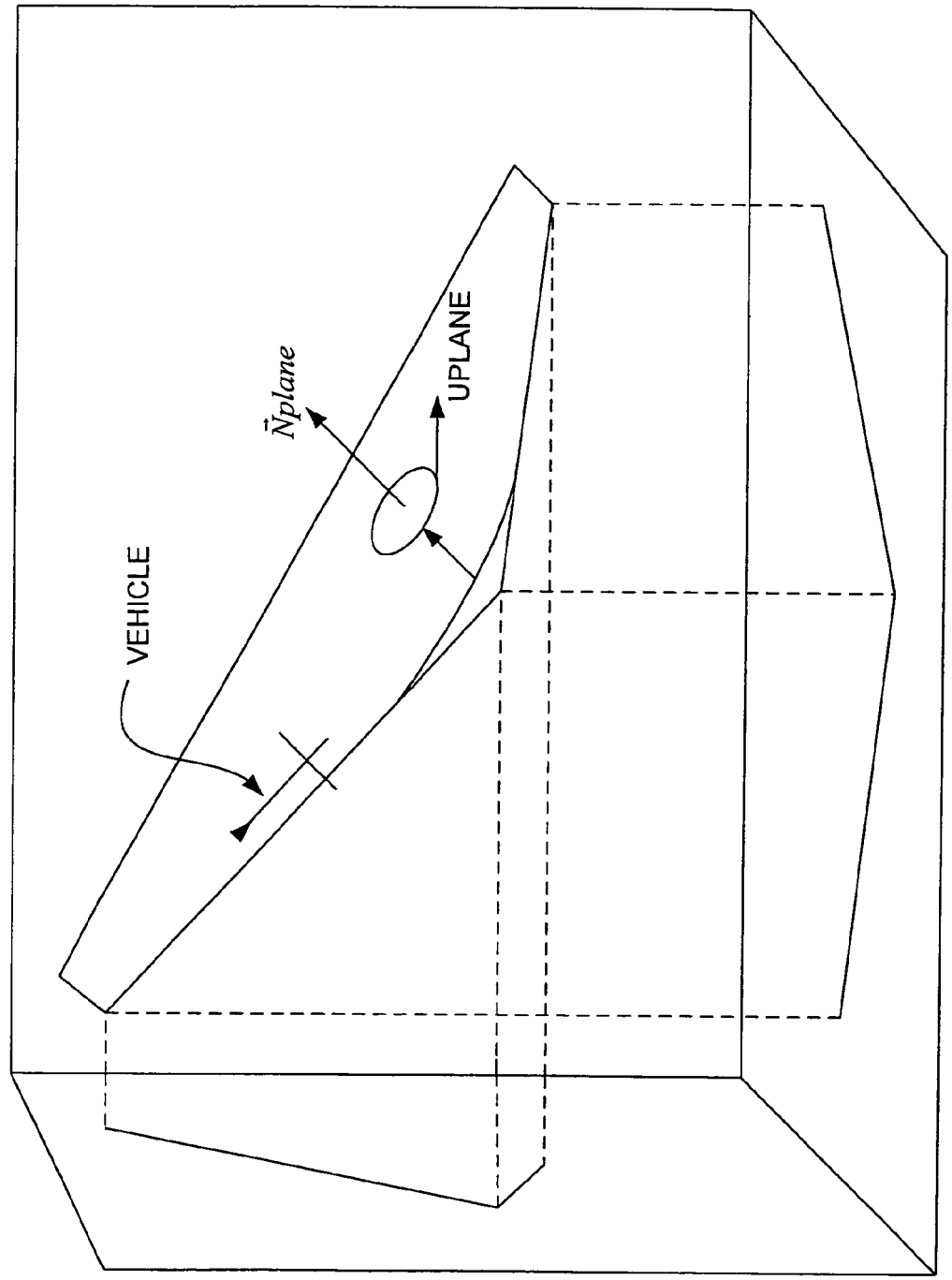
FIG. 16 is a schematic diagram demonstrating a vehicle turn.

FIG. 16 is a schematic diagram demonstrating the concept of commanding the vehicle to perform its turn in the derived plane. In accordance with one embodiment, the control law used during the 3D planar turn is:

$$\vec{a}_{cmd} = -\left(\frac{V^2}{R}\right) \vec{U}_{plane} + \omega^2 \Delta \vec{P} + 2\xi\omega\Delta\vec{V} + g\vec{U}p \quad \text{Eq. 14}$$

where $$\Delta \vec{P} = \vec{R} + R_{turn} \vec{u}_{plane}$$

$$\Delta \vec{V} = (\vec{V} \cdot \vec{n}_{plane}) \vec{n}_{plane} + (\vec{V} \cdot \vec{u}_{plane}) \vec{u}_{plane}$$

$R_{turn}$ = Vehicle turn radius $\vec{R}$ = relative distance between vehicle and turn center The turn radius is illustratively vehicle dependent and the planar parameters (plane center location, plane normal vector, and plane unit vector) are all illustratively computed using basic analytical geometry. This algorithm is illustratively advantageous at least in that it promotes generality for precision path control across a broad class of UAV's.

The waypoint guidance system is illustratively organized as a linked list of events augmented with smooth turn and leg propagation logic at each station. An event is illustratively, but not limited to, a way point, an orbit pattern, a payload command (e.g., point camera at location x) or some other event. This provides the capability to easily edit the mission plan from the graphical display both during pre-flight mission planning and while the UAV is in the air. If the operator discovers an unknown hazard in the pre-planned flight-path, then he can either "drag-and-drop" existing events or he can delete and insert new events as necessary.

For illustrative purposes only, table 1 is provided as a sample collection of event parameters.

TABLE 1

| Event Type | Waypoint, FIG. 8, racetrack, ellipse (circle is racetrack with equal length and width) |
|---|---|
| Waypoint latitude | Geodetic latitude of waypoint or orbit pattern center |
| Waypoint longitude | Geodetic latitude of waypoint or orbit pattern center |
| Waypoint Altitude | Ellipsoidal altitude of waypoint or orbit pattern center |
| Waypoint Speed | Speed setting at waypoint location |
| Orbit pattern length | Length of desired orbit pattern |
| Orbit pattern width | Width of desired orbit pattern |
| Orbit pattern orientation | Rotation angle of orbit pattern (relative to true North) |
| Number of orbit laps | Desired number of orbit laps |
| Time in orbit | Desired time to maintain orbit pattern (overrides orbit laps if greater than minimum threshold) |
| Orbit pattern center offset | Offset vector of orbit pattern center from known target location |

B. Loiter Control

In accordance with one aspect of the present invention, as is indicated by block 134 in FIG. 1, one provided control mode enables an operator to loiter a vehicle over a given station, for example, to monitor a desired surveillance point. The system illustratively enables the operator to either preprogram a set of orbit patterns embedded within a waypoint route or dynamically insert orbit patterns into an existing route in real-time. The operator can illustratively set loiter parameters such as length, width, and orientation (i.e., heading) of the orbit pattern with a simply controlled input operation (e.g., mouse controlled click-and-drag operation on a 2D map displayed as part of the user interface). In accordance with one embodiment, a set of relief or hand-off park modes is also provided in which the vehicle will automatically enter into a default racetrack, a figure-8, or an elliptical orbit pattern upon command from the operator.

Accordingly, one embodiment of the present invention pertains to system support for an elliptical orbit pattern. The system illustratively enables the operator to select an oval or a constant radius (circular) loiter pattern. In accordance with one embodiment, along with an operator selectable offset vector for the loiter pattern centroid, the operator is also illustratively provided with the capability to select a loiter pattern "heading" relative to north. For circular patterns this option has little value. For elliptical patterns, however, the latter selection option provides the operator with an ability to adjust a loiter pattern to fit virtually any desired geographic location, such as a country's border or a canyon.

In accordance with one aspect of the present invention, loiter guidance is achieved through two basic guidance laws: 1) Biased pursuit guidance law used to drive the vehicle onto a desired loiter pattern (illustratively referred to herein as loiter capture); and 2) Elliptical guidance law which serves as an inertial path controller designed to slave the vehicle to an elliptical loiter pattern (illustratively referred to herein as loiter guidance).

Figure 17:
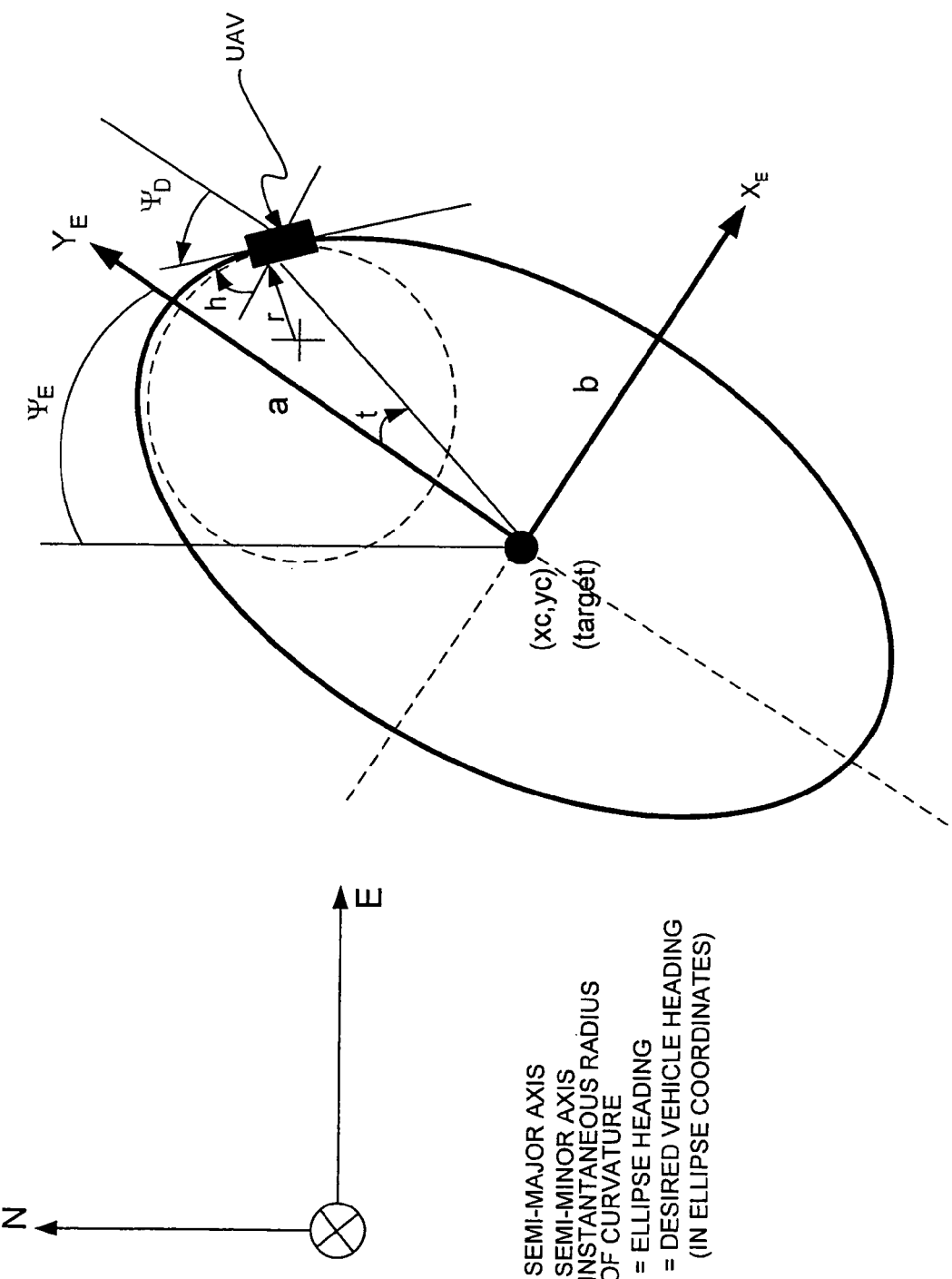
FIG. 17 is a schematic diagram defining parameters and coordinate frames used to support an elliptical loiter guidance law.

FIG. 17, in accordance with one aspect of the present invention, is a schematic diagram defining parameters and coordinate frames used to construct the elliptical loiter guidance law. The desired surveillance point and ellipse center offset, semi-major axis, and semi-minor axis are either pre-programmed into the UAV flight software or input by the operator real-time during a mission. Once the UAV captures the desired loiter pattern, the loiter guidance law is invoked. The loiter guidance error equations are computed in the ellipse reference frame. This frame is defined as $(x_E, y_E)$ in FIG. 17. The transformation matrix from the local vertical reference frame to the ellipse reference frame $(T_{LV}^E)$ is computed as:

$$\begin{Bmatrix} x_E \\ y_E \\ z_E \end{Bmatrix} = \begin{bmatrix} \cos(\Psi_E) & -\sin(\Psi_E) & 0 \\ \sin(\Psi_E) & \cos(\Psi_E) & 0 \\ 0 & 0 & 1 \end{bmatrix} \begin{Bmatrix} E \\ N \\ U \end{Bmatrix} \quad \text{Eq. 15}$$

The transformation matrix from the ECEF frame to the ellipse frame is then computed as:

$$T_{ECEF}^E = T_{LV}^E T_{ECEF}^{LV} \quad \text{Eq. 16}$$

The position of the vehicle is computed relative to the surveillance point in ellipse coordinates as follows:

$$\vec{P}_{rel}^E = T_{ECEF}^E (\vec{P}_{UAV}^{ECEF} - \vec{P}_S^{ECEF}) \quad \text{Eq. 17}$$

where $\vec{P}_{UAV}^{ECEF}$=ECEF UAV position $\vec{P}_S^{ECEF}$=ECEF surveillance point location Consistent with basic analytic geometry, the equation for an ellipse can be written in parametric coordinates:

$$x_E = x_c + b\sin(t); \quad y_E = y_c + a\cos(t) \quad \text{Eq. 18}$$

Utilizing this relationship and assuming that the vehicle is near the desired ellipse, the instantaneous ellipse parametric angle (t) is computed as $$t = \tan^{-1}\left(\frac{a(P_{rel_x}^E - x_c)}{b(P_{rel_y}^E - y_c)}\right) \quad \text{Eq. 19}$$

It is important to emphasize the assumption that the vehicle is near the desired loiter pattern. This is the assumption that drives the requirement of a second guidance law (loiter capture) to guide the vehicle onto the ellipse. In accordance with one embodiment, "Near the ellipse" is quantified in terms of relative heading and horizontal ground distance. The guidance software is configured to consider the vehicle to be near the ellipse if the horizontal ground distance between the vehicle and the ellipse surface is less than a predetermined distance threshold (e.g., 0.1 nm) and the relative heading error between the vehicle and the ellipse tangent is less than a predetermined angular threshold (e.g., 10 deg.).

Having computed the instantaneous parametric angle, the desired vehicle position is computed using the ellipse parametric equations:

$$\vec{P}_D^E = \begin{Bmatrix} x_c + b\sin(t) \\ y_c + a\cos(t) \\ 0 \end{Bmatrix} \quad \text{Eq. 20}$$

The desired heading in ellipse coordinates is then computed as:

$$\Psi_D = \tan^{-1}\left(\frac{a^2(P_{D_x}^E - x_c)}{b^2(P_{D_y}^E - y_c)}\right) - \pi \quad \text{Eq. 21}$$

The associated desired inertial velocity vector is then computed:

$$\vec{V}_D^E = T_{LV}^E \begin{Bmatrix} |\vec{V}_I|\sin(\Psi_D) \\ |\vec{V}_I|\cos(\Psi_D) \\ 0 \end{Bmatrix} \quad \text{Eq. 22}$$

Note that a constant altitude loiter is illustratively assumed. The guidance position and velocity errors in local vertical coordinates are computed as follows:

$$\Delta \vec{P}^{LV} = [T_{LV}^E]^T (\vec{P}_{rel}^E - \vec{P}_D^E)$$

$$\Delta \vec{V}^{LV} = [T_{LV}^E]^T (\vec{V}_I^E - \vec{V}_D^E) \quad \text{Eq. 23}$$

where $\vec{V}_I^E$=Inertial velocity vector in ellipse coordinates

An instantaneous radius of curvature ($\rho$) can be computed at each point along the ellipse. This curvature vector is normal to the ellipse tangent, which defines the heading to which the vehicle will align the inertial velocity vector. Because the vehicle is slaved to the ellipse, the instantaneous radius of curvature of the ellipse is identically equal to the instantaneous vehicle horizontal turn radius. Hence the ellipse radius of curvature can be used to augment the guidance law, as it will provide the desired steady-state horizontal centripetal acceleration. The radius of curvature is computed as:

$$\rho = \frac{[b^2\cos^2(t) + a^2\sin^2(t)]^{3/2}}{ab} \quad \text{Eq. 24}$$

The desired centripetal acceleration command in local vertical coordinates can then be computed as:

$$\vec{a}_{cent} = [T_{LV}^E]^T \left(\frac{|\vec{V}_I|^2}{\rho}\right) \begin{Bmatrix} -\sin(\eta) \\ -\cos(\eta) \\ 0 \end{Bmatrix} \quad \text{Eq. 25}$$

The local vertical acceleration command vector is computed as:

$$\vec{a}_c^{LV} = \vec{a}_{cent} - k_p \Delta \vec{P}^{LV} - k_v \Delta \vec{V}^{LV} - \vec{g}^{LV} + k_p k_{FF_{2,1}} \vec{V}_c$$

$\vec{V}_c = [0 \; 0 \; V_c]^T$=Airspeed command $\vec{g}^{LV} = [0 \; 0 \; -9.81]^T \quad \text{Eq. 26}$ This acceleration command vector is then processed through a translation layer and/or is delivered to the autopilot system.

In accordance with one aspect of the present invention, the loiter capture algorithm is designed to drive the vehicle onto the desired loiter pattern from any location outside of the planned pattern. In accordance with one embodiment, the loiter capture algorithm simultaneously drives the vehicle onto the desired ellipse at the desired heading utilizing the biased pursuit guidance law and the ellipse tangent lines.

Figure 18:
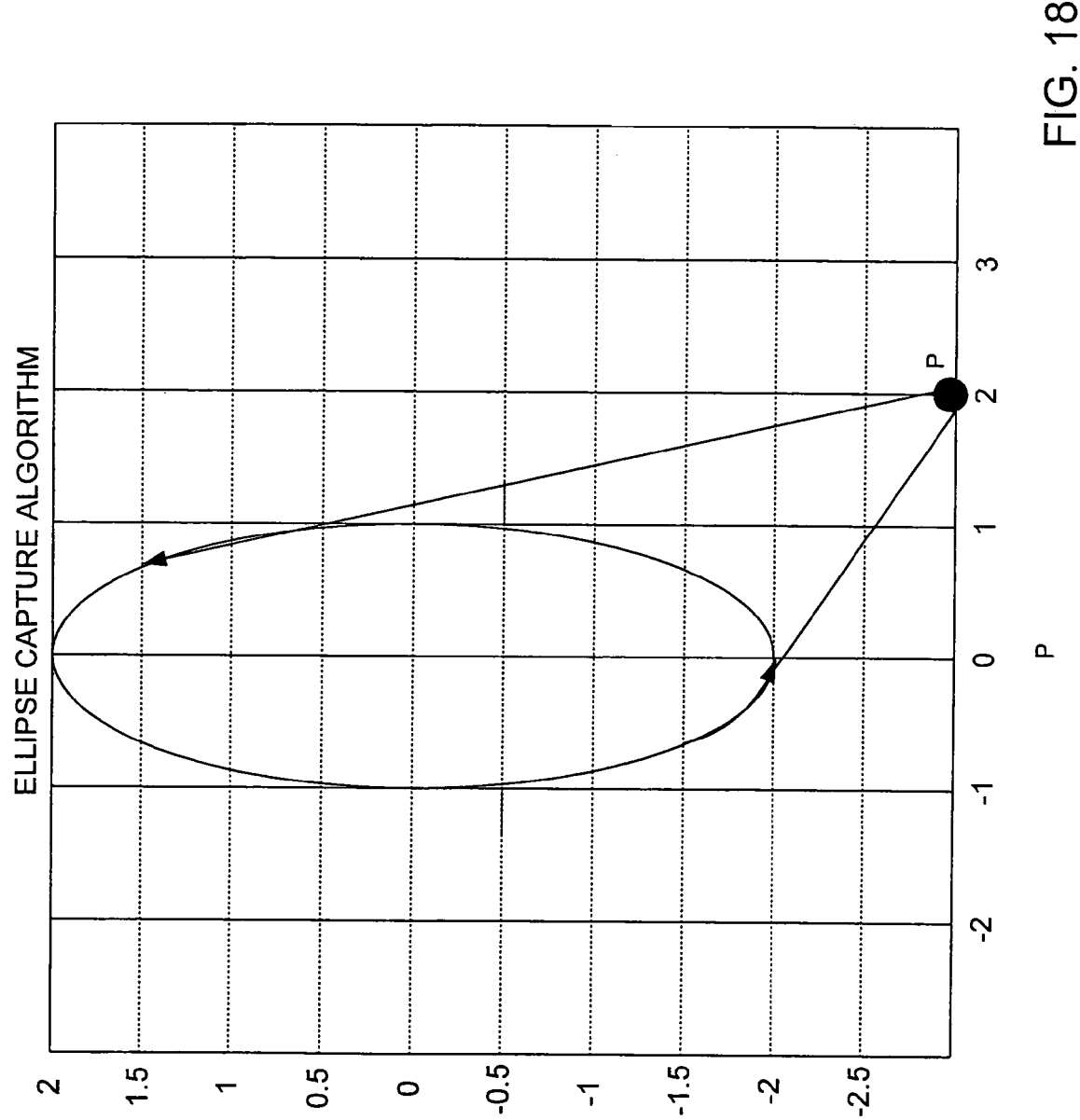
FIG. 18 is a schematic chart demonstrating that for any point P outside of an ellipse there exist two lines passing tangent to the ellipse and containing the point P.

FIG. 18, in accordance with one embodiment, is a schematic chart demonstrating that, for any point, P, outside of the ellipse there exist two lines passing tangent to the ellipse and containing the point P. The arrows in the figure indicate a desired direction of travel along the ellipse. Although there are two tangent line solutions, accounting for the desired direction of travel reduces the problem to one solution. Upon entrance into loiter capture, the guidance algorithm illustratively solves for the ellipse tangent line that will bring the vehicle onto the ellipse headed in the desired direction of travel along the ellipse. A biased pursuit guidance law is then illustratively used to control the vehicle along the computed tangent line.

In accordance with one embodiment, the position of the vehicle is first computed relative to the loiter pattern center in ellipse coordinates as follows:

$$\vec{P}_{rel}^E = T_{ECEF}^E (\vec{P}_{UAV}^{ECEF} - \vec{P}_S^{ECEF}) - \vec{P}_{center} \quad \text{Eq. 27}$$

where $\vec{P}_{UAV}^{ECEF}$ = ECEF UAV position $\vec{P}_S^{ECEF}$ = ECEF surveillance point location $\vec{P}_{center}$ = ellipse center location relative to surveillance point in ellipse coordinates The tangent point on the ellipse is then computed:

$$x_t = \begin{cases} -\dfrac{b\sqrt{y_v^2 - a^2}}{y_v} & x_v = 0 \\[2ex] -\dfrac{b^2\left(-1 + \dfrac{1}{2}\dfrac{y_v\left(2b^2 y_v + 2\sqrt{a^2 x_v^4 - a^2 x_v^2 b^2 + b^2 y_v^2 x_v^2}\right)}{a^2 x_v^2 + b^2 y_v^2}\right)}{x_v} & x_v > 0 \\[3ex] -\dfrac{b^2\left(-1 + \dfrac{1}{2}\dfrac{y_v\left(2b^2 y_v - 2\sqrt{a^2 x_v^4 - a^2 x_v^2 b^2 + b^2 y_v^2 x_v^2}\right)}{a^2 x_v^2 + b^2 y_v^2}\right)}{x_v} & x_v < 0 \end{cases} \quad \text{Eq. 28}$$

$$y_t = \begin{cases} \dfrac{a^2}{y_v} & x_v = 0 \\[2ex] \dfrac{1}{2}\dfrac{\left(2b^2 y_v + 2\sqrt{a^2 x_v^4 - a^2 x_v^2 b^2 + b^2 y_v^2 x_v^2}\right)a^2}{a^2 x_v^2 + b^2 y_v^2} & x_v > 0 \\[2ex] \dfrac{1}{2}\dfrac{\left(2b^2 y_v - 2\sqrt{a^2 x_v^4 - a^2 x_v^2 b^2 + b^2 y_v^2 x_v^2}\right)a^2}{a^2 x_v^2 + b^2 y_v^2} & x_v < 0 \end{cases}$$

where $x_v = P_{rel_x}^E$ = vehicle x position relative to ellipse center
$y_v = P_{rel_y}^E$ = vehicle y position relative to ellipse center The desired heading is then computed as:

$$\Psi_D = \tan^{-1}\left(\dfrac{a^2 x_t}{b^2 y_t}\right) - \pi \quad \text{Eq. 29}$$

The horizontal acceleration command is formulated in the ellipse capture bearing reference frame. Hence a transformation matrix from the ellipse reference frame to the capture bearing reference frame ($T_E^B$) is computed.

$$T_E^B = \begin{bmatrix} \cos(\Psi_D) & -\sin(\Psi_D) & 0 \\ \sin(\Psi_D) & \cos(\Psi_D) & 0 \\ 0 & 0 & 1 \end{bmatrix} \quad \text{Eq. 30}$$

The vehicle heading error relative to the ellipse capture bearing is computed as:

$$\Delta\Psi = \Psi_D - \Psi_t + \Psi_{Etrn} \quad \text{Eq. 31}$$

where $\Psi_t$ = vehicle ground track angle
$\Psi_E$ = ellipse heading relative to north The position error relative to the ellipse tangent point is computed in the capture bearing reference frame.

$$\Delta \vec{P}^B = T_E^B \begin{Bmatrix} P_{rel_x}^E - x_t \\ P_{rel_y}^E - y_t \\ P_{rel_z}^E \end{Bmatrix} \quad \text{Eq. 32}$$

The horizontal acceleration command is computed using the biased pursuit guidance law:

$$a_{c_h} = -k_P \Delta P_x^B + k_v |\vec{V}_I| \Delta\Psi \quad \text{Eq. 33}$$

The total local vertical acceleration command vector is computed as follows:

$$\vec{a}_c^{LV} = [T_{LV}^E]^T [T_E^B]^T \begin{Bmatrix} a_{c_h} \\ 0 \\ k_P \Delta P_z^B - k_v V_{I_z} + |g| + k_P k_{FF_{2.1}} V_c \end{Bmatrix} \quad \text{Eq. 34}$$

where $V_c$ = Airspeed command
$|g| = 9.81$

This acceleration command vector is then processed through a translation function that generates native vehicle autopilot commands.

Figure 19:
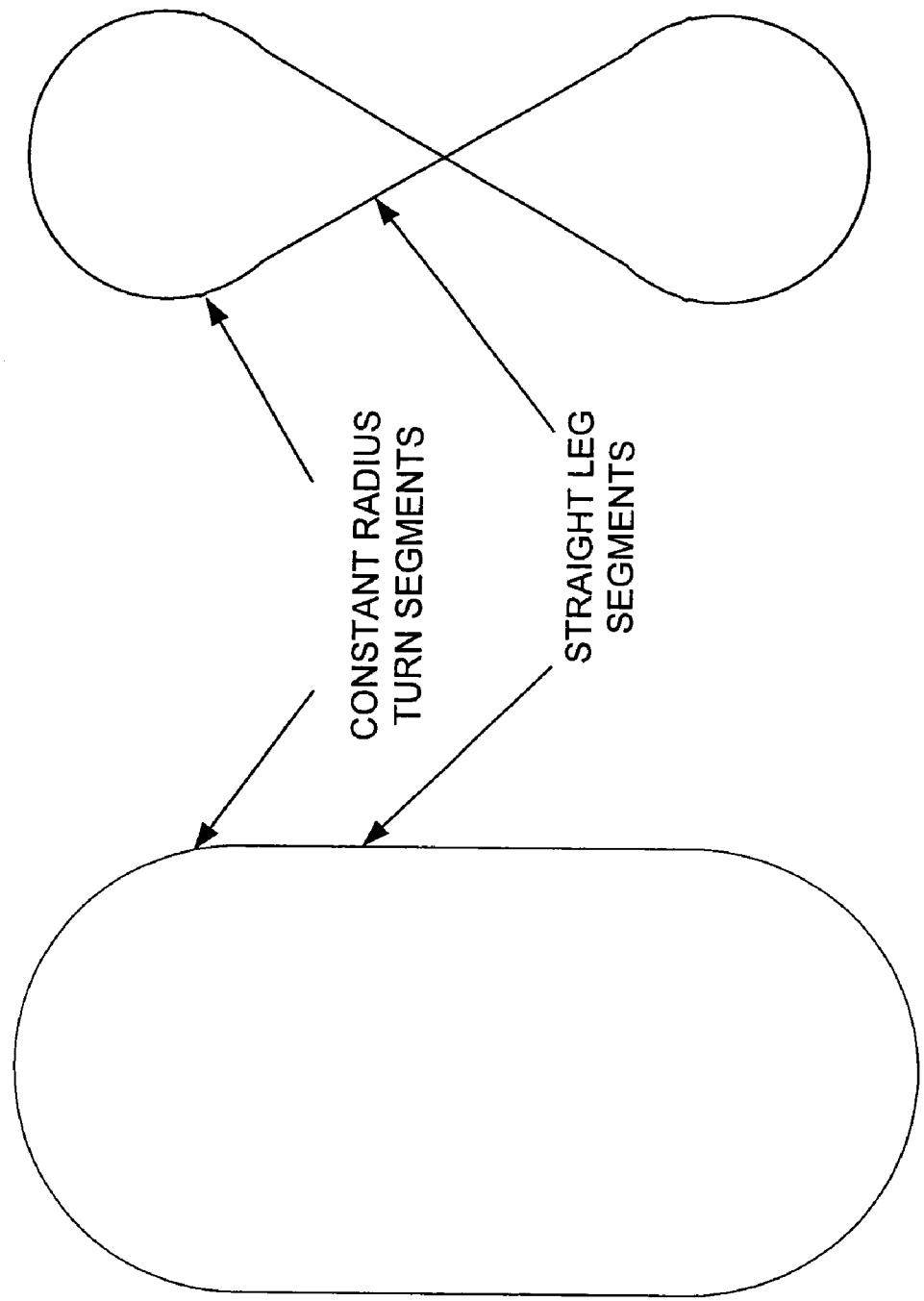
FIG. 19 is a schematic diagram demonstrating segments associated with racetrack and Fig. 8 patterns.

As has been alluded to, the present invention also accommodates racetrack and figure-8 path orbit control. FIG. 19 is a schematic diagram demonstrating various segments of the racetrack and figure-8 patterns.

In one embodiment, the guidance laws used for racetrack orbit patterns are a combination of the waypoint guidance laws and the ellipse guidance laws.

The waypoint guidance law is used during the straight leg segments of the orbit patterns and the ellipse guidance law is used during the turn segments of the orbit patterns. The turn segments are constant radius; therefore the conic equations are simplified over that of the ellipse.

In one aspect of the present invention, the description will now turn to an explanation of mathematical algorithms (step-by-step) for computing a desired vehicle location along the orbit pattern inertial path. This desired location is illustratively an instantaneous point in three-dimensional space that is used to formulate guidance errors. The guidance algorithms for the racetrack and figure-8 patterns illustratively follow the same processing as the ellipse guidance law with slight computational variations that can be noted in the calculations that follow. These calculations are based on the orbit pattern reference point and orbit pattern size and orientation selected by the operator either graphically during real-time route editing or apriori during mission planning. The vehicle enters and exits an orbit pattern via an entrance path and an exit path, respectively. The entrance path to an orbit pattern and the exit path from the orbit pattern are defined as follows: 1) The path from the waypoint preceeding an orbit pattern to the orbit pattern is defined as the tangent line to the orbit pattern that passes through the waypoint (algorithmic computations defined below); and 2) The path from the orbit pattern to the waypoint proceeding the orbit pattern is defined as the tangent line to the orbit pattern that passes through the waypoint (algorithmic computations defined below). The orbit pattern desired location computations are defined below. The coordinate frame definitions and transformations were previously defined.

In accordance with one embodiment, the processing steps for orbit pattern desired location computations proceed as follows:

STEP ONE—Compute the ECEF position of the orbit pattern reference point:

$$\vec{P}_{ref}^{ECEF} = geo2ecef(\lambda, \ell, h) \quad \text{Eq. 35}$$

where $\vec{P}_{ref}^{ECEF}$=ECEF position vector of reference point
$\lambda$=Geodetic latitude of reference point
$\ell$=Geodetic longitude of reference point
h=Ellipsoidal altitude of reference point NOTE: "geo2ecef" represents the coordinate transformation defined herein within the Section entitled "Coordinate Frame Definitions"

STEP TWO—Compute the ECEF position of the orbit pattern centroid using the local vertical offset vector (the vertical component of this offset vector is zero).

$$\vec{P}_c^{ECEF} = \vec{P}_{ref}^{ECEF} + [T_{ECEF}^{LV}]^T \vec{P}_{offset} \quad \text{Eq. 36}$$

where $T_{ECEF}^{LV}$=Local vertical to ECEF transformation matrix
$\vec{P}_{offset}$=Local vertical offset vector (vertical component is zero)

STEP THREE—The (x,y) coordinates of the orbit pattern relative to the orbit pattern centroid at the current angle, t, in the orbit pattern reference frame are computed as follows (the z-component of the vector is zero; a is the orbit pattern semi-major axis length and b is the orbit pattern semi-minor axis length):

$$\Delta P_x^{ELL} = b\sin(t_i) \quad \text{Eq. 37}$$

$$\Delta P_y^{ELL} = \begin{cases} a\cos(t_i) & \text{ellipse} \\ a - b(1 - \cos(t_i)) & \{\text{racetrack} \ \& \ -\frac{\pi}{2} \le t \le \frac{\pi}{2}\} \\ -a + b(1 - \cos(t_i)) & \text{otherwise} \end{cases}$$

where $$\zeta = \cos^{-1}\left(\frac{b}{a-b}\right)$$

STEP FOUR—Rotate the orbit pattern coordinate into the ECEF reference frame:

$$\vec{P}^{ECEF} = \vec{P}_c^{ECEF} + [T_{ECEF}^E]^T \Delta \vec{P}^{ELL} \quad \text{where} \quad \text{Eq. 38}$$

$$\vec{P}^{ELL} = \begin{bmatrix} \Delta P_x^{ELL} \\ \Delta P_y^{ELL} \\ 0 \end{bmatrix}$$

$[T_{ECEF}^E]^T$ = Transpose of ECEF to ellipse coordinate transformation matrix STEP FIVE—Compute the latitude and longitude of the orbit pattern coordinate:

$$(\lambda_i, \ell_i, h_i) = ecef2geo(\vec{P}^{ECEF}) \quad \text{Eq. 39}$$

NOTE: "ecef2geo" represents the inverse of the "geo2ecef" coordinate transformation defined herein within the Section entitled "Coordinate Frame Definitions"

STEP SIX—Pass the computed parameters to the guidance law for computation of the autopilot command inputs (e.g., utilizing the algorithms were defined in the preceeding sections).

The UAV enters a racetrack orbit pattern along a capture path that passes tangent to the orbit pattern. This is the desired capture path due to the fact that the horizontal acceleration command at the point of the capture will be effectively zero, indicating that the vehicle does not require a correction to establish the orbit course at the time of capture.

In accordance with one embodiment, the processing steps for waypoint to orbit pattern segment calculation proceed as follows (the following algorithm applies to both the preceeding and proceeding waypoint paths):

STEP ONE—Using the ECEF location of the orbit pattern centroid computed in steps 1 and 2 of the orbit pattern desired location computation algorithm compute the position of the waypoint (either preceeding or proceeding the orbit pattern, whichever the case may be) relative to the orbit pattern centroid in the ellipse reference frame as follows:

$$\Delta \vec{P}_v^{ELL} = T_{ECEF}^E (\vec{P}_w^{ECEF} - \vec{P}_c^{ECEF}) \quad \text{Eq. 40}$$

where $\Delta \vec{P}_v^{ELL}$=waypoint position relative to orbit pattern center in ellipse reference frame $\vec{P}_w^{ECEF}$=waypoint ECEF position $\vec{P}_c^{ECEF}$=orbit pattern centroid ECEF position $T_{ECEF}^E$=ECEF to ellipse reference frame coordinate transformation matrix STEP TWO—Compute the orbit pattern tangent point which lies on the line passing through the waypoint:

$$x_t = \begin{cases} -k\dfrac{b\sqrt{y_v^2 - a^2}}{y_v} & x_v = 0 \\[2ex] -\dfrac{b^2\left(-1 + \dfrac{1}{2}\dfrac{y_v\left(2b^2 y_v + 2k\sqrt{a^2 x_v^4 - a^2 x_v^2 b^2 + b^2 y_v^2 x_v^2}\right)}{a^2 x_v^2 + b^2 y_v^2}\right)}{x_v} & x_v > 0 \\[4ex] -\dfrac{b^2\left(-1 + \dfrac{1}{2}\dfrac{y_v\left(2b^2 y_v - 2k\sqrt{a^2 x_v^4 - a^2 x_v^2 b^2 + b^2 y_v^2 x_v^2}\right)}{a^2 x_v^2 + b^2 y_v^2}\right)}{x_v} & x_v < 0 \end{cases}$$ Eq. 41

$$y_t = \begin{cases} \dfrac{a^2}{y_v} & x_v = 0 \\[2ex] \dfrac{1}{2}\dfrac{\left(2b^2 y_v + 2k\sqrt{a^2 x_v^4 - a^2 x_v^2 b^2 + b^2 y_v^2 x_v^2}\right)a^2}{a^2 x_v^2 + b^2 y_v^2} + kd & x_v > 0 \\[2ex] \dfrac{1}{2}\dfrac{\left(2b^2 y_v - 2k\sqrt{a^2 x_v^4 - a^2 x_v^2 b^2 + b^2 y_v^2 x_v^2}\right)a^2}{a^2 x_v^2 + b^2 y_v^2} - kd & x_v < 0 \end{cases}$$

where $b$ = semi-minor axis (half orbit region box width)

$a = \begin{cases} \text{semi-major axis (half orbit region box length)} & \text{ellipse} \\ b & \text{racetrack} \end{cases}$ $d$ = (half orbit region box length) −

(half orbit region box width)

$k = \begin{cases} 1 & \text{for preceeding waypoint} \\ -1 & \text{for proceeding waypoint} \end{cases}$ $x_v = \Delta \vec{P}_v^{ELL}(x)$ $y_v \begin{cases} \Delta \vec{P}_v^{ELL}(y) & \text{ellipse or } x_v = 0 \\ \Delta \vec{P}_v^{ELL}(y) - kd & \{\text{racetrack}\} \text{ and } x_v > 0 \\ \Delta \vec{P}_v^{ELL}(y) + kd & \{\text{racetrack}\} \text{ and } x_v < 0 \end{cases}$ STEP THREE—Rotate the orbit pattern tangent point into the ECEF reference frame:

$$\vec{P}_t^{ECEF} = \vec{P}_c^{ECEF} + [T_{ECEF}^E]^T \Delta \vec{P}_t^{ELL}$$ Eq. 42 where $\vec{P}^{ELL} = \begin{bmatrix} x_t \\ y_t \\ 0 \end{bmatrix}$ $[T_{ECEF}^E]^T$ = Transpose of ECEF to ellipse coordinate transformation matrix STEP FOUR—Compute the latitude and longitude of the orbit pattern tangent point:

$$(\lambda_t, \ell_t, h_t) = ecef2geo(\vec{P}_t^{ECEF})$$ Eq. 43

Figure 20:
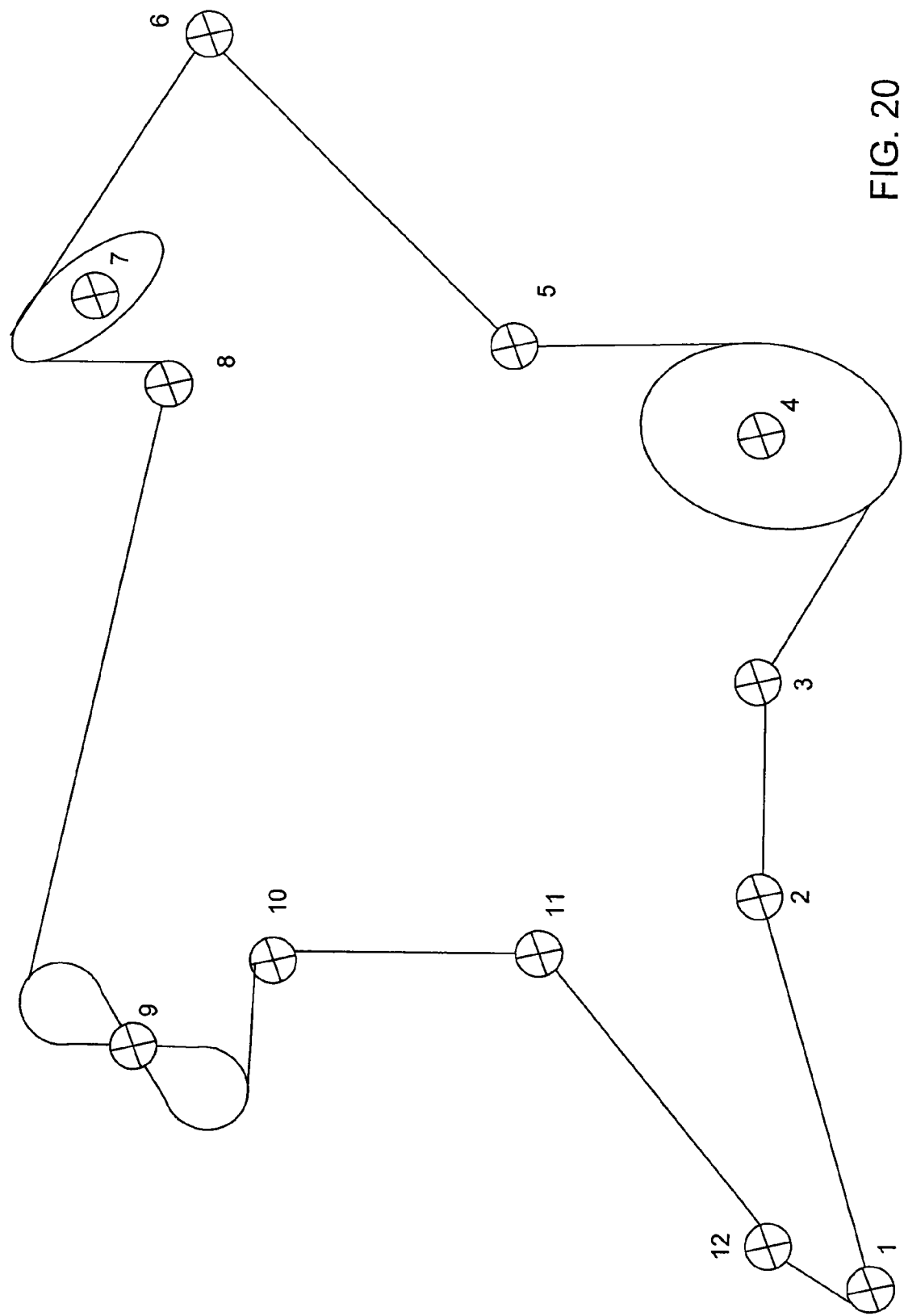
FIG. 20 is a schematic diagram demonstrating an example of a programmed route using various loiter algorithms.

STEP FIVE—Insert a waypoint leg connecting the waypoint and the computed orbit pattern tangent point FIG. 20 is a schematic diagram demonstrating an example of a programmed route using the defined loiter algorithms. Within FIG. 20, items 4, 7, and 9 represent orbit patterns and the remaining numbered elements represent waypoints. In accordance with one embodiment, the orbit guidance laws are configured to allow the operator to input either a desired orbit time or a desired number of orbit laps. The UAV will exit the orbit pattern when either the specified orbit time or specified number of orbit laps has been completed.

An interesting characteristic of the loiter pattern embodiments of the present invention is that one is able to mathematically define a desired location on a path in association with a given point in time. Points can be defined relative to a center point, even relative to a moving center point.

C. Remote Directional Command Mode

In accordance with one aspect of the present invention, as is inferred by block 140 in FIG. 1, a remote directional command (RDC) control mode is implemented. The versatility of the overall control system design of the described VACS architecture makes implementation of an RDC control mode relatively straightforward.

Inertial turn rates are kinematically related to acceleration through multiplication of the inertial velocity magnitude ($a = V\omega$). Hence, in the horizontal channel, an acceleration command can be generated for the autopilot by multiplying a desired or commanded turn rate by the inertial velocity magnitude. To accomplish this guidance law, the operator's horizontal control stick input is linearly mapped to a horizontal turn rate command in which the maximum stick position is equal to the maximum allowable horizontal turn rate.

The vertical channel manual control mode is a little different. For most UAV applications the vertical stick position will translate into a climb/descent rate command. It is more intuitive for operators to control the vertical channel via climb rate. Hence, in accordance with one embodiment, a look-up table of climb performance as a function of vehicle state (altitude and airspeed) is incorporated into the algorithms (the table is illustratively programmable to accommodate multiple UAV platforms). On each pass through the guidance software, the maximum climb rate is computed. The vertical control stick location is then linearly mapped to this maximum climb rate (center stick=zero climb rate, max stick=max climb rate). This climb rate command is then used to compute a flight path angle (gamma) command, which is fed into a gamma control guidance law (defined later in this section). A combination of control input device rate limiting and guidance command rate limiting illustratively results in a robust design that prevents the operator from being able to overdrive, stall, spin or in any other way crash the vehicle.

It should be noted that practically any known commercial control input device can be utilized for RDC control without departing from the scope of the present invention. For example, a USB game pad can be utilized thereby providing relative compactness and versatility. In accordance with one embodiment, the game pad utilized has a throttle slide control, a plurality of control buttons, and two thumb control sticks—one of which is used to steer the UAV and the other used to steer the UAV imaging sensor.

In accordance with one aspect of the present invention, the control system software translates the vehicle control stick motion as follows:

1. Forward (away from the operator)—descent rate command
2. Backward (toward the operator)—climb rate command 3. Left—left turn rate command
4. Right—right turn rate command The raw stick position readings are illustratively calibrated and normalized to range from −1.0 to 1.0 in both channels where (0,0) represents the center (neutral) stick position. When the stick is in the neutral position (0,0), the vehicle flies a straight and level profile. In accordance with one embodiment, the off-board control system software (i.e., the software resident on the ground station) maps the stick range limits as follows:

1. Maximum horizontal stick position (±1)—max vehicle turn rate
2. Maximum forward stick position (+1)—max vehicle descent rate
3. Maximum aft stick position (−1)—max vehicle climb rate In one aspect of the present invention, the vehicle max climb rate is a function of altitude and airspeed. The off-board control software illustratively maintains a database of the vehicle max climb rate and interpolates based on current flight conditions to obtain the instantaneous control limit. This methodology will prevent the operator from overdriving the vehicle. A similar methodology is used for descent rate, although the descent rate is not as restrictive as the climb rate and requires a more empirical approach to setting.

In accordance with one aspect of the present invention, the following equations define the basic simplified manual control approach. The algorithm maintains a set of vertical and horizontal reference conditions that are used to command the vehicle when the operator lets go of the stick. First, the vertical stick position is checked for movement and the associated vertical commands and reference conditions are computed:

$$\text{if } |\delta_{v_i} - \delta_{v_{i-1}}| > \varepsilon \quad \text{Eq. 44}$$
$$H_{ref} = H$$
$$R = 0$$
else
$$R_i = R_{i-1} + V_{horz}\Delta t$$
endif
$$\dot{H}_c = \delta_{v_i} \dot{H}_{max}$$
$$\gamma_c = \sin^{-1}\left(\frac{\dot{H}_c}{V_I}\right)$$

where
$\delta_v$=vertical control stick position
$\varepsilon$=control stick measurement noise/freeplay tolerance
$H_{ref}$=reference altitude
$H$=vehicle altitude
$R$=integrated path length during vertical maneuver
$\dot{H}_c$=climb/descent rate command
$\dot{H}$=vehicle altitude rate
$\gamma_c$=flight path angle command
$V_I$=vehicle inertial velocity magnitude Next, the horizontal stick is checked for movement and the associated horizontal commands and reference conditions are computed:

$$\text{if } |\delta_h| > \varepsilon$$
$$\dot{\Psi}_c = \delta_h \dot{\Psi}_{max}$$
$$\Psi_{ref} = \Psi_t$$
$$\vec{P}_{ref}^{LV} = \{0,0\}^T \quad \text{Eq. 45}$$
else
$$\vec{P}_{ref}^{LV} = \vec{P}_{ref_{i-1}}^{LV} + \vec{V}_h \Delta t$$
$$\vec{P}_{ref}^{W} = T_{LV}^{W} \vec{P}_{ref}^{LV}$$
endif where
$\delta_h$=horizontal control stick position
$\dot{\Psi}_c$=horizontal turn rate command
$\dot{\Psi}$=horizontal turn rate
$\Psi_{ref}$=reference heading
$\Psi_t$=vehicle ground track angle
$\vec{P}_{ref}$=reference position The above equations illustrate how trajectory synthesis is employed to guide the vehicle on a straight and level path when the control stick is returned to zero. This synthesis technique generates an inertial path to which the vehicle guides, thus ensuring that inertial sensor errors do not cause the vehicle to deviate from the operator's expected course.

The airspeed command is computed based on the slide control setting:

$$V_c = V_{min} + \delta_t(V_{max} - V_{min}) \quad \text{Eq. 46}$$

where $\delta_t$=slide control setting

Any of a variety of vertical channel control schemes can be implemented without departing from the scope of the present invention, including both position and velocity reference control laws. It is intuitively obvious that when the operator commands a climb or descent via the manual control operation, the only altitude of concern is the altitude at which to level off. Hence, the actual implementation of the control law does not require a position-slave component. This reduces the order of the control law to a first order control law in which the velocity command term is acted upon to generate an acceleration command to the autopilot. In accordance with one embodiment, the following perturbational first-order control law is illustratively used for the altitude rate control:

$$a_{c_{up}} = \frac{|V_I|}{\tau}(\gamma - \gamma_c) - g \quad \text{Eq. 47}$$

where $a_{c_{up}}$ = local vertical *UP acceleraion* command
$\gamma$ = flight path angle
$\gamma_c$ = flight path angle command = $\sin^{-1}\left(\frac{\dot{h}_c}{V}\right)$
$\dot{h}_c$ = altitude rate command
$\tau$ = guidance law time constant
$g$ = acceleration of gravity
$|V_I|$ = inertial velocity magnitude In one embodiment, the time constant is a tunable parameter that can be adjusted for specific platforms. For example, the time constant used for a given vehicle might be 0.3 seconds, whereas the time constant used for another vehicle might be 0.1 seconds. The vertical channel guidance generally works in coordination with the automatic speed control loop. In other words, simply commanding a constant throttle setting as opposed to a constant speed setting can easily drive the vehicle into a stall condition when maximum (or near maximum) climb rates are commanded. By including the automatic speed control design and mapping the operator's "throttle" control input to a speed command as opposed to a throttle setting the problem is alleviated.

In accordance with one embodiment, the horizontal acceleration command is computed as $$a_{c_h} = \begin{cases} -k_p \vec{P}_{ref}^{W}(\text{across}) - k_v |V_{horz}|(\Psi_t - \Psi_{ref}) & |\delta_h| \leq \varepsilon \\ V_I \Psi_c & |\delta_h| > \varepsilon \end{cases} \quad \text{Eq. 48}$$

It should be noted that when the horizontal stick is in the neutral location a biased pursuit guidance law is used to maintain a constant heading. The local vertical acceleration command vector is then illustratively computed as:

$$\vec{a}_c^{LV} = \begin{Bmatrix} a_{c_h} \cos(\Psi_t) \\ -a_{c_h} \sin(\Psi_t) \\ a_{c_{UP}} \end{Bmatrix} \quad \text{Eq. 49}$$

This acceleration command vector is then illustratively processed through a translation layer and delivered to the autopilot system.

An additional aspect of the present invention pertains to control stick command rate limiting. A key desired objective of the simplified manual control modes described herein is that the control modes will resist the operator's ability to overdrive the vehicle. In accordance with one embodiment, a robust, algorithmic approach to aid in the achievement of this objective is to implement a rate limit on the operator's control stick command inputs. A simple rate-limiting algorithm has a dynamic effect similar to passing the commands through a low-pass filter. The rate limiting essentially attenuates high frequency command inputs. The benefit to the controller is that rate limiting the command inputs enables an elimination of high frequency "jerks" from the command stick. Further an avoidance is enabled of inadvertent and unnecessarily large steps and high frequency impulses directed to the controller. This, in turn, minimizes the transient effects of the closed-loop on the human operator's perception of the vehicle response to his/her commands. In other words, with the control stick rate limiting algorithm functioning, the operator always sees the vehicle respond smoothly to the directional commands that he/she is supplying. In accordance with one embodiment, the control stick rate limiting is a tunable parameter within VACS and can be adjusted to satisfy the specific performance desires of a given operator with a given vehicle under VACS control.

Another aspect of the present invention pertains to an automatic speed control loop. Important to the application of a robust simplified manual control capability is the ability of the embedded controller to maintain speed, even through harsh maneuvering environments. Consider a scenario wherein an operator commands a hard turn, a max climb, or a combined climb and turn maneuver, the VACS controller will rapidly orient the vehicle into the desired maneuver (flight path and turn rate). The maneuver, in turn, will require the vehicle to pull a large angle-of-attack, which results in increased drag, or to fly a glide slope in which the effects of gravity in the axial channel are significant enough to induce a rapid deceleration. To expect the operator to keep up this rapidly changing dynamic environment by manually adjusting the throttle would directly oppose the goal of the simplified manual control design. Hence, in accordance with one embodiment of the present invention, an automatic speed control loop is coupled into the system. A basic implementation allows the operator to enter a preprogrammed speed setting (cruise for best range, cruise for best endurance, cruise at max speed, etc) or a manual speed setting using a typical joystick throttle input. For the manual speed setting, the control stick throttle setting is not mapped to throttle setting, but rather mapped to a speed command that is linearly proportional to the control setting. In other words, the minimum control setting maps to the vehicle minimum control speed and the maximum control setting maps to the vehicle maximum cruise speed. The remaining settings are mapped linearly between the min and max speeds.

As the vehicle decelerates through commanded maneuvers, the automatic speed loop responds and adjusts the throttle setting to maintain the desired speed programmed by the operator. Even as the operator adjusts his manual speed control, the flight software is simply adjusting the speed command to the autospeed loop, which is always running. The advantage is that the bandwidth of the control system is higher than the bandwidth of a human operator; hence, using VACS, the operator generally cannot command a maneuver that ultimately drives the vehicle to stall—the flight computer is continuously adjusting the throttle to maintain the proper speed setting.

Another aspect of the present invention pertains to climb gradient limiting. When mapping the vertical control stick command to a climb rate command, the vehicle climb rate performance capability is illustratively taken into account. The maximum climb rate of the vehicle directly corresponds to the maximum vertical control stick deflection. When a combined climb and turn maneuver is commanded, the net reduction in climb rate capability resulting from the out-of-plane acceleration component required to generate the turn rate is accounted for. There is a closed form analytic climb rate reduction that can be computed to account for the turn. In accordance with one embodiment, this reduction in climb rate is computed as:

$$\Delta \dot{h} = -\frac{2\frac{\partial C_D}{\partial (C_L^2)} m^2 \dot{\Psi}^2 V}{\rho g S_{ref}} \quad \text{Eq. 50}$$

where $\frac{\partial C_D}{\partial (C_L^2)}$ = vehicle drag polar constant ($k$)

$m$ = vehicle mass $\dot{\Psi}$ = turn rate command $V$ = inertial velocity $\rho$ = air density $g$ = acceleration of gravity $S_{ref}$ = aerodynamic reference area The maximum climb rate used to generate the flight path reference command during the manual control mode is reduced by the amount computed using the above equation. The combination of this reduction, along with the limiting algorithms and speed control loop discussed in the preceding sections offers a robust manual control system design that prevents the operator from overdriving the UAV.

D. Line-of-Sight Slave Control Mode

In accordance with one aspect of the present invention, as is indicated by block 136 in FIG. 1, a line-of-sight (LOS) slave control mode is implemented. The versatility of the overall control system design of the described VACS architecture makes implementation of this control mode relatively straightforward.

The underlying operational concept of the LOS slave control mode is illustratively defined by the fact that the operator is ultimately interested in the imagery captured and transmitted by the UAV. The goal of the guidance mode therefore becomes to offer the operator the capability to manually slew the UAV sensor while surveying a battlefield or other topological region with complete disregard for the aviation or direction of the UAV. To accomplish this guidance objective, the vehicle is slaved to the sensor line-of-sight. To maximize the operator's probability of visual object recognition, the guidance policy is to align the heading of the UAV to the horizontal sensor line-of-sight. With this policy, the vehicle is always commanding a path toward the desired surveillance area. A simple pursuit guidance law is employed to achieve the stated guidance goal.

In accordance with one embodiment of LOS slave control, the applicable guidance law commands the nose of the UAV to align with centerline of the gimbaled sensor by issuing the following horizontal acceleration command:

$$a_{c_h} = \begin{cases} -k_p \vec{P}_{ref}^W(\text{across}) - k_v |V_{horz}|(\Psi_t - \Psi_{ref}) & |\delta_h| \le \varepsilon \\ -K_V |V_I| \Delta\Psi & |\delta_h| > \varepsilon \end{cases} \quad \text{Eq. 51}$$

$\Delta\Psi$ represents the angle between the vehicle centerline and the sensor horizontal line-of-sight angle. The sensor horizontal line-of-sight angle is derived from the platform gimbal angles.

Generally speaking, the directional-response autopilot, combined with the stabilized platform, allows a single minimally trained operator to easily conduct a UAV surveillance mission. A further level of user simplification is achieved by combining seeker designation command logic with the outer loop guidance. This mixing provides Line-of-Sight Slave mode capability in which the operator's point of reference is the image scene transmitted from the UAV's on-board camera. In this mode the operator does not provide direction commands to the UAV. Instead, the operator focuses his attention on the tactical situation display, commanding the look angle of the UAV's on-board sensor to survey the battlefield (or other topographical region for non-military applications) while the UAV autonomously commands a flight profile which is slaved to the operator's sensor line-of-sight commands. This integration of the camera platform with the guidance provides the following benefits:

1. Time-on-station loiter control which can be easily selected and designated.
2. Further reduction of workload on the operator, who can now focus primarily on the surveillance aspects of the mission.
3. An easily adaptable relative Navigation method.

Figure 21:
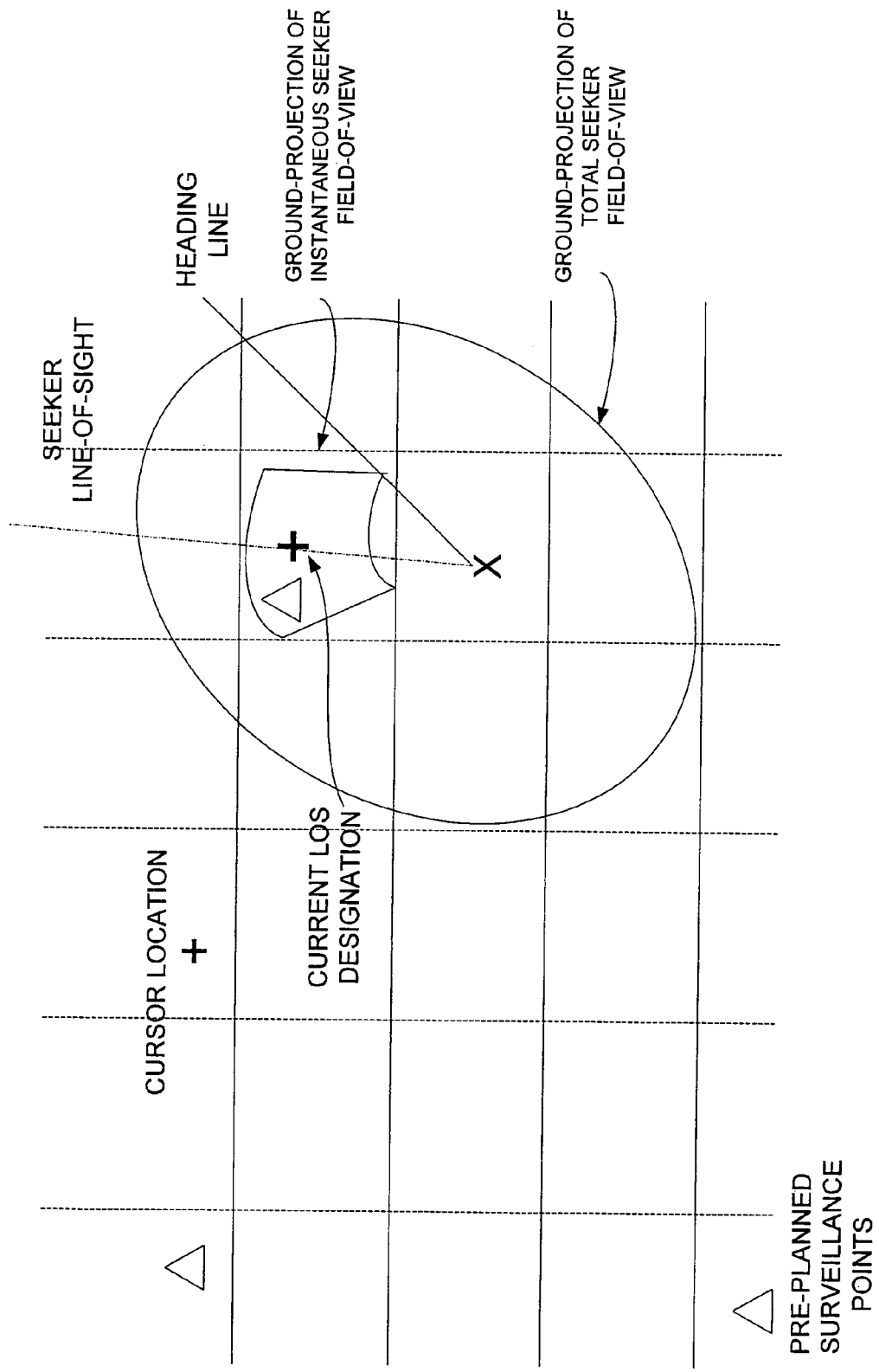
FIGS. 21, 22A & 22B are schematic diagrams demonstrating features of a line-of-sight-slave control approach.

FIG. 21 is a diagrammatic illustration demonstrating how LOS slave control is implemented with the ground station display in accordance with one aspect of the present invention. The display is illustratively a top-view with a schematic of the aircraft for easier conceptualization. The outer circle around the aircraft is illustratively a projection of the entire field-of-view onto the ground. The smaller pie-shaped queue is illustratively a ground projection of the current seeker borsight position. These are calculated by the ground station software from the positional information and seeker angle sent across the data-link. The remote operator can illustratively opt to either keep the cursor active as the continual steering point, or he/she can designate a "surveillance-point" by clicking on a desired ground location. In the latter case, the staring point would be captured so the cursor could be moved to a new constant location.

Figure 22A:
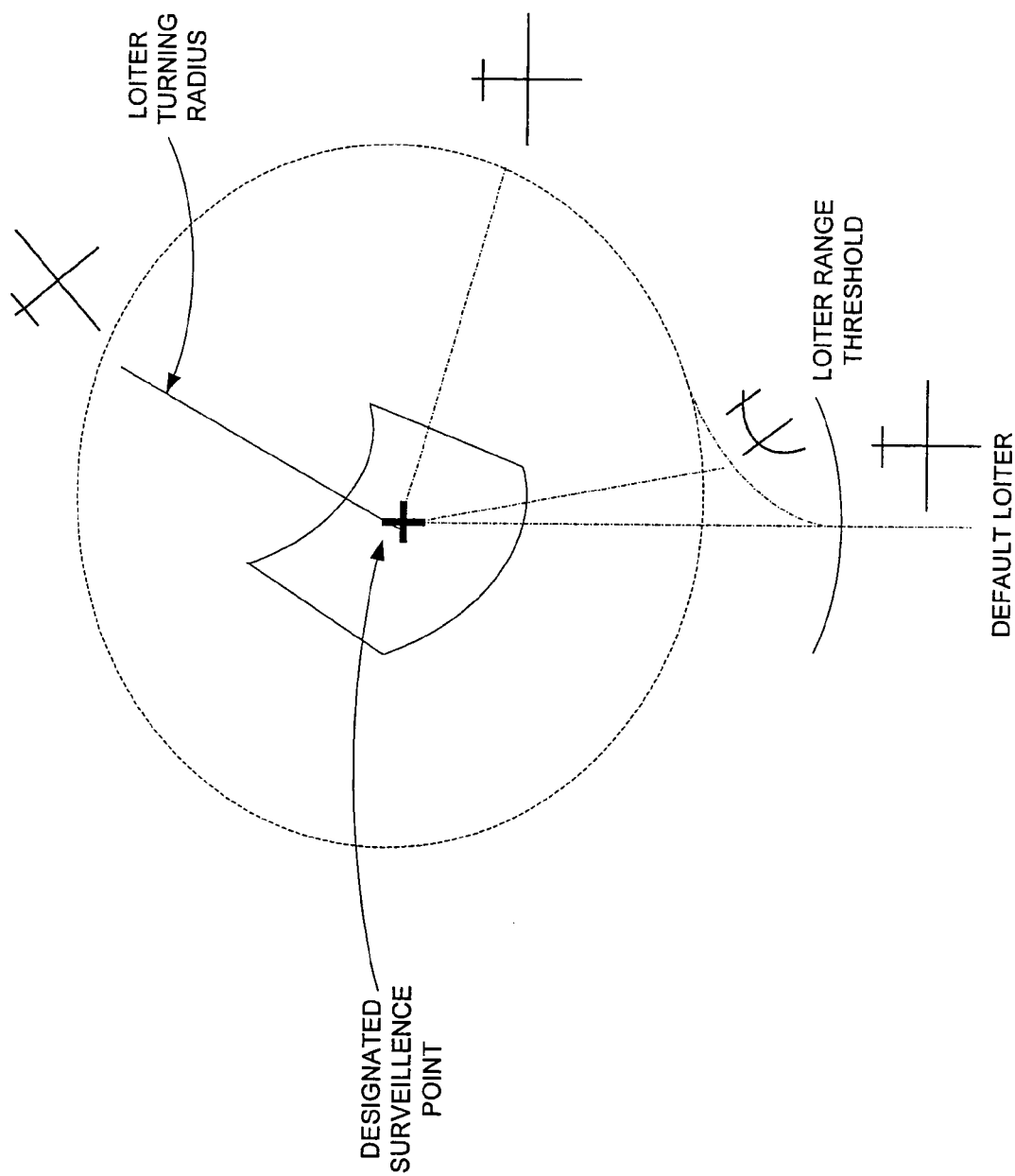
Figure 22B:
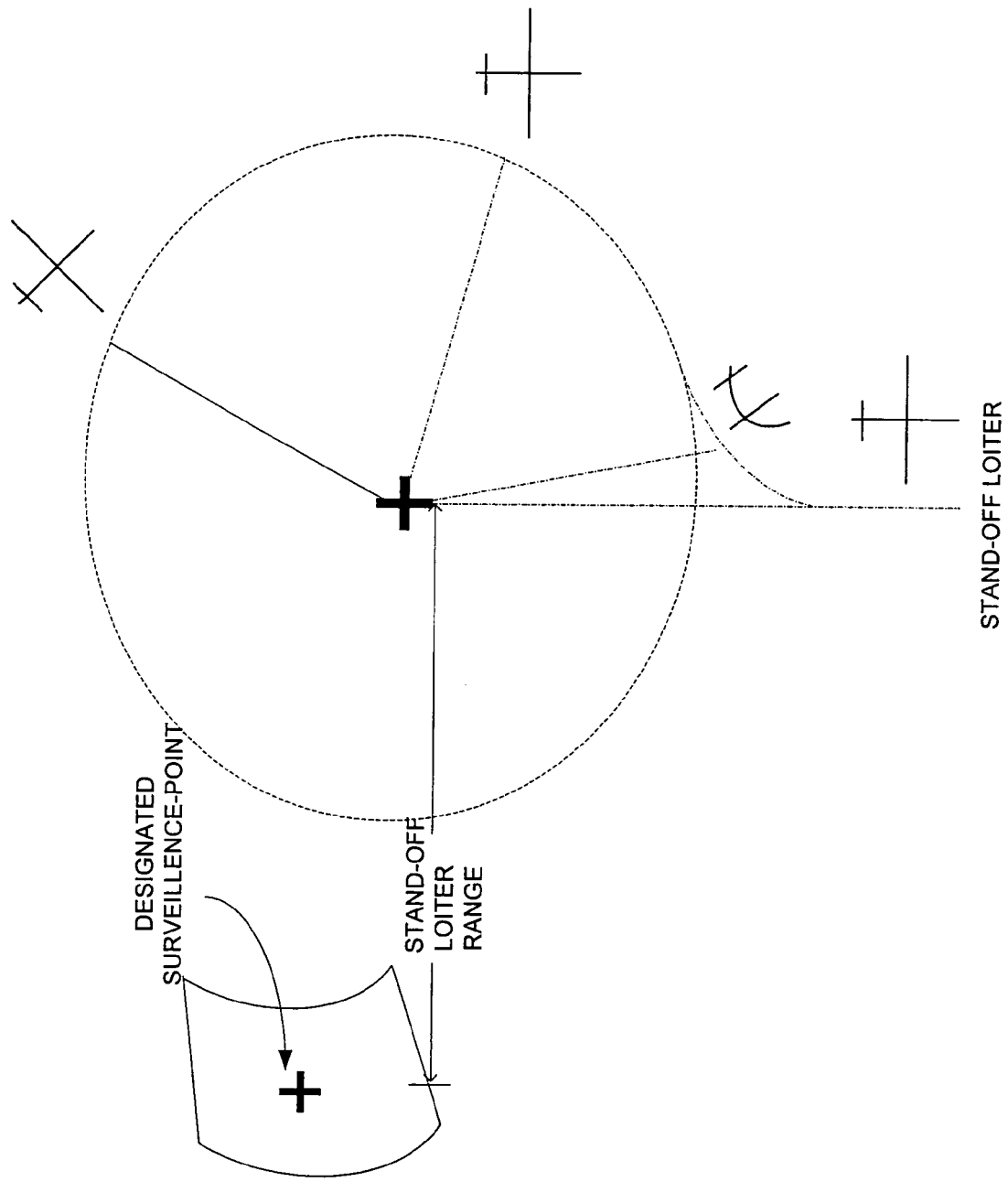

If the pilot chooses a surveillance location outside the total FOV, then the outer loop guidance will illustratively follow a command-to-LOS mode guide law until the UAV flight path points toward the target. Once the desired staring-point comes within a minimum range threshold, the guidance automatically trips into a loiter pattern (either constant-radius or elliptical) to maintain a station with a single key-click while he/she conducts other activities. FIGS. 22A & 22B together demonstrate the surveillance-point approach scenario.

If a constant location is selected within the minimum turning radius, then the guidance will fly over the surveillance-point and plan an out-and-back pattern to avoid a singularity in the loiter guide-law. This can be easily achieved by inserting waypoint legs autonomously. If the operator chooses, he/she can select a standoff range (or accept the default range) for surveillance over a hostile target. The line-of-sight commands will also comprehend the offset location to track on the desired location. This is achieved by inserting the offset range vector in the positional component of the loiter guide-law.

The following simplified equations are used to show the basic structure of the LOS Slave mode guidance:

If $(R_{Target} > \text{Loiter\_Threshhold})$ then    Eq. 52

$\dot{\psi}_{Cmd} = K_{\dot{\psi}}(\lambda_{Horiz} - \psi_{Heading})$ $\dot{\gamma}_{Cmd} = K_H(H_{CMD} - H) + H_{\dot{H}}\dot{H} + \frac{g}{V}$ else $\dot{\psi}_{Cmd} = K_{\dot{\psi}}\Delta\Psi + K_p(P_{Turn} - \|\overline{R}_{Target} + \overline{R}_{Stand\text{-}Off}\|)$ $\dot{\gamma}_{Cmd} = K_H(H_{CMD} - H) + K_{\dot{H}}\dot{H} + \frac{g}{V}$ endif where $R_{Target}$ = Horizontal Range-to-Target $\dot{\psi}_{Cmd}$ = Horizontal Turning Rate Command $\Delta\Psi$ = Heading Error Relative To Loiter Path $\lambda_{Horiz}$ = Horizontal Line-of-Sight to Target $\dot{\gamma}_{Cmd}$ = Vertical Turning Rate Command $\Psi_{Heading}$ = Heading Angle $P_{turn}$ = Loiter Turning Radius $H$ = Altitude $g$ = Gravity Acceleration Magnitude $V$ = Vehicle Inertial Velocity Matnitude The above equations show two active horizontal guidance terms when flying the constant turning radius circle. The first term is the damping term which drives the vehicle to align its ground track with the desired circular loiter pattern and is the dominating term. The second term is a positional term to help maintain the constant arc.

In accordance with one aspect of the present invention, sensor-slave mode commands are generated by an autonomous line-of-sight driven function, in which the command objectives are generated by the necessities of the function rather than by an operator. For example, a function designed to command a raster-scan of a particular surveillance area, or a function designed to scan a long a roadway could be used to generate sensor slave commands. Another example is a function designed to generate line-of-sight commands for UAV-to-UAV rendezvous formation flying.

E. Ground Collision Avoidance System (GCAS)

In accordance with one aspect of the present invention, as is indicated by block 120 in the FIG. 1 architecture, a ground collision avoidance system (GCAS) provides an automated mechanism enabling the control system to avoid terrain without having to task the operator with studying altitude above ground for each vehicle under his or her control. In accordance with one embodiment, the GCAS provides the operator with some form of situational awareness information about an upcoming collision (e.g., a warning signal). If the user does not react to that information, the GCAS will automatically avoid the terrain and let the user know the system is in an auto-avoidance mode. During this mode, the user is illustratively locked out from making flight path changes until the system has cleared the offending terrain.

In accordance with one embodiment, the operator is provided with a timer display that counts down a time period within which the operator can manually avoid a high potential terrain collision. If the operator does not manually steer off of the collision path during the time period, then the GCAS will initiate the auto-avoidance mode.

In accordance with one embodiment, an altitude profile sensor is set up to provide data for GCAS purposes. While other known sensors can be utilized without departing from the scope of the present invention, one suitable ground terrain sensor system is the Digital Terrain Elevation Data (DTED) Level 1 database available from the National Imagery and Mapping Agency (NIMA). The spacing for Level 1 DTED is approximately 93 meters, which somewhat limits the amount of surface information the GCAS algorithm uses. However, the GCAS algorithm is illustratively generic and can accept Level 2 DTED for a higher resolution model. It should be noted that it is also within the scope of the present invention to adopt even more advanced terrain description mechanisms to provide terrain topology map information for the ground collision avoidance logic.

In accordance with one embodiment, a first input to the GCAS is a desired clearance height above terrain for a vehicle to be controlled. Once the desired clearance has been defined, the GCAS algorithm produces a terrain altitude profile. The profile is created from the DTED maps using a scan pattern that accounts for Navigation and DTED errors.

Figure 23:
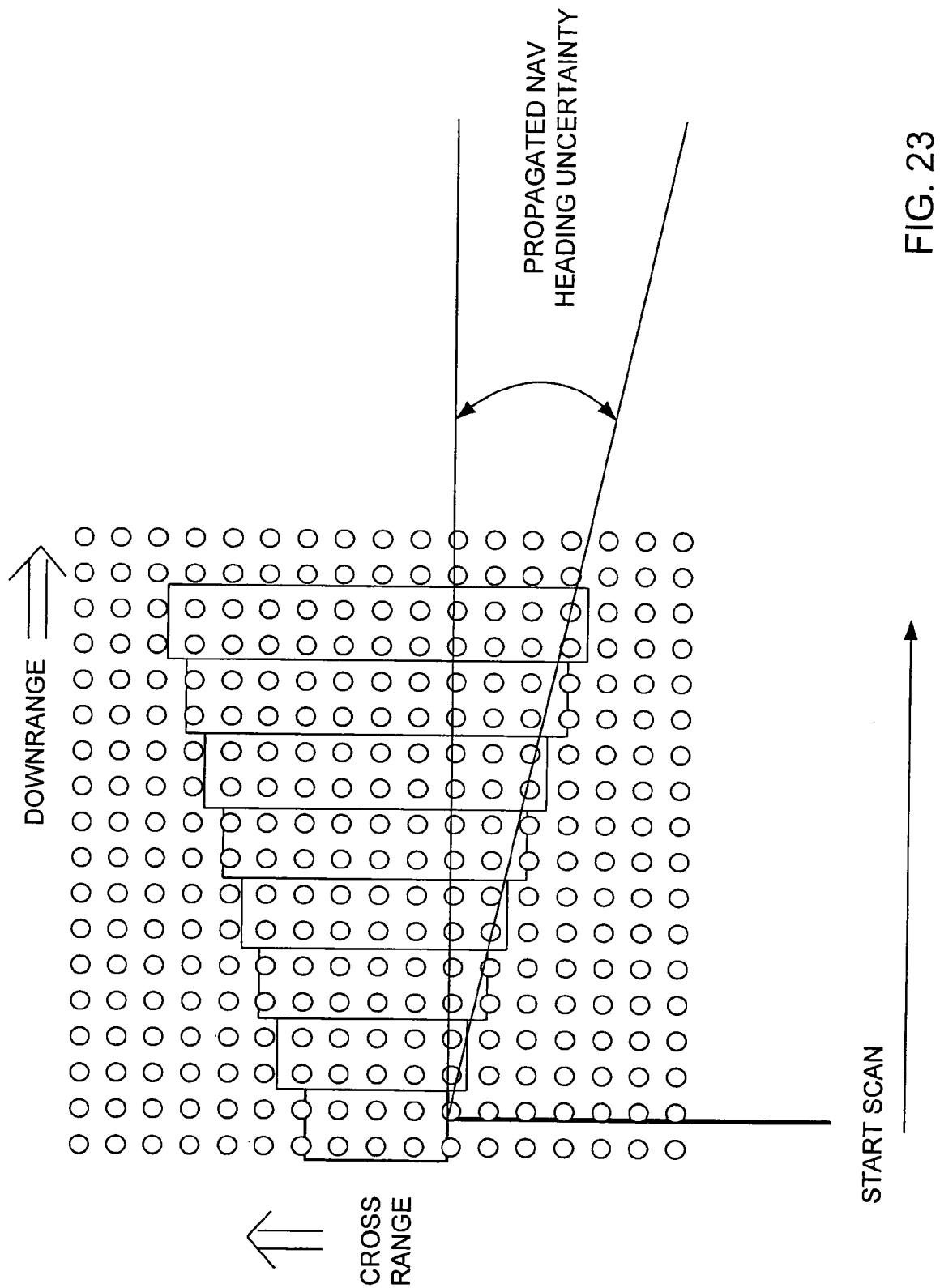
FIG. 23 is a schematic illustration of a scan process in the context of a ground collision avoidance system.

FIG. 23 is a schematic representation of a top view of a scan pattern within the context of the GCAS. The scan pattern starts at the vehicle position. A horizontal uncertainty box is generated. A maximum terrain altitude is then calculated within the uncertainty box. The uncertainty box is then propagated forward adjusting for heading and any other uncertainty. The algorithm then determines the maximum altitude in the new uncertainty boxes and continues forward an amount to occupy a limited fly-out time (e.g., a 60 second fly-out). The maximum values for these uncertainty boxes are used to feed the terrain profile for the GCAS guidance.

The philosophy behind the design of the GCAS system is to take the current vehicle position and fly out a medium fidelity simulation as if the operator had commanded a maximum g pull up. While the simulation performs this pull up, the algorithm monitors vehicle altitude and ground altitude and attempts to predict at what point the vehicle will intersect the terrain.

Figure 24:
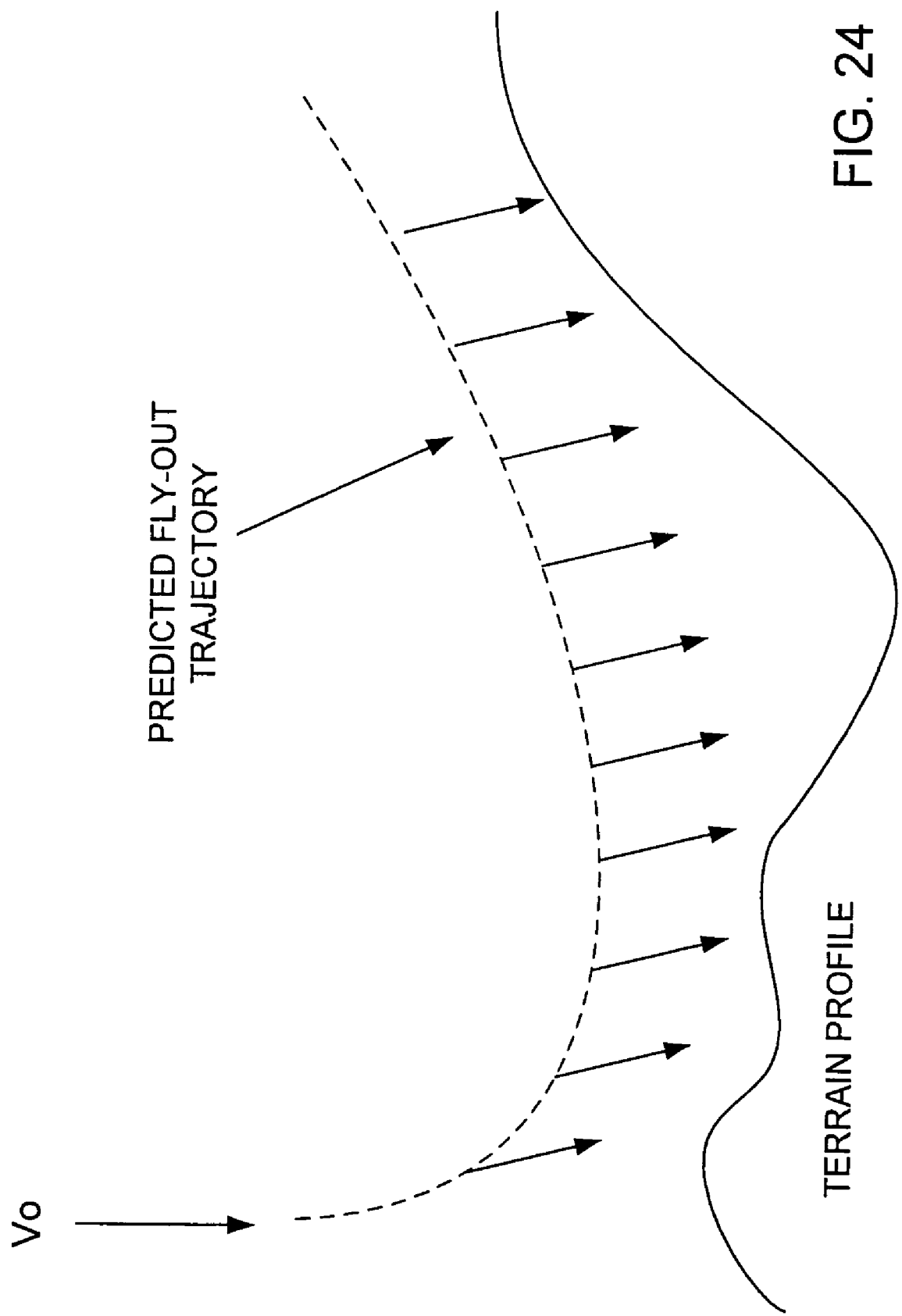
FIG. 24 is a schematic diagram illustrating a fly-out trajectory in the context of a ground collision avoidance system.

FIG. 24 is a schematic diagram demonstrating of a sample trajectory. Assuming the vehicle is flying with current velocity $V_o$, the algorithm starts at the current vehicle position and flies a maximum g pull up trajectory. The maximum g pull up is an acceleration command generated according to the following equation:

$$a_c = \frac{QSC_{L_{max}}}{m} \qquad \text{Eq. 53}$$

where

Q=dynamic pressure

S=vehicle aerodynamic reference area $C_{L_{max}}$=vehicle maximum lift coefficient m=vehicle mass The algorithm then assumes a constant initial velocity and projects the trajectory along the velocity line to estimate a time to fly up. The time to fly up represents the time to start the maneuver in order to avoid the terrain by an amount equal to the minimum descent altitude. The minimum descent altitude is a constant and represents the minimum height above the terrain for the platform through the terrain avoidance mode.

After the algorithm finds the minimum altitude above ground through the fly-out trajectory, the closure rate is computed based on the initial velocity and the velocity at the minimum altitude above ground.

$$V_c = \frac{V_{H,0} * V_{U,MinAgl} - V_{H,MinAgl} * V_{U,0}}{|\vec{V}_{MinAgl}|} \qquad \text{Eq. 54}$$

Once the closing rate has been computed, the value is limited (e.g., limited to 2 feet/second) to avoid division by zero problems in the time to fly up calculation.

$$V_c = \max(V_c, 2.0) \qquad \text{Eq. 55}$$

Once the closure rate computation is complete, the time to fly up is calculated as:

$$TTFU = \frac{(H_{MinAgl} - MDA)}{V_c} \qquad \text{Eq. 56}$$

The MDA variable represents the minimum descent altitude, or the minimum altitude the vehicle should attain during the climb out. in accordance with one embodiment, the time to fly up is computed periodically (e.g., every 1 Hz) and reported to the operator station (i.e., the ground control station). Should the time to fly up reduce to zero, the guidance code will perform the maximum g pull up maneuver while ignoring any commands from the operator station. Once the fly out is complete and the time to fly up returns to a predetermined threshold (e.g., greater than 10 seconds), control is relinquished and returned to the operator station.

In accordance with one embodiment, in order to perform the simulation in faster than real time, the high fidelity simulation is updated for computational simplicity. Accordingly, the design flies a paired down version of the vehicle simulation in a faster than real-time environment to estimate when the vehicle might impact the ground. For example, the baseline simulation can be adapted with the following changes:

Truth Navigation model
Truth actuator models
No wind model
Reduced simulation time step to 16 Hz These are examples of changes that can be made to enable performance of a flyout simulation of the vehicle in a faster than real-time environment.

In accordance with one embodiment, the simulation has the capability to fly out 10 seconds of medium fidelity data and then extrapolate for another 50 seconds of data giving a 1 minute window of simulated data. The data provides time for the max g-pull up maneuver to execute and acquire the desired flight path angle. Once that flight path angle is captured, an inertial propagation for the next 50 seconds provides an accurate assessment of the vehicle motion.

In accordance with one embodiment, the operator station (e.g., the ground control station including the operator interface) is configured to provide the operator with an opportunity to understand that the vehicle is about to go into a GCAS maneuver. For example, the time to fly up variable from the GCAS simulation is transmitted to the operator station. If the time to fly up value reduces to a value less than or equal to a predetermined value (e.g., 10 seconds), an indicator is provided to the operator (e.g., the vehicle on the display turns yellow) and a counter is added to show the estimated time to fly up. Should that number reduce to zero, an indication is provided (e.g., the vehicle turns red) showing that the operator no longer has control of the vehicle and the ground collision avoidance maneuver is currently being executed.

IX. Translator

As was described in relation to FIG. 5, a translation layer can be implemented to translate guidance commands into reference commands appropriate for the specific autopilot implementation.

In accordance with one embodiment, an exemplary translation layer implementation will now be provided. After the guidance algorithms execute, the outputs are translated to the native vehicle autopilot commands. The equations below provide example kinematic translations from the guidance acceleration commands to native vehicle autopilot commands. These equations demonstrate the principal that vehicle motion is activated through acceleration. The methods that various vehicles employ to generate acceleration are numerous (bank angle autopilot, acceleration autopilot, heading control autopilot, altitude control autopilot, etc). Since the control algorithms described herein generate acceleration commands that can be kinematically translated into any of these native autopilot commands, the guidance algorithms truly provide a generalized library of control laws that can control any vehicle through that vehicle's native atomic functions. Ubiquitous acceleration control techniques enable VACS to synthesize control commands for any vehicle, including air, ground, or sea-based.

$a_v$ = vertical plane acceleration command    Eq. 57

$a_h$ = horizontal plane acceleration command

-continued $\phi = \tan^{-1}\left(\frac{a_h}{a_v}\right)$ = bank angle command $a_T = \sqrt{a_v^2 + a_h^2}$ = total body acceleration command $\dot{\psi} = \frac{a_h}{V}$ = turn rate command $\psi_i = \psi_{i-1} + \dot{\psi}\Delta t$ = heading command $\dot{\gamma} = \frac{(a_v - g)}{V}$ = flight path rate command $\gamma_i = \gamma_{i-1} + \dot{\gamma}\Delta t$ = flight path angle command $\dot{h} = V\sin(\gamma)$ = climb rate command $h_i = h_{i=1} + \dot{h}\Delta t$ = altitude command Additional functionality that can be enabled in a translation layer is means for discouraging or preventing an operator (e.g., the human or non-human operator interfacing the VACS architecture) from overdriving, stalling, or spinning the vehicle frame. This being said, limiting algorithms can also be employed in the guidance or autopilot functions.

X. Autopilot

As has been addressed, the present invention is not limited to, and does not require, a particular autopilot system. The control system and architecture embodiments of the present invention can be adapted to accommodate virtually any autopilot system.

For the purpose of providing an example, an illustrative suitable autopilot software system will now be described. The illustrative autopilot system incorporates a three-axis design (pitch and yaw with an attitude control loop in the roll axis) for vehicle stabilization and guidance command tracking. The autopilot software design incorporates flight control techniques, which allow vehicle control algorithms to dynamically adjust airframe stabilization parameters in real-time during flight. The flight computer is programmed directly with the airframe physical properties, so that it can automatically adjust its settings with changes in airframe configuration, aerodynamic properties, and/or flight state. This provides for a simple and versatile design, and possesses the critical flexibility needed when adjustments to the airframe configuration become necessary. The three-loop design includes angular rate feedback for stability augmentation, attitude feedback for closed-loop stiffness, and acceleration feedback for command tracking. In addition, an integral controller in the forward loop illustratively provides enhanced command tracking, low frequency disturbance rejection and an automatic trim capability.

XI. Multi-Vehicle Ground Control Station

In one aspect of the present invention, an operator station (also referred to as the ground control station or GCS) is designed to accommodate command and control of multiple vehicles or a single vehicle by a single operator. In accordance with one embodiment, the ground control station is platform independent and implements an application program interface that provides windowing and communications interfaces (e.g., the platform is implemented in Open Source wxWindows API). The underlying operating system is illustratively masked and enables a developer to code in a high level environment.

In one embodiment, the ground control station incorporates several specialized user interface concepts designed to effectively support a single operator tasked to control multiple vehicles. The GCS also illustratively supports manual control and sensor steering modes. In the manual control mode, the operator can assume control authority of the vehicles individually from the ground control station at any time in flight. In the sensor steering mode, a vehicle will autonomously fly in the direction the operator is manually pointing the on-board imaging sensor (e.g., operator views video output from a digital camera on a TV interface, computer screen display, etc.). A custom data link is illustratively utilized to support a two-way transfer of data between the ground control station and the UAV's. These design concepts together provide a flexible, multiple vehicle control system. The details of the concepts are discussed below.

In one aspect of the present invention, the ground control station implemented for flight control includes any or all of the following components:
 a graphical user interface (GUI)
 a synthetic vision display
 two video monitors
 a laptop computer
 two repeater displays
 a hand-held controller
 a keyboard
 a mouse control
 a two-way radio
 a computer network The two video monitors are illustratively used to display real-time data linked camera imagery from two air vehicles having cameras (of course, fewer, more or none of the vehicles might have cameras and the number of monitor displays can be altered accordingly). In accordance with one embodiment, camera imagery is recorded on videotapes during a mission. In accordance with one embodiment, the two repeater displays are used to provide redundant views of the GUI and synthetic vision display. The laptop illustratively serves as a GUI backup in the event that the main GUI fails.

Figure 25:
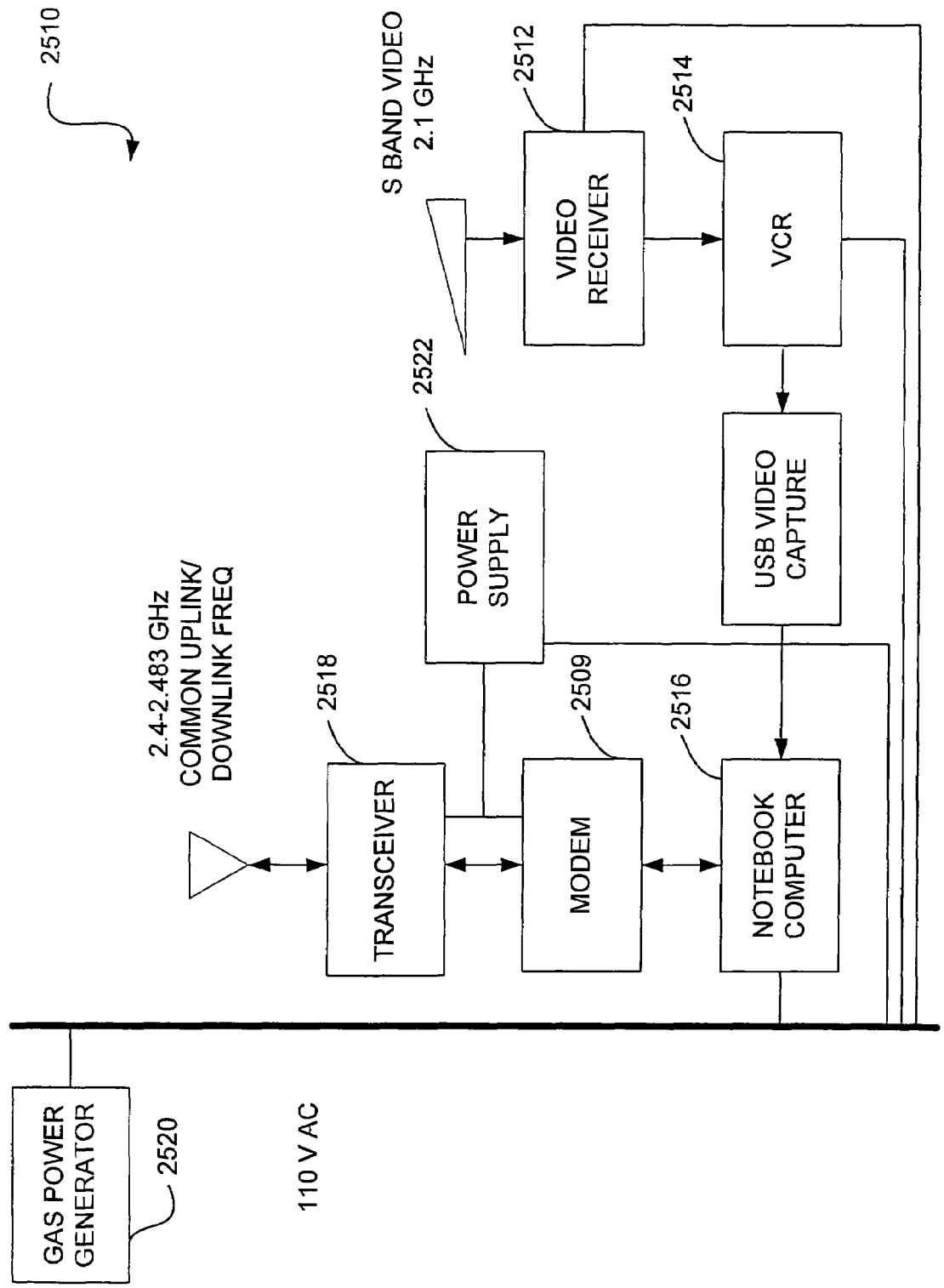
FIG. 25 is a simplified block diagram of a ground control station.

FIG. 25 is a simplified block diagram of ground control station 2510 in accordance with an embodiment of the present invention. As illustrated, ground control station 2510 receives real-time video images through a video receiver 2512. In accordance with one embodiment, a digital video camera is installed on one or more of the air vehicles for the production of such images. The camera imagery from each camera is illustratively data linked to a dedicated display screen at the ground control station. In accordance with one embodiment, a pan-tilt-zoom color camera is illustratively implemented by being installed on the underside fuselage or the underside of a wing. However, monochrome imagery cameras are also within the scope of the present invention. In accordance with one embodiment, cameras are illustratively operator-controlled from the ground control station via a data link to the vehicle, such as through transceiver 2518.

Video receiver 2512 captures video from a sensor camera and delivers the imaging data to VCR 2514 for video display and processing such that ground control system 2510 can relay processed video through a USB port to notebook computer 2516 for recording onto a hard disk. Notebook computer 2516 is configured to playback the recorded video stream. Transceiver 2518 receives data from multiple UAV's as well as transmits data to the multiple UAV's. Mode in 2509 supports information transfer to and from notebook 2516. Data transmitted to a UAV includes operator specific information and non-operator specific information. In addition, a power source 2520 is coupled to notebook computer 2516, video receiver 2512, VCR 2514 and a power supply 2522. Power supply 2522 provides power for data transmission.

Ground control station 2510 incorporates a graphical user interface that places minimal significance on standard "cockpit" displays and focuses on situational displays. The ground control station display is generally reconfigurable so that an operator can customize the information layout to suit his/her specific needs and/or vehicle requirements. An operator interacts with the graphical user interface through a mouse, a handheld controller (e.g. a joystick, game pad or keyboard arrow keys) a keyboard.

In another aspect of the present invention, an operator is able to exert manual control of all controlled air vehicles and any associated on board cameras (e.g., gimbaled cameras) via a hand-held controller, which is illustratively similar to that utilized in the commercial computer gaming industry. In one embodiment, the controller includes two thumb-operated joysticks; one used for steering the selected vehicle, and the other for panning and tilting the camera. In one embodiment, the system is configured such that the operator can take manual control of any vehicle at any time in the mission, and can return to autonomous vehicle control as desired.

In another aspect of the present invention, the mouse control is configured to control a cursor on the GUI (e.g., the GUI illustrated in FIG. 26 and described below), for example through standard operator-initiated "point-and-click" operations, menu options and/or icons. In another embodiment, alphanumeric entries are inserted in the GUI with the keyboard as necessary. In another embodiment, the operator can be in voice communication with the flight line personnel throughout a mission with the two-way radio. It should be noted that any other similar input and output means (e.g., voice recognition input, etc.) can be implemented without departing from the scope of the present invention.

Figure 26:
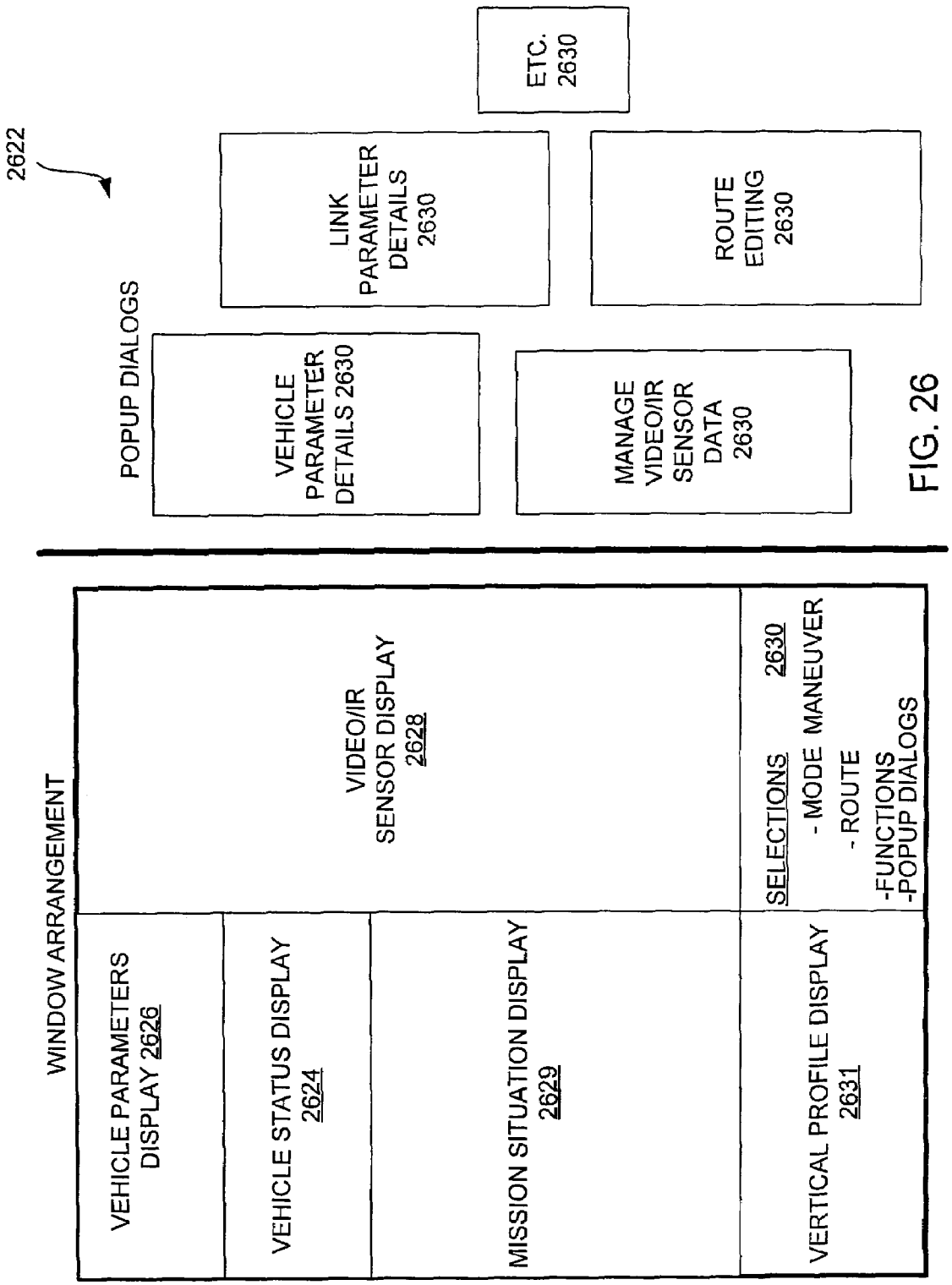
FIG. 26 is a block diagram representation of an example graphical user interface display.

FIG. 26, in accordance with one aspect of the present invention, is a block diagram representation of an example GUI display 2622. In accordance with one embodiment, display 2622 is subdivided into several sub-components (e.g, sub-windows). These sub-components illustratively include a vehicle status display 2624, a vehicle parameter display 2626, a video display 2628, a mission situation display 2629, a vertical profile display 2631 and a selection pane 2630. In addition, display 2622 also includes pop-up dialogs 2630. An operator is able to view more information then that which is displayed in the four sub-components by accessing various pop-up dialogs 2630. For example, the operator can view details of vehicle parameters, data link parameter details, detailed management of video/IR sensor data and support information related to route editing. It should be noted that this is not an exhaustive list of information sets to which the operator is provided access.

In one aspect of the present invention, display 2622 incorporates at least one intelligent window display having smart variables included therein. The concept behind an intelligent window display is that a display will function whether or not underlying data is provided through a vehicle data link. The motivation for such a window is to allow different vehicles with different data link variables to use common windows for situational awareness. The intelligent window fills the displays with 'smart variables', allowing the display to be adaptive, and fills in data when it is available. When data is not available, then the corresponding data field will appear inactive or grayed out.

Figure 27:
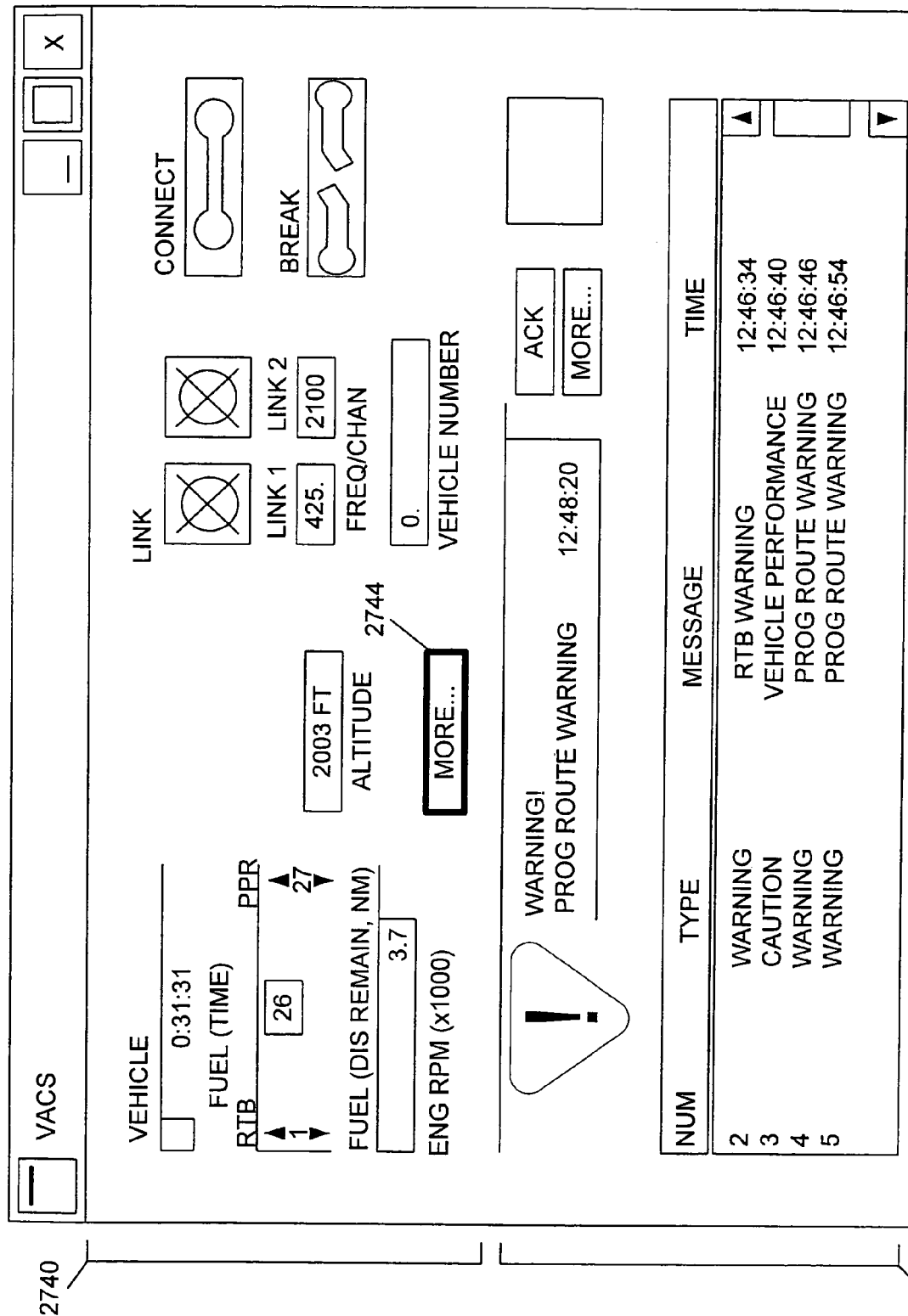
FIG. 27 is a sample screen shot representation of a vehicle status display.

FIG. 27 illustrates one illustrative example of a combination vehicle status display 2624 and vehicle parameters display 2626. The display includes vehicle link parameters 2740 and caution, alerts and warnings (CAWS) pane 2742. Vehicle link parameters pane 2740 illustratively includes critical vehicle parameters such as engine RPM, fuel remaining in accordance with time and distance the vehicle can fly with the fuel remaining, altitude and data link parameters. The CAWS pane 2742 illustratively contains active and/or inactive alerts to apprise the operator of system malfunctions. Examples include: return to base ranges, problems with the programmed route, vehicle performance problems and various other off-nominal conditions. The CAWS pane 2742 allows an operator to focus on imagery and mission level tasking with reduced attention to detailed information related to UAV state and health. With respect to vehicle status display 2624, the operator can view more detailed information or pop-up dialogs related to vehicle status by pointing and clicking on various push buttons such as "MORE" button 2744.

Figure 28:
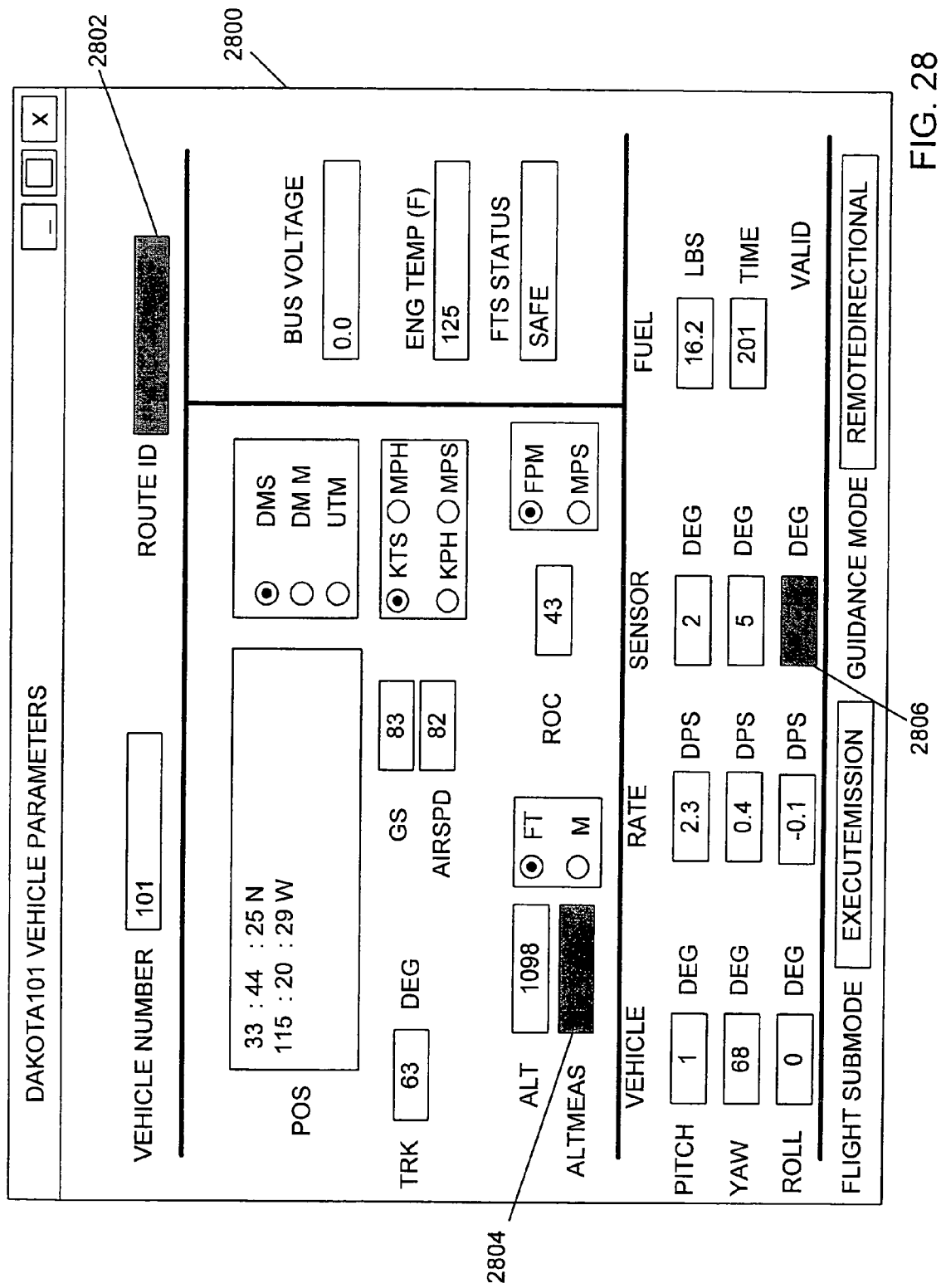
FIG. 28 is an example screen shot representation of an intelligent window display.

FIG. 28, in accordance with one aspect of the present invention, is an illustrative screen shot representation of an intelligent window display in the form of a pop-up dialog 2800 (e.g., as activated by pointing and clicking on the selectable "MORE" button 2744 in FIG. 27). The Route ID box 2802, the measured altitude box 2804, and the sensor roll angle box 2806 are displayed as inactive (i.e., are grayed out) while the rest of the display elements are actively updated with data. This is illustratively true because the route ID is not included in the corresponding vehicle's data link. Similarly, the vehicle is illustratively not equipped with a radar altimeter for ground altitude. Finally, the sensor is illustratively gimbaled in pitch and yaw only, so the concept of the gimbal roll angle does not make sense for this configuration. The intelligent window accesses the smart variables in the datalink download list. If the smart variable has not been set, the display simply displays the corresponding control box as inactive.

Figure 29:
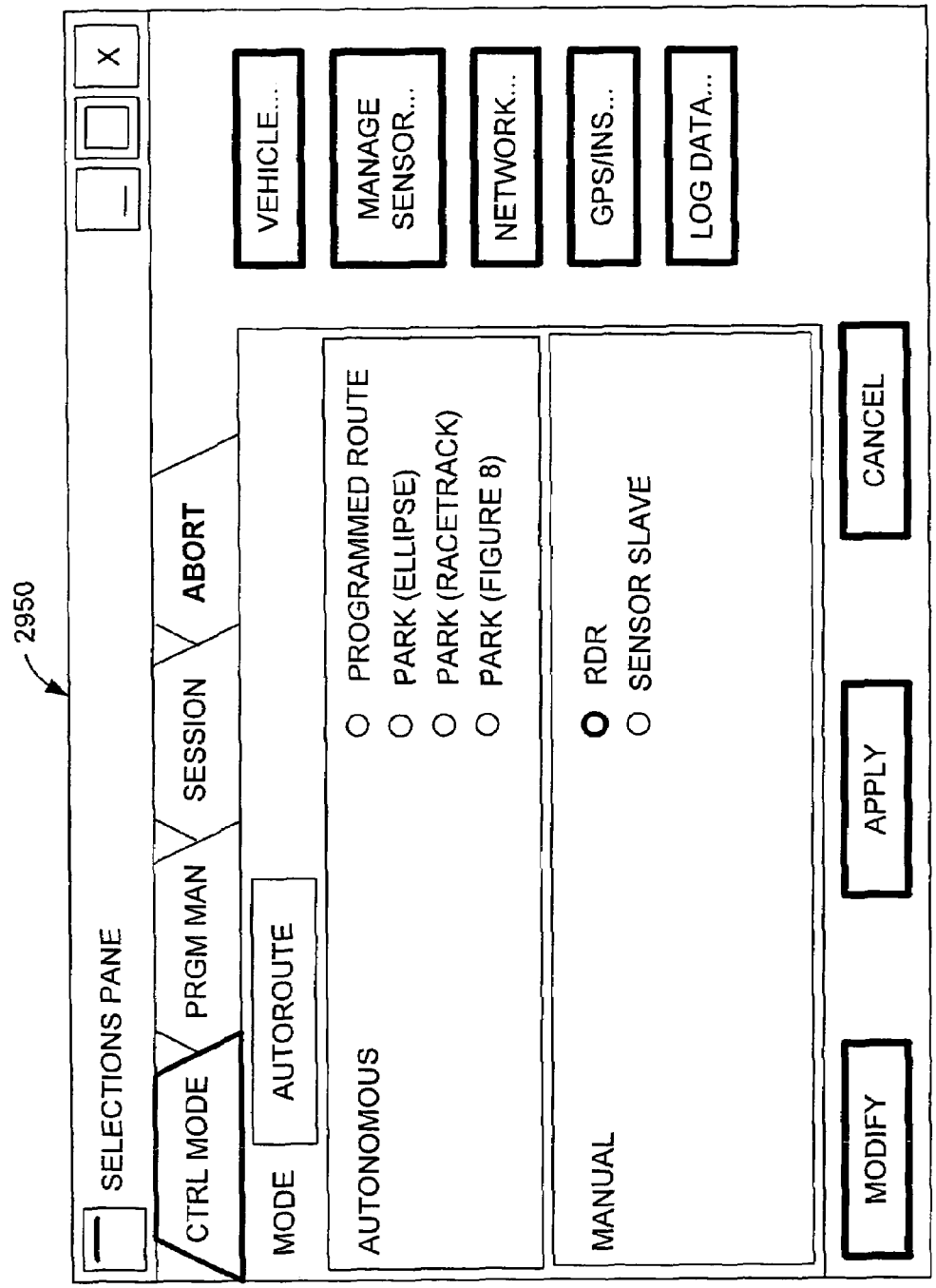

In accordance with one aspect of the present invention, the described GUI is configured such that the operator can access one or more control selection windows configured in a manner similar to the exemplary screen shots provided in FIGS. 29 through 32. FIGS. 29 through 32 together represent various components of a selections pane 2950 that supports a system of fully functional dynamic control and management such as can be utilized to manage and control multiple UAV's, as well as corresponding UAV payloads. The GUI is illustratively configured such that the operator can select and access a selections panel 2950 for any vehicle under control. As illustrated in FIG. 29, the selections panel 2950 includes means for instigating and switching between various levels of manual and autonomous control for a corresponding vehicle (without departing from the scope of the present invention, a fully manual option, i.e., stick-and-rudder control, could also be presented as a "manual" control mode). When a manual control mode is selected (e.g., RDC or Sensor Slave), the operator illustratively assumes control authority of the corresponding vehicle individually from the ground control station, which can be done at any time in flight. When an autonomous mode is selected, the corresponding autonomous flight control scheme will be initiated. In some cases, upon selection of an autonomous control mode, the operator is presented with a screen for inserting parameters to which the operator desires the autonomous mode to conform (e.g., the operator can designate a point around which to loiter, etc.). FIG. 33 is one example of a pop-up window designed to collect operator parameters for a racetrack loiter pattern.

Figure 30:
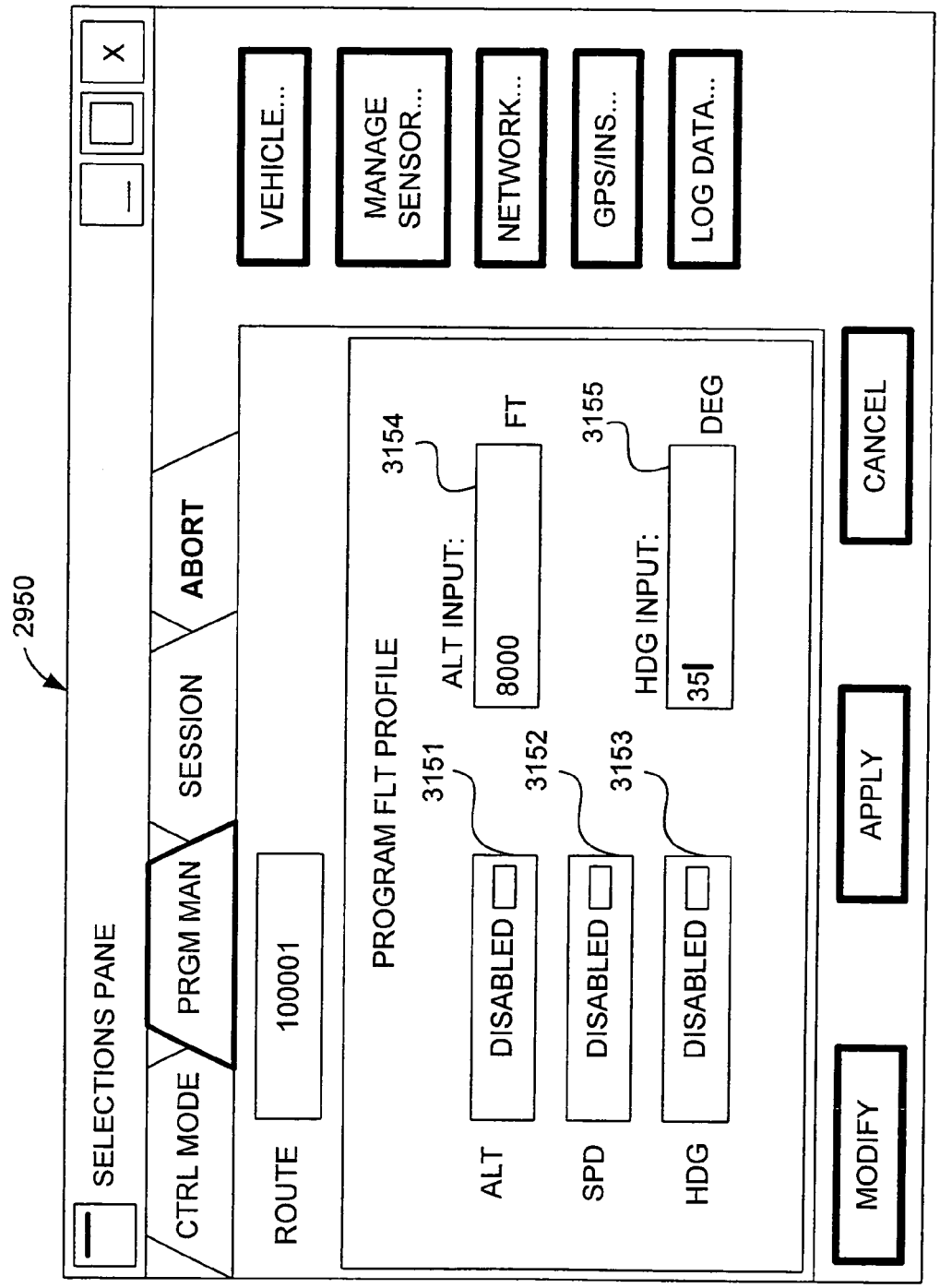
Figure 31:
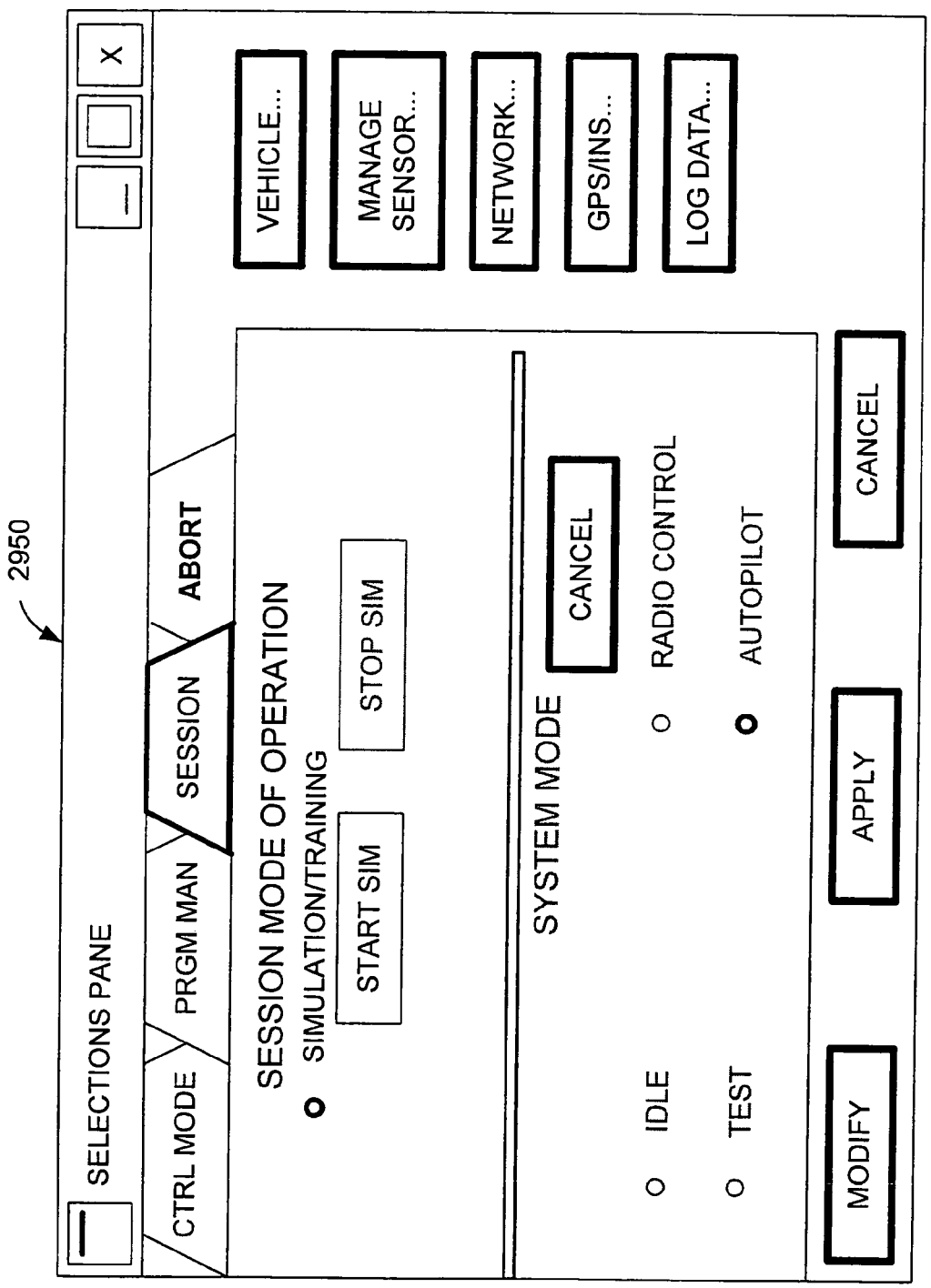
Figure 32:
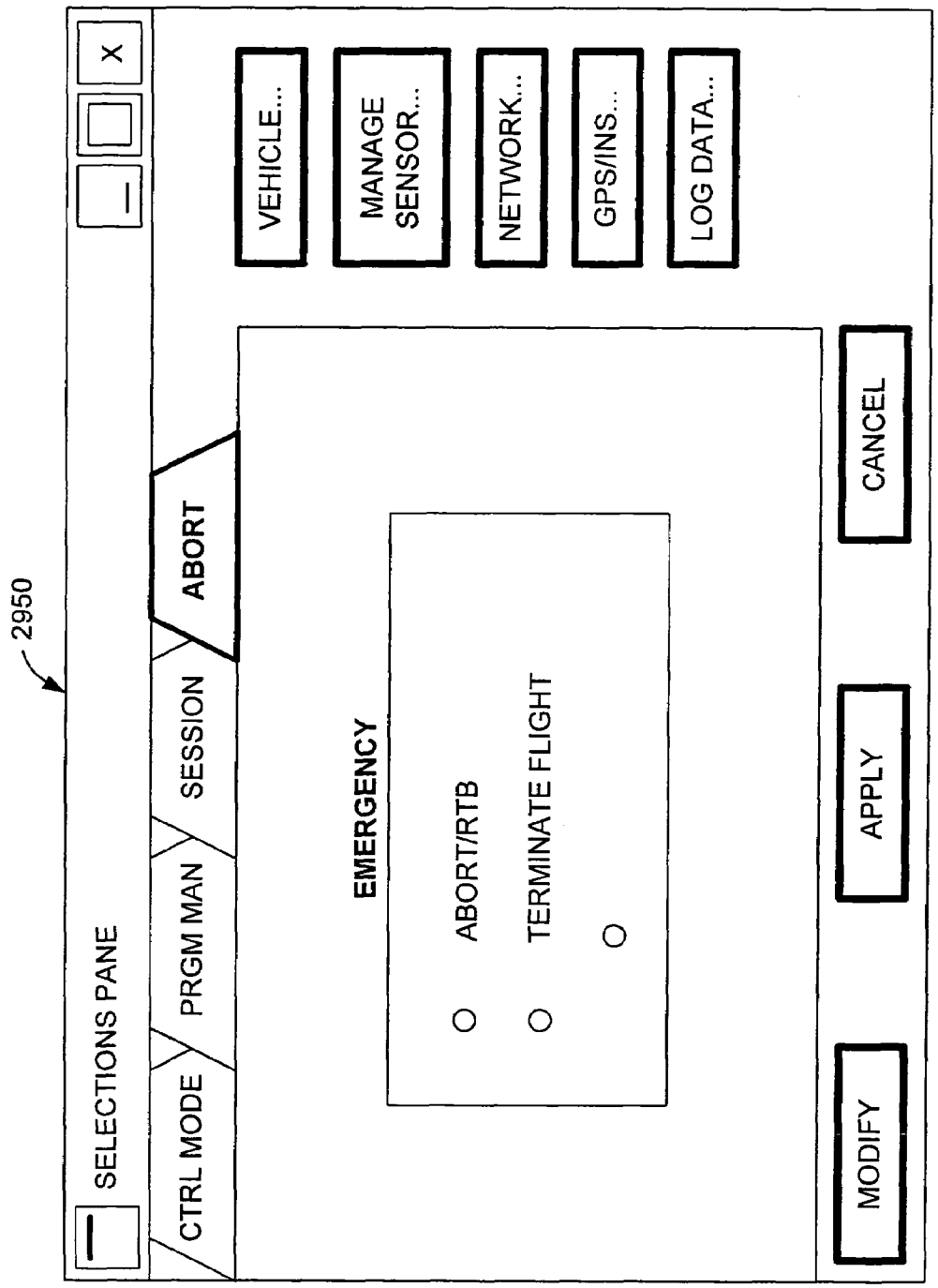

Other selectable features of the selections panel 2950 provide other control options such as auto maneuvers illustrated in FIG. 30, session options in FIG. 31 and an emergency abort option in FIG. 32 (e.g., from here the automated landing process can illustratively be accessed for vehicle recovery). Selections pane 2950 illustratively provides additional functionality and details such as vehicle parameters, dynamic sensor control capability, a network connectivity ability to broadcast or transmit the UAV video data over LAN or WAN, critical GPS/INS performance parameters and a TM logging capability in association with the GCS notebook computer 2516 hard drive (FIG. 25).

With reference to FIG. 26, display 2622 also includes mission situational display 2629 as well as vertical profile display. The mission situational display 2629 illustratively provides the operator with real-time route information for one or more vehicles from a map perspective. In accordance with one embodiment, display 2629 supports real-time route editing. For example, in accordance with one embodiment, a toolbar is displayed across the top of the display and provides an operator-based rapid, intuitive point and click interaction for real-time mission planning and route editing capability, as well as map display editing features (e.g. zoom, center, change map background, etc.). In addition, in accordance with one embodiment, situation display 2629 includes a target editor (configured to tie a target to UAV mission objectives) and a corridor editor (configured to set no-fly zones and/or other mission planning boundary constraints).

The screen shot illustrated in FIG. 33, described in a different context previously, is also one example of a screen shot representation of an intelligent window display in the form of a pop-up dialog for route editing. The illustrated display provides the operator the capability to either type in known, precise waypoint coordinates or record graphically edited route event coordinates and parameters. This and similar pop-up functionality is illustratively provided through display 2622.

A. Synthetic Visualization Tools

In accordance with one aspect of the present invention, a combination of high fidelity synthetic visualization tools, faster than real time simulation technology, and variable autonomy control together provide a baseline architecture that is capable of supporting an enhanced level of real-time UAV control and situation awareness. In accordance with one embodiment, a synthetically enhanced situation awareness system (SESAS) supports real-time management and control of multiple UAVs by a single operator. The synthetic visualization display can include threat data realistically displayed over mapped and photo-realistic 3D terrain. These visuals are driven (dynamically propagated) by a combination of simulated and real UAV data. The simulated data is generated by the ground control station and propagated at a higher rate than real data is received from the air vehicle. When real data is received, it is used to correct the simulation solution, thus providing an accurate, continuous representation of the UAV flight state within its environment.

The described SESAS technology can be utilized to provide a wide field of view (FOV) that augments live video and sensor feeds while circumventing payload and bandwidth limitations. Specifically, correlated, photo-realistic 3D terrain can be presented on multiple monitors or flat panel displays to provide a wide area FOV to aid operators in orientation and situation awareness. Furthermore, in accordance with one embodiment, the photo-realistic representation of the scene can be viewed from various frames of reference (e.g., with the simple push of a button). For example, one view is an out-the-window (OTW) view that provides a forward-looking wide area view of the scene (this would represent a pilot's cockpit view, for example). Another view is from above and behind the UAV, providing an outside observer's frame of reference (illustratively including a representation of the vehicle). An additional view is a sensor view in which the live sensor FOV is synthetically increased.

Significant reductions in datalink bandwidth requirements can be achieved with the aid of the simulation. Background and high frequency update information is provided by the simulation, while low-frequency data specific to the UAV—data that changes in real time over long periods of time—is provided via downlinks. By filling in the high frequency gaps with simulated data, very low update rates over the datalink are made feasible in that the operator is provided with a continuous situation awareness that is comprised of mixed live and simulated data. In accordance with one embodiment, a simulated wide field of view from the perspective of an on-board sensor is optionally provided (e.g., synthetic data is utilized to expand the sensor view).

The realism afforded by the synthetic visuals significantly enhances the operator's situation awareness. The synthetic visuals illustratively offer multiple views (or frames of reference) and increased field-of-views over that of on-board sensors. In accordance with one embodiment, video display 2628 in FIG. 26 provides a synthetic visual yet photo-realistic, computer-generated image of the visual environment of a selected air vehicle (a selected one of several vehicles being controlled by an operator). In accordance with one embodiment, the global positioning system (GPS) and inertial navigation system (INS) data that correspond to a vehicle's current position provide an input to the synthetic visual display, along with the vehicle's flight parameters (e.g., bank angle, pitch angle, heading, and speed). In accordance with one embodiment, special effects, such as target features and explosions, can be programmed in the display.

Accordingly, one aspect of the present invention pertains to a display system and situation awareness technology that presents the operator with an at least partially virtual representation of the vehicle environment. This enables the operator to be immersed in the vehicle environment without requiring the expense and data link bandwidth requirements of extended image based sensor suites. This display technology can be utilized to orient operators of both manned and unmanned vehicles. For example, the synthetic display can enable a pilot onboard a vehicle to orient himself relative to actual terrain even when conditions, are dark, cloudy, foggy, etc.

In one embodiment of a synthetic display system in accordance with the present invention, a state-of-the-art PC Image Generation (PCIG) component is an incorporated component. Such a component is available from SDS International of Arlington, Va. The PCIG is integrated into the control interface of the present invention to facilitate synthetically enhanced operator situation awareness display. The resulting display is a real-time display of 2D and 3D images that can be configured to include threats, friendlies, and command control overlays. The visuals offer complete and current sensor/decision, maker/shooter information, plus situation awareness for safety and navigation.

In one embodiment, synthetic visuals are driven by the vehicle in a manner very similar to a high fidelity flight simulator commanding ownship eye-point, environment and other entities. The chief difference being that instead of a high fidelity flight simulator, live vehicle state information drives the ownship eye-point. Furthermore, the other entities (ground-based threats, other aircraft, etc.) are illustratively real-world sensed entities as opposed to simulated entities.

In one embodiment of the synthetic visual display, the photo-realistic geo-specific visuals originally developed for training and mission rehearsal are directly utilized in an operational UAV context. In the simplest terms, the GPS and INS data that report UAV position are utilized as inputs to the Synthetic Visual Display's API, which couples the state data with FOV and orientation information from the cameras and sensors onboard the UAV. Replication of the simulated visuals provides "perfect weather", daylight visuals regardless of the night, weather, fog, clouds, or camera/sensor battle damage. The use of wider Field of View, multiple screens, augmented symbology and network integrated data exchange support an entire new generation of situation awareness enhancements, tools and operator decision aids, especially in the context of UAVs with their flexible ground control stations and network interconnectivity.

In one aspect of the present invention, synthetic vision display technical approach of the present invention is based upon integrating advanced simulated visuals, originally developed for training purposes, into UAV operational systems. In accordance with one embodiment, the simulated visuals are integrated with data derived from the ground control station during flight to enable real-time synthetic visuals.

B. GUI Component Selection

In one aspect of the present invention, through GUI display 2622, an operator can maintain a variable level of control over a UAV, from fully manual to fully autonomous, with simple user-friendly inputs. For example, if an operator decides to divert a UAV to a new route, the operator has a plurality of options to select from. The following are examples of some of the options that an operator has. Those skilled in the art should recognize that this is not an exhaustive list. In one embodiment, the operator could graphically edit the existing route on mission situation display 2629 by adding a waypoint or orbit pattern in the vicinity of a desired target region. Prior to accepting the edited route, the control system evaluates the revised route against the vehicle performance capability as well as terrain obstructions. If the route is within acceptable bounds, the control system registers the modified route and maneuvers the vehicle accordingly. In another embodiment, the operator could select a park mode on selections pane 2630. After selected, the control system queues the operator to click the location of and graphical size (via a mouse) the desired orbit pattern in which the vehicle will fly while "parked" over a desired target. In another embodiment, the operator can select a manual control mode on selections pane 2630. By selecting RDC (remote directional command), for example, the control system controls the UAV into a constant altitude, heading and speed flight until the operator instructs a maneuver. While in RDC mode, the operator can either pseudo-manually direct the UAV using the control stick (e.g. joystick) or the operator can program a fixed heading, altitude and speed using the control options provided in selections pane 2630.

The described Intelligent displays with smart variables represent an effective approach to actively displaying information for different types of vehicles. However, a problem can arise when a new vehicle is integrated into the ground control station with a completely foreign command and control interface. Under these circumstances, the ground control station is not concerned about displaying data, but is tasked to provide a command and control interface for the operator to perform the required operations. This conundrum is the motivation for another embodiment of the present invention, namely, the integration of vehicle specific panels in the ground control station.

In one embodiment, a generic vehicle class (GVC) is illustratively a software component that provides a rapid development environment API to add new vehicle classes and types to the ground control station. The GVC also illustratively serves as a software construct that allows the inclusion of multiple vehicles within the ground control station framework. One of the variables in the application is a vector of pointers to a generic vehicle class. This list is constructed by allocating new specific vehicles and returning a type case to the base generic vehicle class. When a new vehicle is integrated into the ground control station, the generic vehicle class provides all of the virtual functions to integrate with system control components (e.g., to integrate with a map display, a communications package, PCIG imagery and/or appropriate display windows). An important object in the application framework is illustratively a pointer to the current vehicle generic class. When the user switches vehicles, this pointer is updated and all displays grab the appropriate smart variables from the pointer to the new base class. This is the mechanism by which windows immediately update to the current vehicle information whenever the user switches vehicles. The default windows use the pointer to the current vehicle to grab information. In this manner, if the user switches to a new vehicle with a different set of datalink variables, that fact is immediately apparent on the display windows.

Figure 34:
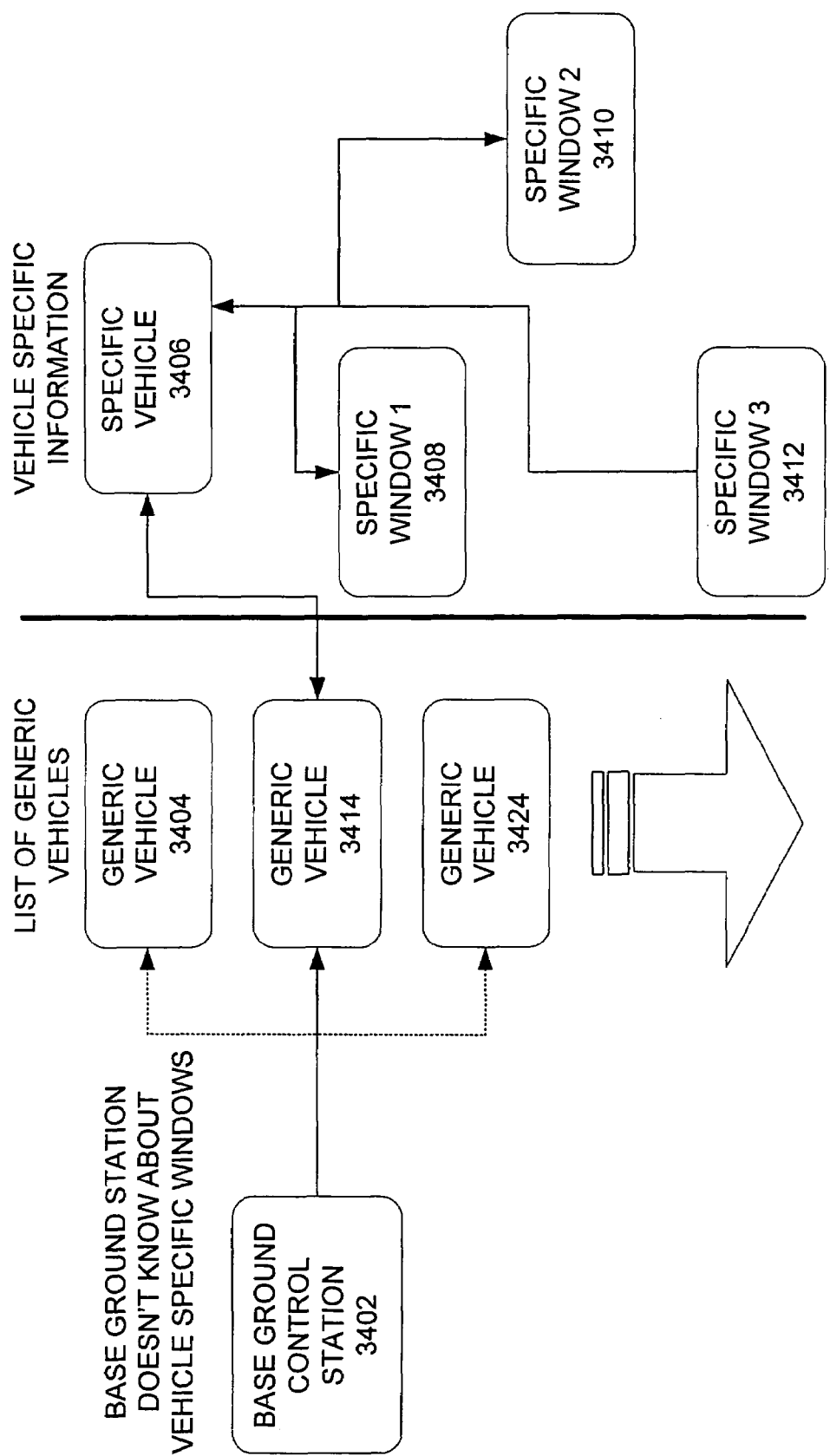
FIG. 34 is a schematic diagram demonstrating a generic vehicle class system configuration.

FIG. 34 is a schematic block diagram demonstrating implementation of vehicle specific panels. Through base control station 3402, an operator has access to a plurality of vehicle classes labeled as 3404, 3414 and 3424 (others can be included as well). Each vehicle class illustratively contains a pointer to associated vehicle specific windows, along with virtual functions that can be asserted to provide an appropriate display. When a vehicle is selected, the appropriate vehicle specific information (i.e., windows 3406, 3408, 3410, 3412, etc.) will be displayed.

In one embodiment, a given vehicle can be configured to select default panels, in which case vehicle specific panels will not be provided for that particular vehicle class. In one embodiment, if a default window does not provide a particular functionality required by a new vehicle, a new vehicle specific class can override those base windows and the new windows will be displayed upon selection.

Figure 35:
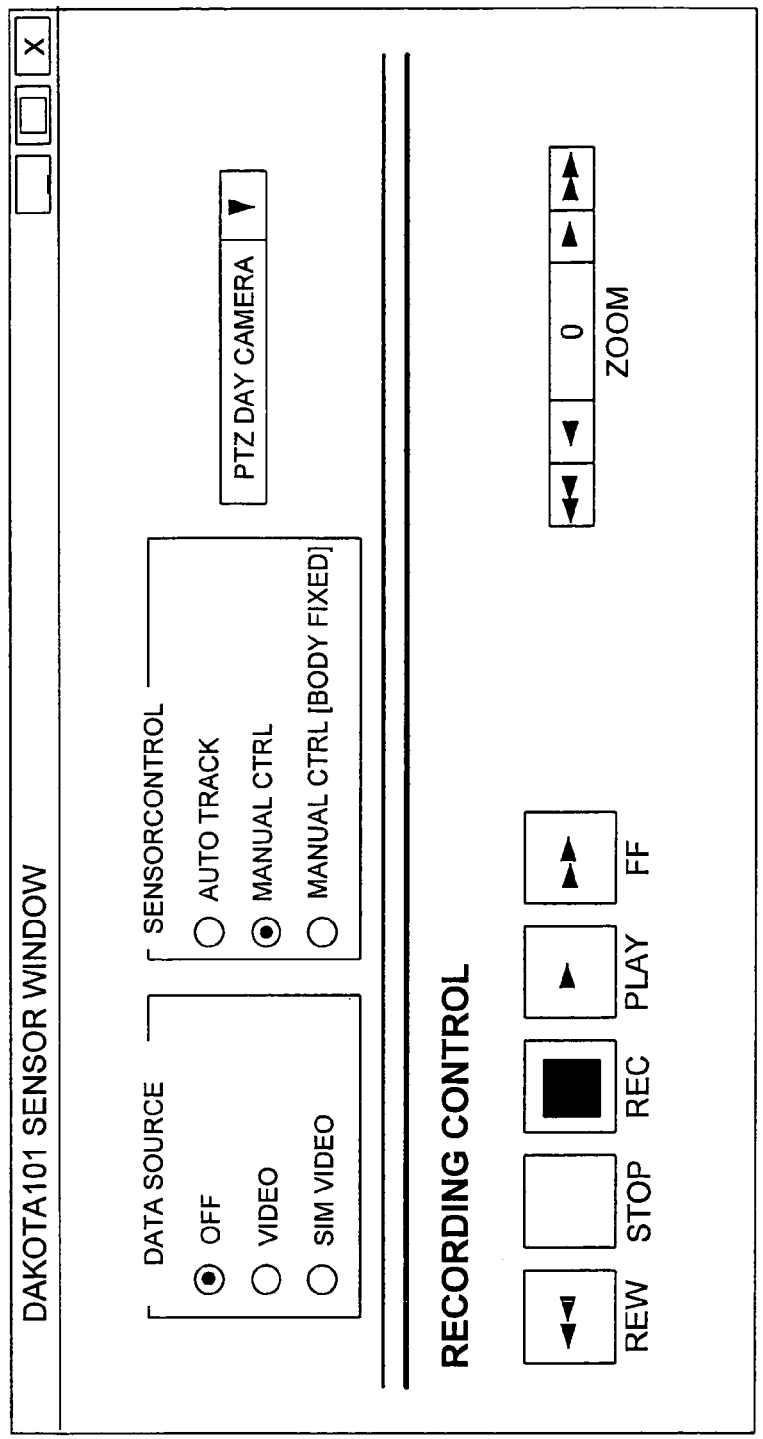

FIGS. 35 and 36 are screen shot representations demonstrating vehicle specific sensor control windows. FIG. 35 is illustratively a vehicle specific control window for a vehicle identified as Dakota1. FIG. 36 is illustratively a vehicle specific control window for a vehicle identified as Dakota2. Whenever Dakota1 is selected as the active vehicle, the platform includes a steerable sensor with an optional IR digital camera. However, the Dakota2 variant has no steerable camera at all. Instead, it is equipped with a fixed camera and a Ground Collision Avoidance System. When the user selects Dakota2 as the active vehicle, the sensor control window switches to the vehicle specific sensor window. This window allows the user the option to turn on and off the ground collision avoidance system.

The described ability to tailor the ground control station windows enables any vehicle to be integrated with the ground control station without loss of information from the previously integrated vehicles. Accordingly, the ground control station supports a multi heterogeneous platform command and control application. One potential limitation on the number of selectable vehicles is the throughput of the collective datalink packages.

Referring back to mission situation display 2629 of FIG. 26, each vehicle is illustratively represented on the display (e.g., the map display) by a symbol (e.g., a representation of a vehicle). A vehicle symbol moves across the display, typically an illustrated map, in accordance with movement of the actual vehicle (e.g., movement relative to the map is to scale). The path of where a vehicle has been (and/or where the vehicle has been directed to go) is illustratively represented by a line. In one embodiment, each vehicle and its associated path lines are displayed in a unique color so as to distinguish one vehicle's activity from another. The interface is illustratively configured such that a user can click directly on the display and thereby select one of the vehicles causing vehicle specific control windows to be displayed for the selected vehicle. Once a vehicle is selected, the system is configured such that the user can change the mode of control for the selected vehicle. In the context of the VACS design described herein, the operator can select from the range of available variable autonomous control modes. In accordance with one embodiment, if the operator switches control to a second vehicle without leaving adequate prospective flight instructions for the first vehicle, then the first vehicle will "hold steady" (e.g., steady velocity, altitude, etc.) until direct control is resumed.

Figure 37:
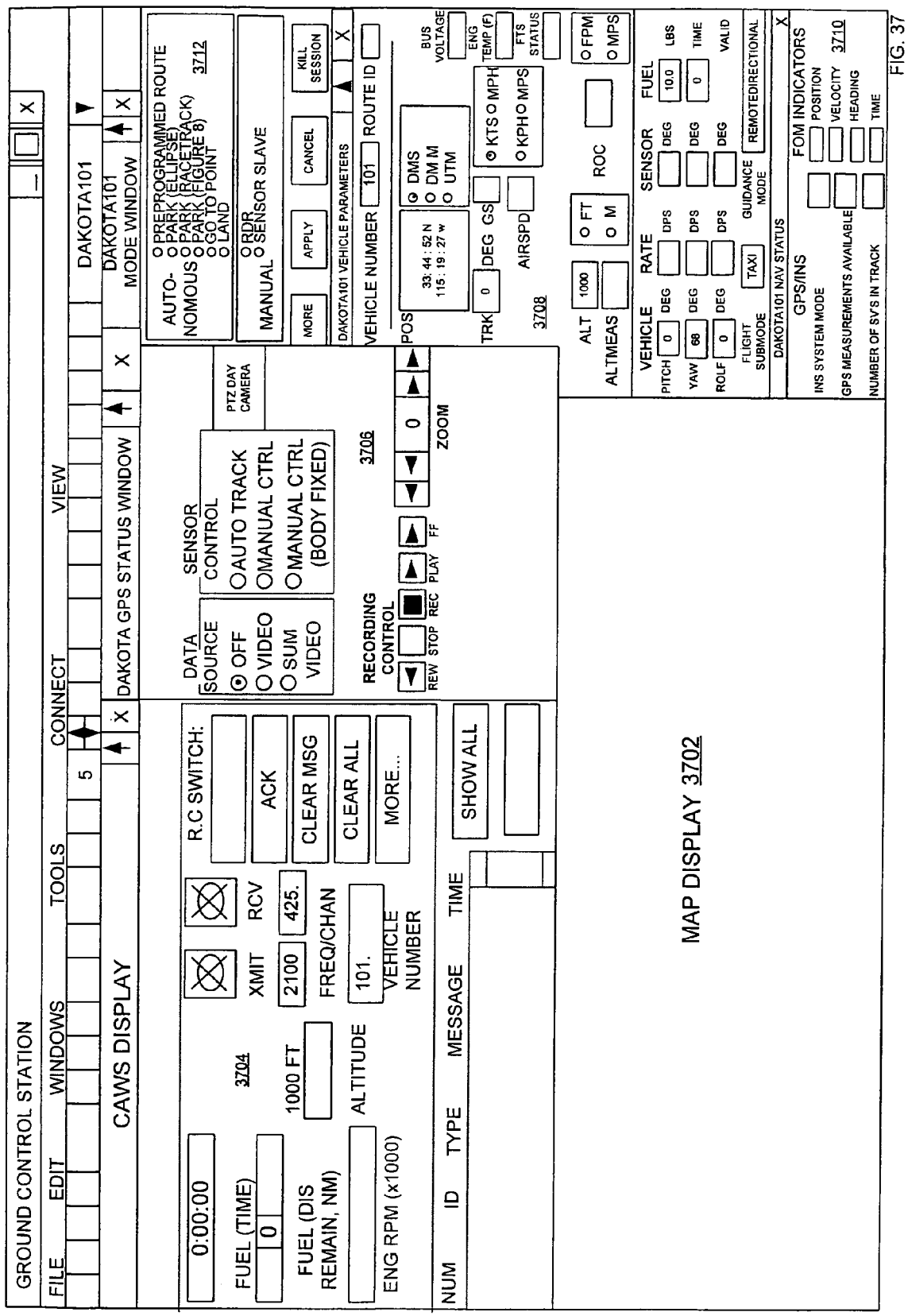
FIG. 37 is an example screen shot representation of a graphical user interface.

FIG. 37 is a screen shot representation of a detailed operator control graphical user interface display in accordance with an embodiment of the present invention. The display includes a mission situation display 3702 illustratively configured in a manner similar to the map display described in the preceding paragraph. Window 3704 is illustratively configured for operating data and function display. FIG. 37 is illustratively configured to display data and functions related to GPS and/or camera functionality. Window 3708 is illustratively a window configured to display data and functionality related to various system parameters. Window 3710 is illustratively configured to display data and functionality related to the navigation system. Finally, window 3712 is configured to display data and functionality related to control modes (e.g., operator can interact with this window to change control modes for a given vehicle). Displayed windows are illustratively configured for relocation and reconfiguration as desired by a particular operator. In one embodiment, the vehicle for which displayed parameters are associated depends on which vehicle has been selected by the operator. Again, the map display can illustratively be configured to show all vehicles relative to one another (and relative to the map) regardless of which vehicle is selected.

In one aspect of the present invention, the dynamic information in the dialog windows and navigation map is updated as the flight progresses and as the flight parameters undergo change. The vehicle information that is displayed corresponds to the vehicle the operator selects (simply clicking on the appropriate vehicle icon in the map display), and any one of the vehicles currently in flight can be selected. The map display provides a photographic depiction of the mission site, the relative locations of the air vehicles at the site, and the planned routes of the vehicles. An image output synthetic or otherwise, can alternatively be portrayed on the map display (alternatively, sensor data and/or synthetic image data can be displayed on separate monitors). The vehicle icons and the navigation routes are illustratively color-coded and highlighted on the map display as the vehicles are individually selected. Route planning can be performed from the map display, and route editing (e.g., changing waypoint locations) can be accomplished at any time in a mission. The map display also provides a depiction of the imaging payload field of view and the terrain area encompassed within it. The location and types of targets in the flight environment can also be represented on the may display. A profile view showing the height of the operator-selected vehicle above to the terrain can be displayed below the map. Various drop-down menus are also available to the operator from the GUI.

In one embodiment, for vehicles that incorporate a visual sensor (e.g., a digital camera), the vehicle indicated on the map display includes a sensor window indication displayed proximate to the vehicle indication (e.g., a box located in front of the vehicle indication). The dimensions of the sensor window indication illustratively corresponds to a field of view for the camera as it is displayed on a monitor in a control station. If the operator guides the vehicle or camera so as to open up a broader field of view, then the box indication illustratively becomes larger. Conversely, if the operator guides the vehicle or camera so as to narrow the field of view, then the box indication illustratively becomes smaller.

In review, a VACS human-system interface (HSI) is implemented with a graphical user interface (GUI) that allows the operator to quickly alter the UAV course with little effort. The VACS HSI focuses on the UAV mission tasking rather than vehicle aviation; hence, the VACS interface places minimal significance on standard "cockpit" displays and focuses on situation displays. The operator interacts with VACS through the use of a mouse, a joystick (or game pad), and/or a keyboard. The software can easily be modified to take advantage of touch-screen capabilities as well.

In accordance with one embodiment, a ground control station display is divided into 4 subcomponents: a vehicle status display, a situation display, a video display, and a selection pane. This interface contains a route editing dialog to support real-time route editing as well as a variety of selection panes to support fully functional dynamic control and management of the UAV.

In accordance with one embodiment, push buttons in the main GUI provide access to additional dialogs that provide vehicle status information, sensor management and control functionality, and information dissemination capability through both data logging and network connectivity. A route editing dialog is accessed from the map display and provides the operator rapid, intuitive point-n-click system interaction for real-time mission planning and route editing capability, as well as map display editing features (zoom, center, change map background, etc). The route editing pop-up dialog provides the operator the capability to either type in known, precise waypoint coordinates or record graphically edited route event coordinates and parameters. The situation (map) display also contains a target editor with the capability to tie targets to UAV mission objectives and a corridor editor set no-fly zones and/or other mission planning boundary constraints.

In accordance with one embodiment, mission/route editing is performed manually by the operator, using the graphical user interface "point-n-click" functionality on the map or typing in the coordinates. The interface, however, is illustratively designed generically so automated route plans can be accepted. VACS contains automatic route/mission analysis tools to alert the operator if a planned mission is not physically realizable due to vehicle performance constraints or terrain collision issues.

In accordance with one embodiment, the VACS GCS also contains a Cautions, Alerts, and Warnings (CAWS) panel that alerts the operator to system malfunctions, low fuel, route errors, and various other off-nominal conditions. The CAWS display will alert the operator when a vehicle subsystem fault is detected.

Using the VACS GUI interface, the operator can maintain any level of control over the UAV, from fully manual to fully autonomous, with the simple click of a mouse. For example, if the UAV is flying a preprogrammed waypoint route and the operator decides to divert it from that route to a new desired location, he/she has a myriad of options at his disposal. For example, a few of the options are:

1. Graphically edit the existing route on the mission situation display by adding a waypoint or orbit pattern in the vicinity of the desired target region. Prior to accepting the edited route, VACS evaluates the revised route against the vehicle performance capability as well as terrain obstructions. If the route is within acceptable performance bounds, VACS then registers the modified route into the outer-loop control function and the vehicle maneuvers accordingly.
2. Select "Go To" point on the 2D situation map display. When this mode is selected, VACS will queue the operator to click the location of and graphically size (via the mouse) the desired orbit pattern, which the vehicle is to fly while "parked" over a target area.
3. Select a manual control mode on the vehicle selections panel. By selecting RDR (remote directional response), for example, VACS controls the UAV into a constant altitude, constant heading, and constant speed flight condition until the operator instructs a maneuver. While in RDR mode, the operator can either:
    a. Pseudo-manually direct the UAV using the control stick (horizontal stick commands map to horizontal turn rates, vertical stick commands map to vertical climb/descent rates).
    b. Program in a fixed heading, altitude, and speed using the control options provided in the route tab of the selection pane.

XII. Datalink

In one aspect of the present invention, in order to facilitate simplified multi-vehicle communications, the ground control station implements a UDP/IP (user datagram protocol/internet protocol) standard. This configuration enables the underlying operating system to organize and multiplex data based on IP addresses. In one embodiment, the generic vehicle class system provides a means for assigning a vehicle IP address. When all system IP addresses are known, each vehicle provides its data link messages and the ground control station forwards those messages to the appropriate Internet address. In one embodiment, this type of data collection is used primarily for uplink information.

One aspect of the present invention pertains to the parsing of downlink messages. One embodiment pertains to an implementation of the known serial line Internet protocol (SLIP). The SLIP protocol takes standard IP type information and encodes it to a serial stream to be sent over a serial device. On the other side, a decoder converts the serial stream back to IP so the computers on each side of the interface do not know about the underlying serial protocol—to them, communication is consistent with IP over Ethernet links.

In accordance with one embodiment of the present invention, the ground control station actually connects to a router (e.g., a SLIP router), which takes all of the information from the ground control station and forwards it to the appropriate vehicle. In accordance with one embodiment, this enables a user of hybrid hardware systems with 802.11b amplified cards or serial communication radios (e.g., Freewave radios) which run the SLIP protocol to mask the underlying serial interface. With this setup, the ground control station always connects to vehicles as if they were computers on a network, and all routing is taken care of by the router. Thus, data packets going over serial communication radio interfaces (e.g., Freewave radio interfaces) are run through the SLIP protocol and data packages going over 802.11b amplified cards are forwarded without processing. It should be noted that a SLIP router and SLIP protocol are provided as examples of a suitable implementation. Other similar known communications implementations could be incorporated without departing from the scope of the present invention.

The reading of download data links becomes a bit complex. The reason is that the ground control station always talks to the SLIP box, so information from any vehicle is effectively coming from the same Internet address. Therefore, in accordance with one embodiment, the ground control station monitors a specific designated port for all incoming data. The data has an assumed header that contains a vehicle ID and message size. The communications package then forwards the datalink information to the appropriate vehicle class.

Figure 38:
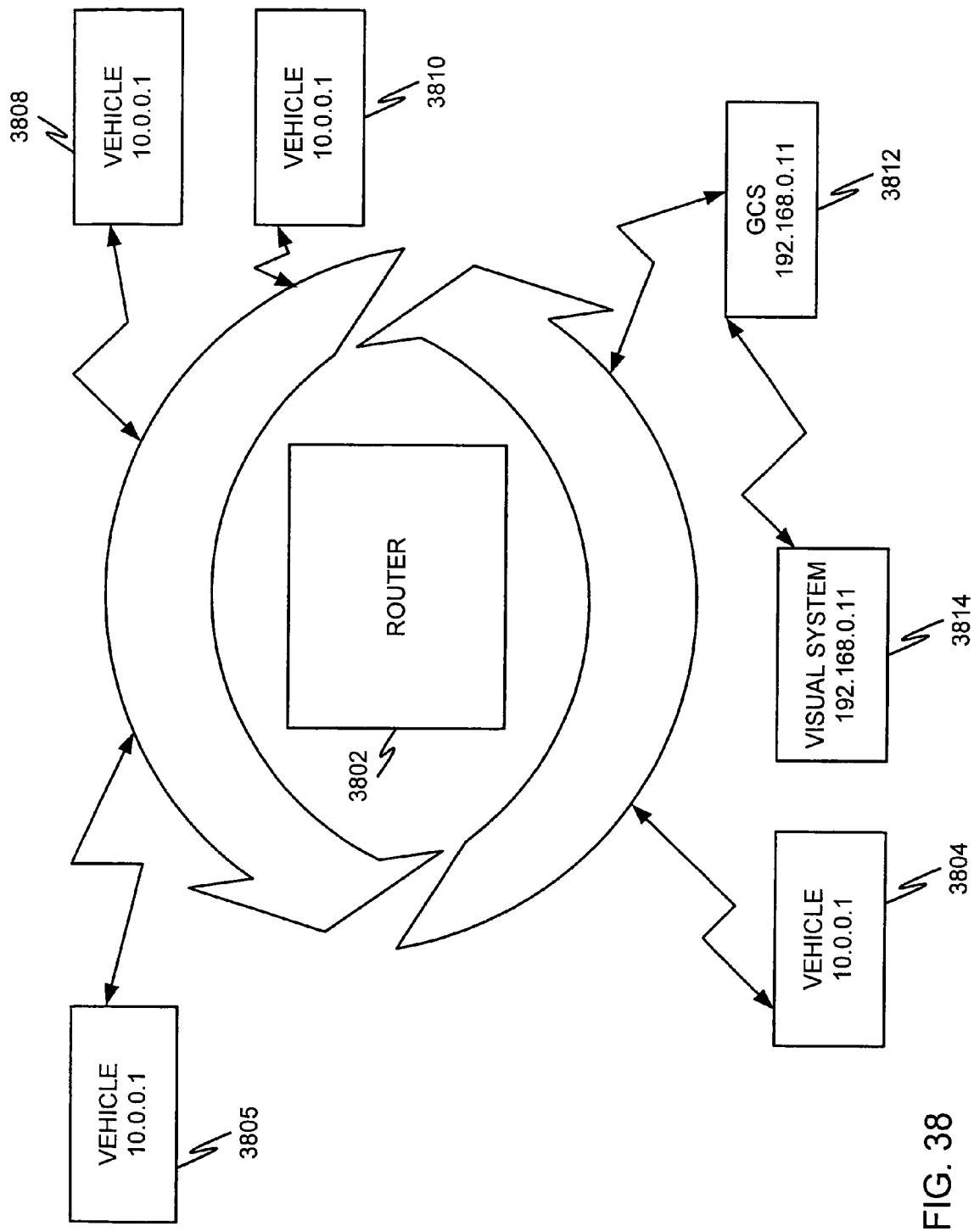
FIG. 38 is a schematic block diagram demonstrating a network centric UDP communications scheme.

FIG. 38 is a schematic block diagram demonstrating a network centric UDP communications scheme in accordance with one embodiment, of the present invention. Vehicles 3804, 3806, 3808 and 3810 each include an illustrated IP address and communicate with ground control station 3812 by way of router (e.g., SLIP protocol means) 3802. Station 3812 also includes an illustrated IP address. It should be noted that other components can be assigned IP addresses and added to the communications loop. For example, within FIG. 38, a visual system 3814 is illustrated and includes an illustrated IP address for communications support.

Accordingly, one aspect of the present invention pertains to a spread-spectrum communications hardware architecture and supporting multi-layered communications software packages that enable multi-vehicle IP-based messaging (TCP, UDP). This IP-based messaging design enables multi-vehicle control using either conventional radios driven by serial interfaces or wireless Ethernet boards (i.e., 802.11).

One advantage of the described multi-vehicle communications architecture is compatibility with conventional spread-spectrum data link systems that operate with standard serial interfaces. An Ethernet-to-transceiver bridge provides a transparent IP (TCP or UDP) network interface for the Ground Control Station (GCS) to interface to multiple UAVs. In accordance with one embodiment, to utilize wireless Ethernet (i.e., 802.11) technology, the bridge and spread-spectrum radios are simply replaced with the 802.11 board—no software modifications are required.

XIII. Flight Control System Hardware

In accordance with one aspect of the present invention, the VACS architecture is applied in the context of an integrated UAV digital flight control system and ground control system. In accordance with one embodiment, the airborne digital flight control system is implemented in the context of a computing environment (e.g., a PC/104 stack) configured for guidance, navigation, and control processing, power distribution, I/O handling, and/or a data link system. Depending on a given application and implementation, the computing environment can also be configured to support an inertial measurement unit (IMU), a precision pressure transducer for airspeed measurements, a GPS receiver, and/or a control interface to a pan-tilt-zoom or gimbaled payload system. An interface controller box can also be provided to allow the UAV to be operated by either the VACS controller or a back-up radio control (R/C) transmitter. As has been described, the airborne system guidance and autopilot software is capable of supporting varying levels of control autonomy.

XIV. Sample Mission

The described VACS architecture and user interface control system enables an example mission as follows. In the example scenario, three UAV's are simultaneously controlled by a single operator from a ground control station. The operator controls the vehicles during a simulated target search and destroy mission. Two of the vehicles image a ground "target", using on-board digital cameras, and one of the vehicles performs a simulated target attack maneuver. Each vehicle provides various autonomous flight control capabilities to the operator, including autonomous waypoint navigation, various orbit patterns for time-on-target, loss-of-link and return-to-base (automatic landing initiated to preprogrammed or operator-designated location when communications link lost), and automatic ground collision avoidance.

In accordance with the example mission, three air vehicles are flown simultaneously, simulating a target search and destroy mission. The vehicles are launched individually under the control of an R/C pilot, who is located near the takeoff point on an airfield runway. The pilot remotely steers each of the vehicles to a transition point, where vehicle control is switched over to the GCS operator. Following the switchover, the operator manually steers the vehicle toward a pre-planned orbit pattern. After the vehicle is properly oriented, the operator commands the VACS control system and the vehicle flies autonomously to the orbit pattern. The vehicles all orbit at an altitude of 1500-ft. MSL (~1000-ft. AGL) and at a speed of approximately 75 kts.

One of the vehicles illustratively circles near the end of the runway and briefly images the runway as it circles. An automobile, representing a ground target, is positioned on the runway. The air vehicle is then commanded to a lower altitude in the orbit pattern to simulate a target surveillance maneuver. The vehicle is then commanded to climb to its original orbiting altitude.

Next, the operator redirects one of the vehicles and sends it from its orbit pattern to the runway by designating a target location on the situation display and invoking a "go to" mode. The UAV autonomously captures and enters an orbit patter over the target and automatically steers the camera to maintain persistent surveillance of the target. Subsequently, the vehicle autonomously returns to the orbit pattern.

The operator then decouples the VACS automation on another vehicle and programs a new route to pass over the runway. Near the runway the vehicle is sent to a lower altitude to simulate a weapon attack. After several passes over the runway, the vehicle is returned to its initial altitude and the vehicle autonomously returns to its pre-assigned orbit pattern.

Vehicle speeds are always maintained at about 75 kts. The autonomous landing system of the present invention is engaged to return the vehicles to the runway from which they took off. An automated take-off can illustratively also be implemented to eliminate the necessity of an RC controller for landing/take-off.

Figure 39:
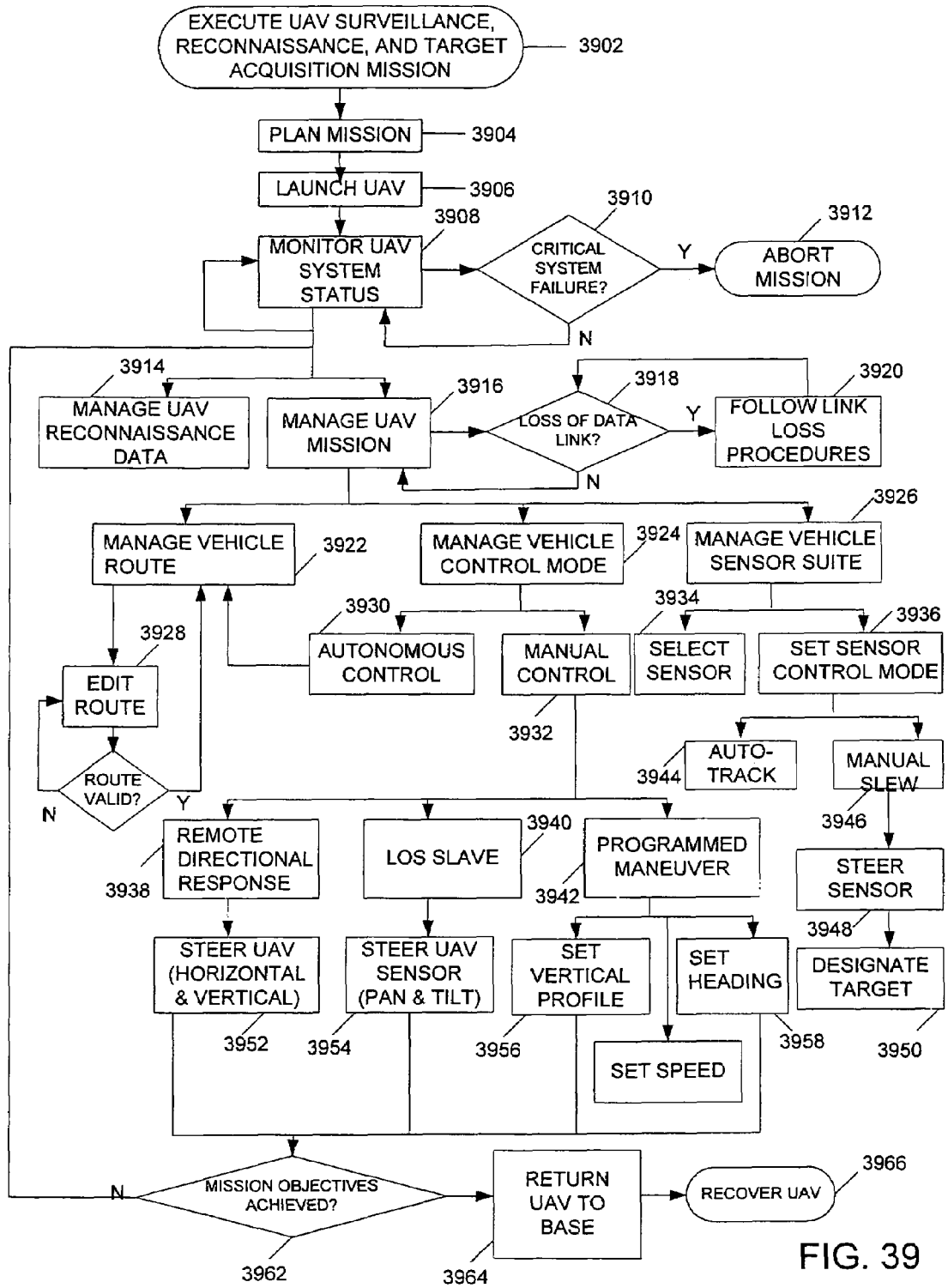
FIG. 39 is a schematic block diagram illustrating potential control paths through a mission.

FIG. 39 is a schematic block diagram illustrating potential control paths through a mission in accordance with the VACS architecture. Block 3902 represents the potential missions that can be executed such as surveillance, reconnaissance and/or target acquisition. Of course, other missions, including non-military related missions, are within the scope of the present invention. Block 3904 represents the step of planning a mission. Block 3906 represents launching a vehicle. Block 3908 represents monitoring system status after launch. Block 3910 represents evaluating whether a critical system failure has occurred. If such a failure does occur, then the mission is aborted in accordance with block 3912 (e.g., the vehicle is recovered in accordance with an automated landing process execution). Such monitoring is executed in a loop to continually watch for critical failures.

In accordance with block 3914, reconnaissance data is gathered if necessary. Block 3916 represents vehicle mission management. In accordance with block 3918, communication links are monitored. If a communication link is interrupted, then link loss procedures are implemented in accordance with block 3920 (e.g., automatic landing system is initiated for vehicle recovery). In accordance with block 3922, the operator manages the route the vehicle is set to follow. In accordance with block 3928, the operator can edit the route. If a non-valid route is entered, then the route must be edited again. Otherwise, the valid route is executed. This is but one means of control available to the operator for mission execution.

In accordance with block 3926, the operator manages sensors associated with the vehicle. Block 3934 indicates selection of a sensor. In accordance with block 3936, a sensor control mode can be set. One of the sensor control mode settings available corresponds to block 3944 and is an auto-tracking functionality wherein the sensor will automatically track as necessary. Block 3946 represents a manual control of the sensor and block 3948 represents steering of the sensor. Block 3950 represents sensor control based on a designated target.

Block 3924 represents control mode management by the operator. In accordance with block 3930, the operator can choose an autonomous control mode such as, but not limited to, vehicle route management. In accordance with block 3932, the operator can select a manual control mode. In accordance with block 3938, the operator can choose RDR control. In accordance with block 3952, the vehicle can be steered in the horizontal and vertical planes. These modes can be executed as necessary to support achievement of mission objectives in accordance with block 3962.

Another available mode of control is line-of-sight-slave control in accordance with block 3940. In accordance with block 3954 the vehicle sensor is utilized for steering purposes as necessary to support achievement of mission objectives. Block 3942 represents program maneuver control. Block 3956, 3960 and 3958 represent a setting of parameters for programmed maneuver control. The program maneuver control can also be selected to support the achievement of mission objectives. In accordance with block 3962, analysis is conducted to determine whether mission objectives have been achieved. If they have not, then the control processes are continued. If the objectives have been achieved, then, in accordance with block 3964 and 3966, the vehicle is recovered (e.g., automated landing system is implemented if necessary). In accordance with one embodiment, radio control is utilized to launch and/or recover a vehicle.

Although the present invention has been described with reference to preferred embodiments, workers skilled in the art will recognize that changes may be made in form and detail without departing from the spirit and scope of the invention.

What is claimed is:

1. A vehicle control system configured to accommodate command and control of a plurality of unmanned aerial vehicles (UAV's) that are simultaneously in flight, the system comprising:
   a transceiver that receives data from the plurality UAV's and that transmits data to the plurality of UAV's;
   a situational display that provides real-time route information for the plurality of UAV's and that supports real-time route editing for the plurality of UAV's; and
   wherein the system evaluates a revised route against a UAV performance capability and registers the revised route based on a determination that the revised route is within the UAV performance capability.

2. The vehicle control system of claim 1 wherein the system maneuvers one of the plurality of UAV's according to the revised route.

3. The vehicle control system of claim 1 wherein the revised route comprises moving target tracking.

4. The vehicle control system of claim 1 wherein the situational display provides an operator with real-time information from a map perspective.

5. The vehicle control system of claim 1 wherein the plurality of UAV's comprises at least two different types of vehicles.

6. The vehicle control system of claim 1 wherein an operator enters the revised route by graphically editing an existing route on the situational display.

7. The vehicle control system of claim 6 wherein graphically editing comprises adding an orbit pattern.

8. The vehicle control system of claim 6 wherein adding an orbit pattern comprises adding the orbit pattern in a vicinity of a desired target.

9. The vehicle control system of claim 1 wherein real-time route information for the plurality of UAV's comprises a symbol for each of the plurality of UAV's and a path for each of the plurality of UAV's.

10. The vehicle control system of claim 9 wherein the path for each of the plurality of UAV's includes an indication of where the UAV has been.

11. The vehicle control system of claim 9 wherein the path for each of the plurality of UAV's includes an indication of where the UAV has been directed to go.

12. The vehicle control system of claim 1 wherein the revised route is automatically edited based on a determination that the revised route is not within the UAV performance capability.

13. A vehicle control system configured to accommodate command and control of a plurality of unmanned aerial vehicles (UAV's) that are simultaneously in flight, the system comprising:
   a transceiver that receives data from the plurality UAV's and that transmits data to the plurality of UAV's;
   a selections panel for each of the plurality of UAV's that allows an operator to switch between a range of different manual and autonomous control modes; and
   wherein the system initiates a control mode for multiple of the plurality of UAV's based at least in part on selections of different control modes from multiple of the selections panels.

14. The vehicle control system of claim 13 wherein the selections panel for each of the plurality of UAV's is displayed independently on a graphical user interface and the selections panel allows the operator to switch between selection panels for each of the plurality of UAV's.

15. The vehicle control system of claim 13 wherein one of the range of different control modes is sensor slave control.

16. The vehicle control system of claim 15 wherein at least one of the selections is made by inputting a parameter to be applied to a particular one of the range of different control modes.

17. The vehicle control system of claim 16 wherein the parameter includes a loiter point.

18. A vehicle control system configured to accommodate command and control of a plurality of unmanned aerial vehicles (UAV's) that are simultaneously in flight, the system comprising:
   a transceiver that receives data from the plurality UAV's and that transmits data to the plurality of UAV's;
   a situational display that provides an operator with real-time route information for the plurality of UAV's and that supports real-time route editing for the plurality of UAV's;
   a selections panel for each of the plurality of UAV's that allows the operator to switch between various levels of manual and autonomous control modes for each of the plurality of UAV's; and a sensor control window for each of the plurality of UAV's that enables selection of a data source and a sensor control.

19. The vehicle control system of claim 18 wherein the selectable data sources include video and simulated video sources.

20. The vehicle control system of claim 18 wherein the selectable sensor controls include automatic tracking, manual control, and fixed body manual control.

* * * * *